United States Patent
Konandreas et al.

(10) Patent No.: US 8,392,021 B2
(45) Date of Patent: Mar. 5, 2013

(54) AUTONOMOUS SURFACE CLEANING ROBOT FOR WET CLEANING

(75) Inventors: Stefanos Konandreas, Belluno (IT); Andrew Ziegler, Arlington, MA (US); Christopher John Morse, Malden, MA (US)

(73) Assignee: iRobot Corporation, Bedford, MA (US)

(*) Notice: Subject to any disclaimer, the term of this patent is extended or adjusted under 35 U.S.C. 154(b) by 483 days.

(21) Appl. No.: 11/207,575

(22) Filed: Aug. 19, 2005

(65) Prior Publication Data

US 2006/0190133 A1    Aug. 24, 2006

Related U.S. Application Data

(63) Continuation-in-part of application No. 11/133,796, filed on May 21, 2005, now abandoned, which is a continuation-in-part of application No. 11/134,213, filed on May 21, 2005, now abandoned, which is a continuation-in-part of application No. 11/134,212, filed on May 21, 2005, now abandoned.

(60) Provisional application No. 60/654,838, filed on Feb. 18, 2005.

(51) Int. Cl.
    *G06F 19/00* (2006.01)
(52) U.S. Cl. ........ 700/245; 700/246; 700/249; 700/250; 700/256; 700/259; 318/568.1; 318/568.12; 318/580; 318/581; 318/587; 701/23; 701/24; 701/25; 701/26; 701/300; 901/1; 901/46; 901/47
(58) Field of Classification Search .......... 700/245, 700/246, 250, 256, 259, 264; 318/568.1, 318/568.12, 580, 581, 587; 701/23, 24, 25, 701/26, 300, 301; 901/1, 46, 47
See application file for complete search history.

(56) References Cited

U.S. PATENT DOCUMENTS

| | | |
|---|---|---|
| 1,755,054 A | 4/1930 | Darst |
| 1,780,221 A | 11/1930 | Buchmann |
| 1,970,302 A | 8/1934 | Gebhardt |
| 2,136,324 A | 11/1938 | John |
| 2,302,111 A | 11/1942 | Dow et al. |
| 2,353,621 A | 7/1944 | Sav et al. |
| 2,770,825 A | 11/1956 | Pullen |
| 2,930,055 A | 3/1960 | Fallen et al. |
| 3,119,369 A | 1/1964 | Harland et al. |
| 3,166,138 A | 1/1965 | Dunn |
| 3,333,564 A | 8/1967 | Waters |
| 3,375,375 A | 3/1968 | Robert et al. |

(Continued)

FOREIGN PATENT DOCUMENTS

| | | |
|---|---|---|
| AU | 2003275566 A1 | 6/2004 |
| DE | 2128842 C3 | 12/1980 |

(Continued)

OTHER PUBLICATIONS

Tribelhorn et al., Evaluating the Roomba: a low-cost, ubiquitous platform for robotics research and education, 2007, IEEE, p. 1393-1399.*

(Continued)

*Primary Examiner* — McDieunel Marc
(74) *Attorney, Agent, or Firm* — Fish & Richardson P.C.

(57) ABSTRACT

An autonomous floor cleaning robot includes a transport drive and control system arranged for autonomous movement of the robot over a floor for performing cleaning operations. The robot chassis carries a first cleaning zone comprising cleaning elements arranged to suction loose particulates up from the cleaning surface and a second cleaning zone comprising cleaning elements arraigned to apply a cleaning fluid onto the surface and to thereafter collect the cleaning fluid up from the surface after it has been used to clean the surface. The robot chassis carries a supply of cleaning fluid and a waste container for storing waste materials collected up from the cleaning surface.

20 Claims, 20 Drawing Sheets

U.S. PATENT DOCUMENTS

| | | | |
|---|---|---|---|
| 3,381,652 A | 5/1968 | Schaefer et al. |
| 3,457,575 A | 7/1969 | Bienek |
| 3,550,714 A | 12/1970 | Bellinger |
| 3,569,727 A | 3/1971 | Aggarwal et al. |
| 3,649,981 A | 3/1972 | Woodworth |
| 3,674,316 A | 7/1972 | De Brey |
| 3,678,882 A | 7/1972 | Kinsella |
| 3,690,559 A | 9/1972 | Rudloff |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| 3,851,349 A | 12/1974 | Lowder |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De brey |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,305,234 A | 12/1981 | Pichelman |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,638,445 A | 1/1987 | Mattaboni |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli et al. |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,709,773 A | 12/1987 | Clement |
| 4,710,020 A | 12/1987 | Maddox et al. |
| 4,712,740 A * | 12/1987 | Duncan et al. ................ 239/340 |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George, II et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,829,442 A | 5/1989 | Kadonoff et al. |
| 4,829,626 A | 5/1989 | Harkonen et al. |
| 4,832,098 A | 5/1989 | Palinkas et al. |
| 4,851,861 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,909,972 A | 3/1990 | Britz |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,967,862 A | 11/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Waqkaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |

| | | | | | | |
|---|---|---|---|---|---|---|
| 5,062,819 | A | 11/1991 | Mallory | 5,451,135 A | 9/1995 | Schempf et al. |
| 5,070,567 | A | 12/1991 | Holland | 5,454,129 A | 10/1995 | Kell |
| 5,084,934 | A | 2/1992 | Lessig et al. | 5,455,982 A | 10/1995 | Armstrong et al. |
| 5,086,535 | A | 2/1992 | Grossmeyer et al. | 5,465,525 A | 11/1995 | Mifune et al. |
| 5,090,321 | A | 2/1992 | Abouav | 5,465,619 A | 11/1995 | Sotack et al. |
| 5,093,955 | A | 3/1992 | Blehert et al. | 5,467,273 A | 11/1995 | Faibish et al. |
| 5,094,311 | A | 3/1992 | Akeel | 5,471,560 A | 11/1995 | Allard et al. |
| 5,098,262 | A | 3/1992 | Wecker et al. | 5,491,670 A | 2/1996 | Weber |
| 5,105,502 | A | 4/1992 | Takashima | 5,497,529 A | 3/1996 | Boesi |
| 5,105,550 | A | 4/1992 | Shenoha | 5,498,948 A | 3/1996 | Bruni et al. |
| 5,109,566 | A | 5/1992 | Kobayashi et al. | 5,502,638 A | 3/1996 | Takenaka |
| 5,115,538 | A | 5/1992 | Cochran et al. | 5,505,072 A | 4/1996 | Oreper |
| 5,127,128 | A | 7/1992 | Lee et al. | 5,507,067 A | 4/1996 | Hoekstra et al. |
| 5,136,675 | A | 8/1992 | Hodson | 5,510,893 A | 4/1996 | Suzuki |
| 5,136,750 | A | 8/1992 | Takashima et al. | 5,511,147 A | 4/1996 | Abdel |
| 5,142,985 | A | 9/1992 | Stearns et al. | 5,515,572 A | 5/1996 | Hoekstra et al. |
| 5,144,471 | A | 9/1992 | Takanashi et al. | 5,534,762 A | 7/1996 | Kim |
| 5,144,714 | A | 9/1992 | Mori et al. | 5,535,476 A | 7/1996 | Kresse et al. |
| 5,144,715 | A | 9/1992 | Matsuyo et al. | 5,537,017 A | 7/1996 | Feiten et al. |
| 5,152,028 | A | 10/1992 | Hirano | 5,537,711 A | 7/1996 | Tseng |
| 5,152,202 | A | 10/1992 | Strauss | 5,539,953 A | 7/1996 | Kurz |
| 5,155,684 | A | 10/1992 | Burke et al. | 5,542,146 A | 8/1996 | Hoekstra et al. |
| 5,163,202 | A | 11/1992 | Kawakami et al. | 5,542,148 A | 8/1996 | Young |
| 5,163,320 | A | 11/1992 | Goshima et al. | 5,546,631 A | 8/1996 | Chambon |
| 5,164,579 | A | 11/1992 | Pryor et al. | 5,548,511 A | 8/1996 | Bancroft |
| 5,165,064 | A | 11/1992 | Mattaboni | 5,551,525 A | 9/1996 | Pack et al. |
| 5,170,352 | A | 12/1992 | McTamaney et al. | 5,553,349 A | 9/1996 | Kilstrom et al. |
| 5,173,881 | A | 12/1992 | Sindle | 5,555,587 A | 9/1996 | Guha |
| 5,182,833 | A | 2/1993 | Yamaguhi et al. | 5,560,077 A | 10/1996 | Crotchett |
| 5,202,742 | A | 4/1993 | Frank et al. | 5,568,589 A | 10/1996 | Hwang |
| 5,204,814 | A | 4/1993 | Noonan et al. | D375,592 S | 11/1996 | Ljunggren |
| 5,206,500 | A | 4/1993 | Decker et al. | 5,608,306 A | 3/1997 | Rybeck et al. |
| 5,208,521 | A | 5/1993 | Aoyama | 5,608,894 A | 3/1997 | Kawakami et al. |
| 5,216,777 | A | 6/1993 | Moro et al. | 5,608,944 A | 3/1997 | Gordon |
| 5,222,786 | A | 6/1993 | Sovis et al. | 5,610,488 A | 3/1997 | Miyazawa |
| 5,227,985 | A | 7/1993 | DeMenthon | 5,611,106 A | 3/1997 | Wulff |
| 5,233,682 | A | 8/1993 | Abe et al. | 5,611,108 A | 3/1997 | Knowlton et al. |
| 5,239,720 | A | 8/1993 | Wood et al. | 5,613,261 A | 3/1997 | Kawakami et al. |
| 5,251,358 | A | 10/1993 | Moro et al. | 5,613,269 A | 3/1997 | Miwa |
| 5,261,139 | A | 11/1993 | Lewis | 5,621,291 A | 4/1997 | Lee |
| 5,276,618 | A | 1/1994 | Everett | 5,622,236 A | 4/1997 | Azumi et al. |
| 5,276,939 | A | 1/1994 | Uenishi | 5,634,237 A | 6/1997 | Paranjpe |
| 5,277,064 | A | 1/1994 | Knigga et al. | 5,634,239 A | 6/1997 | Tuvin et al. |
| 5,279,672 | A | 1/1994 | Betker et al. | 5,636,402 A | 6/1997 | Kubo et al. |
| 5,284,452 | A | 2/1994 | Corona | 5,642,299 A | 6/1997 | Hardin et al. |
| 5,284,522 | A | 2/1994 | Kobayashi et al. | 5,646,494 A | 7/1997 | Han |
| 5,293,955 | A | 3/1994 | Lee | 5,647,554 A | 7/1997 | Ikegami et al. |
| D345,707 | S | 4/1994 | Alister | 5,650,702 A | 7/1997 | Azumi |
| 5,303,448 | A | 4/1994 | Hennessey et al. | 5,652,489 A | 7/1997 | Kawakami |
| 5,307,273 | A | 4/1994 | Oh et al. | 5,682,313 A | 10/1997 | Edlund et al. |
| 5,309,592 | A | 5/1994 | Hiratsuka | 5,682,839 A | 11/1997 | Grimsley et al. |
| 5,310,379 | A | 5/1994 | Hippely et al. | 5,696,675 A | 12/1997 | Nakamura et al. |
| 5,315,227 | A | 5/1994 | Pierson et al. | 5,698,861 A | 12/1997 | Oh |
| 5,319,827 | A | 6/1994 | Yang | 5,709,007 A | 1/1998 | Chiang |
| 5,319,828 | A | 6/1994 | Waldhauser et al. | 5,710,506 A | 1/1998 | Broell et al. |
| 5,321,614 | A | 6/1994 | Ashworth | 5,714,119 A | 2/1998 | Kawagoe et al. |
| 5,323,483 | A | 6/1994 | Baeg | 5,717,169 A | 2/1998 | Liang et al. |
| 5,324,948 | A | 6/1994 | Dudar et al. | 5,717,484 A | 2/1998 | Hamaguchi et al. |
| 5,331,713 | A | 7/1994 | Tipton | 5,720,077 A | 2/1998 | Nakamura et al. |
| 5,341,186 | A | 8/1994 | Kato | 5,732,401 A | 3/1998 | Conway |
| 5,341,540 | A | 8/1994 | Soupert et al. | 5,735,017 A | 4/1998 | Barnes et al. |
| 5,341,549 | A | 8/1994 | Wirtz et al. | 5,735,959 A | 4/1998 | Kubo et al. |
| 5,345,649 | A | 9/1994 | Whitlow | 5,742,975 A | 4/1998 | Knowlton et al. |
| 5,353,224 | A | 10/1994 | Lee et al. | 5,745,235 A | 4/1998 | Vercammen et al. |
| 5,363,305 | A | 11/1994 | Cox et al. | 5,752,871 A | 5/1998 | Tsuzuki |
| 5,363,935 | A | 11/1994 | Schempf et al. | 5,756,904 A | 5/1998 | Oreper et al. |
| 5,369,347 | A | 11/1994 | Yoo | 5,761,762 A | 6/1998 | Kubo et al. |
| 5,369,838 | A | 12/1994 | Wood et al. | 5,764,888 A | 6/1998 | Bolan et al. |
| 5,386,862 | A | 2/1995 | Glover et al. | 5,767,437 A | 6/1998 | Rogers |
| 5,399,951 | A | 3/1995 | Lavallee et al. | 5,767,960 A | 6/1998 | Orman |
| 5,400,244 | A | 3/1995 | Watanabe et al. | 5,777,596 A | 7/1998 | Herbert |
| 5,404,612 | A | 4/1995 | Ishikawa | 5,778,486 A | 7/1998 | Kim |
| 5,410,479 | A | 4/1995 | Coker | 5,781,697 A | 7/1998 | Jeong |
| 5,435,405 | A | 7/1995 | Schempf et al. | 5,781,960 A | 7/1998 | Kilstrom et al. |
| 5,440,216 | A * | 8/1995 | Kim ............... 318/587 | 5,784,755 A | 7/1998 | Karr et al. |
| 5,442,358 | A | 8/1995 | Keeler et al. | 5,786,602 A | 7/1998 | Pryor et al. |
| 5,444,965 | A | 8/1995 | Colens | 5,787,545 A | 8/1998 | Colens |
| 5,446,356 | A | 8/1995 | Kim | 5,793,900 A | 8/1998 | Nourbakhsh et al. |
| 5,446,445 | A | 8/1995 | Bloomfield et al. | 5,794,297 A | 8/1998 | Muta |

| | | | | | |
|---|---|---|---|---|---|
| 5,802,665 A | 9/1998 | Knowlton et al. | 6,061,868 A | 5/2000 | Moritsch et al. |
| 5,812,267 A | 9/1998 | Everett, Jr. et al. | 6,065,182 A | 5/2000 | Wright et al. |
| 5,814,808 A | 9/1998 | Takada et al. | 6,070,290 A | 6/2000 | Schwarze et al. |
| 5,815,880 A | 10/1998 | Nakanishi | 6,073,432 A | 6/2000 | Schaedler |
| 5,815,884 A | 10/1998 | Imamura et al. | 6,076,025 A | 6/2000 | Ueno et al. |
| 5,819,008 A | 10/1998 | Asama et al. | 6,076,026 A | 6/2000 | Jambhekar et al. |
| 5,819,360 A | 10/1998 | Fujii et al. | 6,076,226 A | 6/2000 | Reed |
| 5,819,936 A | 10/1998 | Saveliev et al. | 6,076,227 A | 6/2000 | Schallig et al. |
| 5,820,821 A | 10/1998 | Kawagoe et al. | 6,081,257 A | 6/2000 | Zeller |
| 5,821,730 A | 10/1998 | Drapkin | 6,088,020 A | 7/2000 | Mor |
| 5,825,981 A | 10/1998 | Matsuda | 6,094,775 A | 8/2000 | Behmer |
| 5,828,770 A | 10/1998 | Leis et al. | 6,099,091 A | 8/2000 | Campbell |
| 5,831,597 A | 11/1998 | West et al. | 6,101,670 A | 8/2000 | Song |
| 5,836,045 A | 11/1998 | Anthony et al. | 6,101,671 A | 8/2000 | Wright et al. |
| 5,839,156 A | 11/1998 | Park et al. | 6,108,031 A | 8/2000 | King et al. |
| 5,839,532 A | 11/1998 | Yoshiji et al. | 6,108,067 A | 8/2000 | Okamoto |
| 5,841,259 A | 11/1998 | Kim et al. | 6,108,076 A | 8/2000 | Hanseder |
| 5,867,800 A | 2/1999 | Leif | 6,108,269 A | 8/2000 | Kabel |
| 5,869,910 A | 2/1999 | Colens | 6,108,597 A | 8/2000 | Kirchner et al. |
| 5,894,621 A | 4/1999 | Kubo | 6,108,859 A | 8/2000 | Burgoon |
| 5,896,611 A | 4/1999 | Haaga | 6,112,143 A | 8/2000 | Allen et al. |
| 5,903,124 A | 5/1999 | Kawakami | 6,112,996 A | 9/2000 | Matsuo |
| 5,905,209 A | 5/1999 | Oreper | 6,119,057 A | 9/2000 | Kawagoe |
| 5,907,886 A | 6/1999 | Buscher | 6,122,798 A | 9/2000 | Kobayashi et al. |
| 5,910,700 A | 6/1999 | Crotzer | 6,124,694 A | 9/2000 | Bancroft et al. |
| 5,911,260 A | 6/1999 | Suzuki | 6,125,498 A | 10/2000 | Roberts et al. |
| 5,916,008 A | 6/1999 | Wong | 6,131,237 A | 10/2000 | Kasper et al. |
| 5,924,167 A | 7/1999 | Wright et al. | 6,138,063 A | 10/2000 | Himeda |
| 5,926,909 A | 7/1999 | McGee | 6,142,252 A | 11/2000 | Kinto et al. |
| 5,933,102 A | 8/1999 | Miller et al. | 6,146,041 A | 11/2000 | Chen et al. |
| 5,933,913 A | 8/1999 | Wright et al. | 6,146,278 A | 11/2000 | Kobayashi |
| 5,935,179 A | 8/1999 | Kleiner et al. | 6,154,279 A | 11/2000 | Thayer |
| 5,935,333 A | 8/1999 | Davis | 6,154,694 A | 11/2000 | Aoki et al. |
| 5,940,346 A | 8/1999 | Sadowsky et al. | 6,160,479 A | 12/2000 | Ahlén et al. |
| 5,940,927 A | 8/1999 | Haegermarck et al. | 6,167,332 A | 12/2000 | Kurtzberg et al. |
| 5,940,930 A | 8/1999 | Oh et al. | 6,167,587 B1 | 1/2001 | Kasper et al. |
| 5,942,869 A | 8/1999 | Katou et al. | 6,192,548 B1 | 2/2001 | Huffman |
| 5,943,730 A | 8/1999 | Boomgaarden | 6,192,549 B1 | 2/2001 | Kasen et al. |
| 5,943,733 A | 8/1999 | Tagliaferri | 6,202,243 B1 | 3/2001 | Beaufoy et al. |
| 5,943,933 A | 8/1999 | Evans et al. | 6,216,307 B1 | 4/2001 | Kaleta et al. |
| 5,947,225 A | 9/1999 | Kawakami et al. | 6,220,865 B1 | 4/2001 | Macri et al. |
| 5,950,408 A | 9/1999 | Schaedler | 6,226,830 B1 | 5/2001 | Hendriks et al. |
| 5,959,423 A | 9/1999 | Nakanishi et al. | 6,230,362 B1 | 5/2001 | Kasper et al. |
| 5,968,281 A | 10/1999 | Wright et al. | 6,237,741 B1 | 5/2001 | Guidetti |
| 5,974,348 A | 10/1999 | Rocks | 6,240,342 B1 | 5/2001 | Fiegert et al. |
| 5,974,365 A | 10/1999 | Mitchell | 6,243,913 B1 | 6/2001 | Frank et al. |
| 5,983,448 A | 11/1999 | Wright et al. | 6,255,793 B1 | 7/2001 | Peless et al. |
| 5,984,880 A | 11/1999 | Lander et al. | 6,259,979 B1 | 7/2001 | Holmquist |
| 5,987,383 A | 11/1999 | Keller et al. | 6,261,379 B1 | 7/2001 | Conrad et al. |
| 5,989,700 A | 11/1999 | Krivopal | 6,263,539 B1 | 7/2001 | Baig |
| 5,991,951 A | 11/1999 | Kubo et al. | 6,263,989 B1 | 7/2001 | Won |
| 5,995,883 A | 11/1999 | Nishikado | 6,272,936 B1 | 8/2001 | Oreper et al. |
| 5,995,884 A | 11/1999 | Allen et al. | 6,276,378 B1 * | 8/2001 | Taniyama et al. ............ 134/153 |
| 5,996,167 A | 12/1999 | Close | 6,276,478 B1 | 8/2001 | Hopkins et al. |
| 5,998,953 A | 12/1999 | Nakamura et al. | 6,278,918 B1 | 8/2001 | Dickson et al. |
| 5,998,971 A | 12/1999 | Corbridge | 6,279,196 B2 | 8/2001 | Kasen et al. |
| 6,000,088 A | 12/1999 | Wright et al. | 6,282,526 B1 | 8/2001 | Ganesh |
| 6,009,358 A | 12/1999 | Angott et al. | 6,283,034 B1 | 9/2001 | Miles |
| 6,012,618 A | 1/2000 | Matsuo et al. | 6,285,778 B1 | 9/2001 | Nakajima et al. |
| 6,021,545 A | 2/2000 | Delgado et al. | 6,285,930 B1 | 9/2001 | Dickson et al. |
| 6,023,813 A | 2/2000 | Thatcher et al. | 6,286,181 B1 | 9/2001 | Kasper et al. |
| 6,023,814 A | 2/2000 | Imamura | 6,300,737 B1 | 10/2001 | Bergvall et al. |
| 6,025,687 A | 2/2000 | Himeda et al. | 6,321,337 B1 | 11/2001 | Reshef et al. |
| 6,026,539 A | 2/2000 | Mouw et al. | 6,321,515 B1 | 11/2001 | Colens |
| 6,030,464 A | 2/2000 | Azevedo | 6,323,570 B1 | 11/2001 | Nishimura et al. |
| 6,030,465 A | 2/2000 | Marcussen et al. | 6,324,714 B1 | 12/2001 | Walz et al. |
| 6,032,327 A | 3/2000 | Oka et al. | 6,327,741 B1 | 12/2001 | Reed |
| 6,032,542 A | 3/2000 | Warnick et al. | 6,332,400 B1 | 12/2001 | Meyer |
| 6,036,572 A | 3/2000 | Sze | 6,339,735 B1 | 1/2002 | Peless et al. |
| 6,038,501 A | 3/2000 | Kawakami | 6,362,875 B1 | 3/2002 | Burkley |
| 6,040,669 A | 3/2000 | Hog | 6,370,453 B2 | 4/2002 | Sommer |
| 6,041,471 A | 3/2000 | Charky et al. | 6,374,155 B1 | 4/2002 | Wallach et al. |
| 6,041,472 A | 3/2000 | Kasen et al. | 6,374,157 B1 | 4/2002 | Takamura |
| 6,046,800 A | 4/2000 | Ohtomo et al. | 6,381,802 B2 | 5/2002 | Park |
| 6,049,620 A | 4/2000 | Dickinson et al. | 6,385,515 B1 | 5/2002 | Dickson et al. |
| 6,050,648 A | 4/2000 | Keleny | 6,388,013 B1 | 5/2002 | Saraf et al. |
| 6,052,821 A | 4/2000 | Chouly et al. | 6,389,329 B1 | 5/2002 | Colens |
| 6,055,042 A | 4/2000 | Sarangapani | 6,397,429 B1 | 6/2002 | Legatt et al. |
| 6,055,702 A | 5/2000 | Imamura et al. | 6,400,048 B1 | 6/2002 | Nishimura et al. |

| | | |
|---|---|---|
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,418,586 B2 | 7/2002 | Fulghum |
| 6,421,870 B1 | 7/2002 | Basham et al. |
| 6,427,285 B1 | 8/2002 | Leggatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,442,789 B1 | 9/2002 | Legatt et al. |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 | 11/2002 | Kirkpatrick et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,519,808 B2 | 2/2003 | Legatt et al. |
| 6,525,509 B1 | 2/2003 | Petersson et al. |
| D471,243 S | 3/2003 | Cioffi et al. |
| 6,530,102 B1 | 3/2003 | Pierce et al. |
| 6,530,117 B2 | 3/2003 | Peterson |
| 6,532,404 B2 | 3/2003 | Colens |
| 6,535,793 B2 | 3/2003 | Allard |
| 6,540,424 B1 | 4/2003 | Hall et al. |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney, Jr. et al. |
| 6,594,844 B2 | 7/2003 | Jones |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 | 8/2003 | Clark et al. |
| 6,609,269 B2 | 8/2003 | Kasper |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,434 B1 | 9/2003 | Davis et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,633,150 B1 | 10/2003 | Wallach et al. |
| 6,637,546 B1 | 10/2003 | Wang |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed, Jr. |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,671,925 B2 | 1/2004 | Field et al. |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,705,332 B2 | 3/2004 | Field et al. |
| 6,711,280 B2 | 3/2004 | Stafsudd et al. |
| 6,732,826 B2 | 5/2004 | Song et al. |
| 6,735,811 B2 | 5/2004 | Field et al. |
| 6,735,812 B2 | 5/2004 | Hekman et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,810,350 B2 * | 10/2004 | Blakley ................. 702/130 |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,848,146 B2 | 2/2005 | Wright et al. |
| 6,854,148 B1 | 2/2005 | Rief et al. |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiappetta et al. |
| 7,024,280 B2 | 4/2006 | Parker et al. |
| 7,027,893 B2 | 4/2006 | Perry et al. |

| | | | | | | |
|---|---|---|---|---|---|---|
| 7,030,768 B2 | 4/2006 | Wanie | | 7,663,333 B2 | 2/2010 | Jones et al. |
| 7,031,805 B2 | 4/2006 | Lee et al. | | 7,693,605 B2 | 4/2010 | Park |
| 7,032,469 B2 | 4/2006 | Bailey | | 7,706,917 B1 | 4/2010 | Chiappetta et al. |
| 7,040,869 B2 | 5/2006 | Beenker | | 6,925,357 C1 | 5/2010 | Wang et al. |
| 7,051,399 B2 | 5/2006 | Filed et al. | | 7,761,954 B2 | 7/2010 | Ziegler et al. |
| 7,053,578 B2 | 5/2006 | Diehl et al. | | 7,765,635 B2 | 8/2010 | Park |
| 7,054,716 B2 | 5/2006 | McKee et al. | | 7,784,147 B2 | 8/2010 | Burkholder et al. |
| 7,055,210 B2 | 6/2006 | Keppler et al. | | 7,801,645 B2 | 9/2010 | Taylor et al. |
| 7,057,120 B2 | 6/2006 | Ma et al. | | 7,805,220 B2 | 9/2010 | Taylor et al. |
| 7,057,643 B2 | 6/2006 | Iida et al. | | 7,809,944 B2 | 10/2010 | Kawamoto |
| 7,059,012 B2 | 6/2006 | Song et al. | | 7,832,048 B2 | 11/2010 | Harwig et al. |
| 7,065,430 B2 | 6/2006 | Naka et al. | | 7,849,555 B2 | 12/2010 | Hahm et al. |
| 7,066,291 B2 | 6/2006 | Martins et al. | | 7,853,645 B2 | 12/2010 | Brown et al. |
| 7,069,124 B1 | 6/2006 | Whittaker et al. | | 7,920,941 B2 | 4/2011 | Park et al. |
| 7,079,923 B2 * | 7/2006 | Abramson et al. ............ 700/245 | | 7,937,800 B2 | 5/2011 | Yan |
| 7,085,623 B2 | 8/2006 | Siegers | | 7,957,836 B2 | 6/2011 | Myeong et al. |
| 7,085,624 B2 | 8/2006 | Aldred et al. | | 2001/0004719 A1 | 6/2001 | Sommer |
| 7,113,847 B2 * | 9/2006 | Chmura et al. ............... 700/245 | | 2001/0013929 A1 | 8/2001 | Torsten |
| 7,133,746 B2 | 11/2006 | Abramson et al. | | 2001/0020200 A1 | 9/2001 | Das et al. |
| 7,142,198 B2 | 11/2006 | Lee | | 2001/0025183 A1 | 9/2001 | Shahidi |
| 7,148,458 B2 | 12/2006 | Schell et al. | | 2001/0037163 A1 | 11/2001 | Allard |
| 7,155,308 B2 | 12/2006 | Jones | | 2001/0043509 A1 | 11/2001 | Green et al. |
| 7,167,775 B2 * | 1/2007 | Abramson et al. ............ 700/245 | | 2001/0045883 A1 | 11/2001 | Holdaway et al. |
| 7,171,285 B2 | 1/2007 | Kim et al. | | 2001/0047231 A1 | 11/2001 | Peless et al. |
| 7,173,391 B2 | 2/2007 | Jones et al. | | 2001/0047895 A1 | 12/2001 | De Fazio et al. |
| 7,174,238 B1 | 2/2007 | Zweig | | 2002/0011367 A1 | 1/2002 | Kolesnik |
| 7,188,000 B2 | 3/2007 | Chiappetta et al. | | 2002/0011813 A1 | 1/2002 | Koselka et al. |
| 7,193,384 B1 | 3/2007 | Norman et al. | | 2002/0016649 A1 | 2/2002 | Jones |
| 7,196,487 B2 | 3/2007 | Jones et al. | | 2002/0021219 A1 | 2/2002 | Edwards |
| 7,201,786 B2 | 4/2007 | Wegelin et al. | | 2002/0027652 A1 | 3/2002 | Paromtchik et al. |
| 7,206,677 B2 | 4/2007 | Huldén | | 2002/0036779 A1 | 3/2002 | Kiyoi et al. |
| 7,211,980 B1 | 5/2007 | Bruemmer et al. | | 2002/0081937 A1 | 6/2002 | Yamada et al. |
| 7,225,500 B2 | 6/2007 | Diehl et al. | | 2002/0095239 A1 | 7/2002 | Wallach et al. |
| 7,246,405 B2 | 7/2007 | Yan | | 2002/0097400 A1 | 7/2002 | Jung et al. |
| 7,248,951 B2 | 7/2007 | Hulden | | 2002/0104963 A1 | 8/2002 | Mancevski |
| 7,275,280 B2 | 10/2007 | Haegermarck et al. | | 2002/0108209 A1 | 8/2002 | Peterson |
| 7,283,892 B1 | 10/2007 | Boillot et al. | | 2002/0112742 A1 | 8/2002 | Bredo et al. |
| 7,288,912 B2 | 10/2007 | Landry et al. | | 2002/0113973 A1 | 8/2002 | Ge |
| 7,318,248 B1 | 1/2008 | Yan | | 2002/0116089 A1 | 8/2002 | Kirkpatrick |
| 7,320,149 B1 | 1/2008 | Huffman et al. | | 2002/0120364 A1 | 8/2002 | Colens |
| 7,321,807 B2 * | 1/2008 | Laski ........................... 700/245 | | 2002/0124343 A1 | 9/2002 | Reed |
| 7,324,870 B2 | 1/2008 | Lee | | 2002/0153185 A1 | 10/2002 | Song et al. |
| 7,328,196 B2 | 2/2008 | Peters | | 2002/0156556 A1 | 10/2002 | Ruffner |
| 7,332,890 B2 | 2/2008 | Cohen et al. | | 2002/0159051 A1 | 10/2002 | Guo |
| 7,346,428 B1 * | 3/2008 | Huffman et al. .............. 700/245 | | 2002/0166193 A1 | 11/2002 | Kasper |
| 7,352,153 B2 | 4/2008 | Yan | | 2002/0169521 A1 | 11/2002 | Goodman et al. |
| 7,359,766 B2 | 4/2008 | Jeon et al. | | 2002/0173877 A1 | 11/2002 | Zweig |
| 7,360,277 B2 | 4/2008 | Moshenrose et al. | | 2002/0189871 A1 | 12/2002 | Won |
| 7,363,108 B2 | 4/2008 | Noda et al. | | 2003/0009259 A1 | 1/2003 | Hattori et al. |
| 7,388,879 B2 | 6/2008 | Sabe et al. | | 2003/0015232 A1 | 1/2003 | Nguyen |
| 7,389,156 B2 * | 6/2008 | Ziegler et al. ................. 700/245 | | 2003/0019071 A1 | 1/2003 | Field et al. |
| 7,389,166 B2 | 6/2008 | Harwig et al. | | 2003/0023356 A1 | 1/2003 | Keable |
| 7,408,157 B2 | 8/2008 | Yan | | 2003/0024986 A1 | 2/2003 | Mazz et al. |
| 7,418,762 B2 * | 9/2008 | Arai et al. ....................... 15/319 | | 2003/0025472 A1 | 2/2003 | Jones et al. |
| 7,430,455 B2 | 9/2008 | Casey et al. | | 2003/0028286 A1 | 2/2003 | Glenn et al. |
| 7,430,462 B2 | 9/2008 | Chiu et al. | | 2003/0030399 A1 | 2/2003 | Jacobs |
| 7,441,298 B2 | 10/2008 | Svendsen et al. | | 2003/0058262 A1 | 3/2003 | Sato et al. |
| 7,444,206 B2 | 10/2008 | Abramson et al. | | 2003/0060928 A1 | 3/2003 | Abramson et al. |
| 7,448,113 B2 | 11/2008 | Jones et al. | | 2003/0067451 A1 | 4/2003 | Tagg et al. |
| 7,459,871 B2 | 12/2008 | Landry et al. | | 2003/0097875 A1 | 5/2003 | Lentz et al. |
| 7,467,026 B2 | 12/2008 | Sakagami et al. | | 2003/0120389 A1 | 6/2003 | Abramson et al. |
| 7,474,941 B2 | 1/2009 | Kim et al. | | 2003/0124312 A1 | 7/2003 | Autumn |
| 7,503,096 B2 | 3/2009 | Lin | | 2003/0126352 A1 | 7/2003 | Barrett |
| 7,515,991 B2 | 4/2009 | Egawa et al. | | 2003/0137268 A1 | 7/2003 | Papanikolopoulos et al. |
| 7,539,557 B2 | 5/2009 | Yamauchi | | 2003/0146384 A1 | 8/2003 | Logsdon et al. |
| 7,555,363 B2 | 6/2009 | Augenbraun et al. | | 2003/0159232 A1 | 8/2003 | Hekman et al. |
| 7,557,703 B2 | 7/2009 | Yamada et al. | | 2003/0168081 A1 | 9/2003 | Lee et al. |
| 7,568,259 B2 | 8/2009 | Yan | | 2003/0175138 A1 | 9/2003 | Beenker |
| 7,571,511 B2 | 8/2009 | Jones et al. | | 2003/0192144 A1 * | 10/2003 | Song et al. ....................... 15/346 |
| 7,578,020 B2 | 8/2009 | Jaworski et al. | | 2003/0193657 A1 | 10/2003 | Uomori et al. |
| 7,600,521 B2 | 10/2009 | Woo | | 2003/0216834 A1 | 11/2003 | Allard |
| 7,603,744 B2 | 10/2009 | Reindle | | 2003/0221114 A1 | 11/2003 | Hino et al. |
| 7,611,583 B2 | 11/2009 | Buckley et al. | | 2003/0229421 A1 * | 12/2003 | Chmura et al. ............... 700/245 |
| 7,617,557 B2 | 11/2009 | Reindle | | 2003/0229474 A1 | 12/2003 | Suzuki et al. |
| 7,620,476 B2 | 11/2009 | Morse et al. | | 2003/0233171 A1 | 12/2003 | Heiligensetzer |
| 7,636,982 B2 | 12/2009 | Jones et al. | | 2003/0233177 A1 | 12/2003 | Johnson et al. |
| 7,647,144 B2 | 1/2010 | Haegermarck | | 2003/0233870 A1 | 12/2003 | Mancevski |
| 7,650,666 B2 | 1/2010 | Jang | | 2003/0233930 A1 | 12/2003 | Ozick |
| 7,660,650 B2 | 2/2010 | Kawagoe et al. | | 2004/0016077 A1 * | 1/2004 | Song et al. ....................... 15/319 |

| | | | | | | |
|---|---|---|---|---|---|---|
| 2004/0020000 A1 | 2/2004 | Jones | | 2005/0212929 A1 | 9/2005 | Schell et al. |
| 2004/0030448 A1 | 2/2004 | Solomon | | 2005/0213082 A1 | 9/2005 | DiBernardo et al. |
| 2004/0030449 A1 | 2/2004 | Solomon | | 2005/0213109 A1 | 9/2005 | Schell et al. |
| 2004/0030450 A1 | 2/2004 | Solomon | | 2005/0217042 A1 | 10/2005 | Reindle |
| 2004/0030451 A1 | 2/2004 | Solomon | | 2005/0218852 A1 | 10/2005 | Landry et al. |
| 2004/0030570 A1 | 2/2004 | Solomon | | 2005/0222933 A1 | 10/2005 | Wesby |
| 2004/0030571 A1 | 2/2004 | Solomon | | 2005/0229340 A1 | 10/2005 | Sawalski et al. |
| 2004/0031113 A1 | 2/2004 | Wosewick et al. | | 2005/0229355 A1 | 10/2005 | Crouch et al. |
| 2004/0049877 A1 | 3/2004 | Jones et al. | | 2005/0235451 A1 | 10/2005 | Yan |
| 2004/0055163 A1 | 3/2004 | McCambridge et al. | | 2005/0251292 A1 | 11/2005 | Casey et al. |
| 2004/0068351 A1 | 4/2004 | Solomon | | 2005/0255425 A1 | 11/2005 | Pierson |
| 2004/0068415 A1 | 4/2004 | Solomon | | 2005/0258154 A1 | 11/2005 | Blankenship et al. |
| 2004/0068416 A1 | 4/2004 | Solomon | | 2005/0273967 A1 | 12/2005 | Taylor et al. |
| 2004/0074038 A1 | 4/2004 | Im et al. | | 2005/0288819 A1 | 12/2005 | de Guzman |
| 2004/0074044 A1 | 4/2004 | Diehl et al. | | 2006/0000050 A1 | 1/2006 | Cipolla et al. |
| 2004/0076324 A1 | 4/2004 | Burl et al. | | 2006/0009879 A1 | 1/2006 | Lynch et al. |
| 2004/0083570 A1 | 5/2004 | Song et al. | | 2006/0010638 A1 | 1/2006 | Shimizu et al. |
| 2004/0085037 A1 | 5/2004 | Jones et al. | | 2006/0020369 A1 | 1/2006 | Taylor et al. |
| 2004/0088079 A1 | 5/2004 | Lavarec et al. | | 2006/0020370 A1 | 1/2006 | Abramson |
| 2004/0093122 A1 | 5/2004 | Galibraith | | 2006/0021168 A1 | 2/2006 | Nishikawa |
| 2004/0098167 A1 | 5/2004 | Yi et al. | | 2006/0025134 A1 | 2/2006 | Cho et al. |
| 2004/0111184 A1 | 6/2004 | Chiappetta et al. | | 2006/0037170 A1 | 2/2006 | Shimizu |
| 2004/0111821 A1 | 6/2004 | Lenkiewicz et al. | | 2006/0042042 A1 | 3/2006 | Mertes et al. |
| 2004/0113777 A1 | 6/2004 | Matsuhira et al. | | 2006/0044546 A1 | 3/2006 | Lewin et al. |
| 2004/0117064 A1 | 6/2004 | McDonald | | 2006/0060216 A1 | 3/2006 | Woo |
| 2004/0117846 A1 | 6/2004 | Karaoguz et al. | | 2006/0061657 A1 | 3/2006 | Rew et al. |
| 2004/0118998 A1 | 6/2004 | Wingett et al. | | 2006/0064828 A1 | 3/2006 | Stein et al. |
| 2004/0128028 A1 | 7/2004 | Miyamoto et al. | | 2006/0087273 A1 | 4/2006 | Ko et al. |
| 2004/0133316 A1 | 7/2004 | Dean | | 2006/0089765 A1 | 4/2006 | Pack et al. |
| 2004/0134336 A1 | 7/2004 | Solomon | | 2006/0100741 A1 | 5/2006 | Jung |
| 2004/0134337 A1 | 7/2004 | Solomon | | 2006/0107894 A1 | 5/2006 | Buckley et al. |
| 2004/0143919 A1 | 7/2004 | Wilder | | 2006/0119839 A1 | 6/2006 | Bertin et al. |
| 2004/0148419 A1 | 7/2004 | Chen et al. | | 2006/0143295 A1 | 6/2006 | Costa et al. |
| 2004/0148731 A1 | 8/2004 | Damman et al. | | 2006/0146776 A1 | 7/2006 | Kim |
| 2004/0153212 A1 | 8/2004 | Profio et al. | | 2006/0150361 A1* | 7/2006 | Aldred et al. .................. 15/319 |
| 2004/0156541 A1 | 8/2004 | Jeon et al. | | 2006/0184293 A1* | 8/2006 | Konandreas et al. .......... 701/23 |
| 2004/0158357 A1 | 8/2004 | Lee et al. | | 2006/0185690 A1 | 8/2006 | Song et al. |
| 2004/0181706 A1 | 9/2004 | Chen et al. | | 2006/0190133 A1 | 8/2006 | Konandreas et al. |
| 2004/0187249 A1 | 9/2004 | Jones et al. | | 2006/0190146 A1* | 8/2006 | Morse et al. .................... 701/23 |
| 2004/0187457 A1 | 9/2004 | Colens | | 2006/0196003 A1 | 9/2006 | Song et al. |
| 2004/0196451 A1 | 10/2004 | Aoyama | | 2006/0200281 A1* | 9/2006 | Ziegler et al. .................. 701/23 |
| 2004/0200505 A1 | 10/2004 | Taylor et al. | | 2006/0220900 A1 | 10/2006 | Ceskutti et al. |
| 2004/0204792 A1 | 10/2004 | Taylor et al. | | 2006/0259194 A1 | 11/2006 | Chiu |
| 2004/0210345 A1 | 10/2004 | Noda et al. | | 2006/0278161 A1 | 12/2006 | Burkholder et al. |
| 2004/0210347 A1 | 10/2004 | Sawada et al. | | 2006/0288519 A1 | 12/2006 | Jaworski et al. |
| 2004/0211444 A1 | 10/2004 | Taylor et al. | | 2006/0293787 A1 | 12/2006 | Kanda et al. |
| 2004/0221790 A1 | 11/2004 | Sinclair et al. | | 2007/0006404 A1 | 1/2007 | Cheng et al. |
| 2004/0236468 A1 | 11/2004 | Taylor et al. | | 2007/0016328 A1* | 1/2007 | Ziegler et al. ................ 700/245 |
| 2004/0244138 A1 | 12/2004 | Taylor et al. | | 2007/0017061 A1 | 1/2007 | Yan |
| 2004/0255425 A1 | 12/2004 | Arai et al. | | 2007/0028574 A1 | 2/2007 | Yan |
| 2005/0000543 A1 | 1/2005 | Taylor et al. | | 2007/0032904 A1 | 2/2007 | Kawagoe et al. |
| 2005/0010330 A1 | 1/2005 | Abramson et al. | | 2007/0042716 A1 | 2/2007 | Goodall et al. |
| 2005/0010331 A1 | 1/2005 | Taylor et al. | | 2007/0043459 A1 | 2/2007 | Abbott et al. |
| 2005/0021181 A1 | 1/2005 | Kim et al. | | 2007/0061041 A1 | 3/2007 | Zweig |
| 2005/0028316 A1 | 2/2005 | Thomas et al. | | 2007/0114975 A1 | 5/2007 | Cohen et al. |
| 2005/0053912 A1 | 3/2005 | Roth et al. | | 2007/0142964 A1* | 6/2007 | Abramson .................... 700/245 |
| 2005/0055796 A1 | 3/2005 | Wright et al. | | 2007/0150096 A1 | 6/2007 | Yeh et al. |
| 2005/0067994 A1 | 3/2005 | Jones et al. | | 2007/0156286 A1 | 7/2007 | Yamauchi |
| 2005/0081782 A1 | 4/2005 | Buckley et al. | | 2007/0157415 A1 | 7/2007 | Lee et al. |
| 2005/0085947 A1 | 4/2005 | Aldred et al. | | 2007/0157420 A1 | 7/2007 | Lee et al. |
| 2005/0091782 A1 | 5/2005 | Gordon et al. | | 2007/0179670 A1 | 8/2007 | Chiappetta et al. |
| 2005/0091786 A1 | 5/2005 | Wright et al. | | 2007/0226949 A1 | 10/2007 | Hahm et al. |
| 2005/0137749 A1 | 6/2005 | Jeon et al. | | 2007/0234492 A1 | 10/2007 | Svendsen et al. |
| 2005/0144751 A1 | 7/2005 | Kegg et al. | | 2007/0244610 A1 | 10/2007 | Ozick et al. |
| 2005/0150074 A1 | 7/2005 | Diehl et al. | | 2007/0250212 A1 | 10/2007 | Halloran et al. |
| 2005/0150519 A1 | 7/2005 | Keppler et al. | | 2007/0261193 A1 | 11/2007 | Gordon et al. |
| 2005/0154795 A1 | 7/2005 | Kuz et al. | | 2007/0266508 A1 | 11/2007 | Jones et al. |
| 2005/0156562 A1 | 7/2005 | Cohen et al. | | 2008/0007203 A1 | 1/2008 | Cohen et al. |
| 2005/0165508 A1 | 7/2005 | Kanda et al. | | 2008/0039974 A1 | 2/2008 | Sandin et al. |
| 2005/0166354 A1 | 8/2005 | Uehigashi | | 2008/0052846 A1 | 3/2008 | Kapoor et al. |
| 2005/0166355 A1 | 8/2005 | Tani | | 2008/0091304 A1 | 4/2008 | Ozick et al. |
| 2005/0172445 A1 | 8/2005 | Diehl et al. | | 2008/0109126 A1 | 5/2008 | Sandin et al. |
| 2005/0183229 A1 | 8/2005 | Uehigashi | | 2008/0134458 A1 | 6/2008 | Ziegler et al. |
| 2005/0183230 A1 | 8/2005 | Uehigashi | | 2008/0140255 A1 | 6/2008 | Ziegler et al. |
| 2005/0187678 A1 | 8/2005 | Myeong et al. | | 2008/0155768 A1 | 7/2008 | Ziegler et al. |
| 2005/0192707 A1 | 9/2005 | Park et al. | | 2008/0184518 A1 | 8/2008 | Taylor |
| 2005/0204717 A1 | 9/2005 | Colens | | 2008/0276407 A1 | 11/2008 | Schnittman et al. |
| 2005/0209736 A1 | 9/2005 | Kawagoe | | 2008/0281470 A1 | 11/2008 | Gilbert, Jr. et al. |
| 2005/0211880 A1 | 9/2005 | Schell et al. | | 2008/0282494 A1 | 11/2008 | Won et al. |

| | | | | | | |
|---|---|---|---|---|---|---|
| 2008/0294288 A1 | 11/2008 | Yamauchi | | GB | 2417354 A | 2/2006 |
| 2008/0302586 A1 | 12/2008 | Yan | | JP | 53-021869 | 2/1978 |
| 2008/0307590 A1 | 12/2008 | Jones et al. | | JP | 53021869 U | 2/1978 |
| 2009/0007366 A1 | 1/2009 | Svendsen et al. | | JP | 53110257 A | 9/1978 |
| 2009/0038089 A1 | 2/2009 | Landry et al. | | JP | 53110257 A2 | 9/1978 |
| 2009/0049640 A1 | 2/2009 | Lee et al. | | JP | 943901 C | 3/1979 |
| 2009/0055022 A1 | 2/2009 | Casey et al. | | JP | 57014726 A2 | 1/1982 |
| 2009/0102296 A1 | 4/2009 | Greene et al. | | JP | 57064217 A | 4/1982 |
| 2009/0292393 A1 | 11/2009 | Casey et al. | | JP | 59005315 B | 2/1984 |
| 2010/0006028 A1 | 1/2010 | Buckley et al. | | JP | 59033511 U | 3/1984 |
| 2010/0011529 A1 | 1/2010 | Won et al. | | JP | 59094005 A | 5/1984 |
| 2010/0049365 A1 | 2/2010 | Jones et al. | | JP | 59099308 U | 7/1984 |
| 2010/0063628 A1 | 3/2010 | Landry et al. | | JP | 59033511 B | 8/1984 |
| 2010/0107355 A1 | 5/2010 | Won et al. | | JP | 59112311 U | 8/1984 |
| 2010/0257690 A1 | 10/2010 | Jones et al. | | JP | 59120124 U | 8/1984 |
| 2010/0257691 A1 | 10/2010 | Jones et al. | | JP | 59131668 U | 9/1984 |
| 2010/0263158 A1 | 10/2010 | Jones et al. | | JP | 59164973 A | 9/1984 |
| 2010/0268384 A1 | 10/2010 | Jones et al. | | JP | 59184917 A | 10/1984 |
| 2010/0312429 A1 | 12/2010 | Jones et al. | | JP | 2283343 A2 | 11/1984 |
| | | | | JP | 59212924 A | 12/1984 |
| FOREIGN PATENT DOCUMENTS | | | | JP | 59226909 A | 12/1984 |
| DE | 3317376 A1 | 11/1984 | | JP | 60089213 | 5/1985 |
| DE | 3536907 C2 | 2/1989 | | JP | 60089213 U | 6/1985 |
| DE | 3404202 C2 | 12/1992 | | JP | 60211510 A | 10/1985 |
| DE | 199311014 U1 | 10/1993 | | JP | 60259895 A | 12/1985 |
| DE | 4414683 A1 | 10/1995 | | JP | 61023221 A2 | 1/1986 |
| DE | 4338841 C2 | 8/1999 | | JP | 61097712 A | 5/1986 |
| DE | 19849978 | 2/2001 | | JP | 61023221 B | 6/1986 |
| DE | 19849978 C2 | 2/2001 | | JP | 61-160366 | 7/1986 |
| DE | 10242257 A1 | 4/2003 | | JP | 62074018 A | 4/1987 |
| DE | 102004038074 | 6/2005 | | JP | 62070709 U | 5/1987 |
| DE | 10357636 A1 | 7/2005 | | JP | 62-120510 | 6/1987 |
| DE | 102004041021 B3 | 8/2005 | | JP | 62-154008 | 7/1987 |
| DE | 102005046813 A1 | 4/2007 | | JP | 62-164431 | 7/1987 |
| DK | 198803389 A | 12/1988 | | JP | 62164431 U | 10/1987 |
| EP | 265542 A1 | 5/1988 | | JP | 62263507 A | 11/1987 |
| EP | 281085A2 A2 | 9/1988 | | JP | 62263508 A | 11/1987 |
| EP | 0286328 | 10/1988 | | JP | 62189057 U | 12/1987 |
| EP | 0 352 045 | 1/1990 | | JP | 63079623 A | 4/1988 |
| EP | 0 389 459 | 9/1990 | | JP | 63-183032 | 7/1988 |
| EP | 358628A3 A3 | 5/1991 | | JP | 63158032 A | 7/1988 |
| EP | 437024A1 A1 | 7/1991 | | JP | 63-203483 | 8/1988 |
| EP | 433697A3 A3 | 12/1992 | | JP | 63-241610 | 10/1988 |
| EP | 479273A3 A3 | 5/1993 | | JP | 1162454 A | 6/1989 |
| EP | 29410181 B1 | 12/1993 | | JP | 2-6312 | 1/1990 |
| EP | 554978A3 A3 | 3/1994 | | JP | 2006312 U1 | 1/1990 |
| EP | 0 615 719 | 9/1994 | | JP | 2026312 B | 6/1990 |
| EP | 615719 A1 | 9/1994 | | JP | 2283343 A | 11/1990 |
| EP | 0 792 726 | 9/1997 | | JP | 03 051023 | 3/1991 |
| EP | 861629 A1 | 9/1998 | | JP | 3051023 A2 | 3/1991 |
| EP | 307381A3 A3 | 7/1999 | | JP | 3197758 A | 8/1991 |
| EP | 930040 A3 | 10/1999 | | JP | 3201903 A | 9/1991 |
| EP | 845237 B1 | 4/2000 | | JP | 4019586 B | 3/1992 |
| EP | 1018315 A1 | 7/2000 | | JP | 4084921 A | 3/1992 |
| EP | 1 018 315 | 12/2000 | | JP | 5023269 B | 4/1993 |
| EP | 1172719 A1 | 1/2002 | | JP | 5091604 A2 | 4/1993 |
| EP | 1228734 A3 | 6/2003 | | JP | 5042076 U | 6/1993 |
| EP | 1 331 537 | 7/2003 | | JP | 5046246 U | 6/1993 |
| EP | 1 380 245 | 1/2004 | | JP | 5150827 A | 6/1993 |
| EP | 1380246 A2 | 1/2004 | | JP | 5150829 A | 6/1993 |
| EP | 1380246 A3 | 3/2005 | | JP | 5046239 B | 7/1993 |
| EP | 1 557 730 | 7/2005 | | JP | 5054620 U | 7/1993 |
| EP | 1553472 A1 | 7/2005 | | JP | 5040519 Y2 | 10/1993 |
| EP | 1642522 A2 | 4/2006 | | JP | 5257527 A | 10/1993 |
| EP | 1642522 A3 | 11/2007 | | JP | 5257533 A | 10/1993 |
| ES | 2238196 B1 | 11/2006 | | JP | 5285861 A | 11/1993 |
| FR | 722 755 | 3/1932 | | JP | 6-3251 | 1/1994 |
| FR | 2601443 B1 | 11/1991 | | JP | 6003251 Y2 | 1/1994 |
| FR | 2 828 589 | 8/2001 | | JP | 06-038912 | 2/1994 |
| GB | 702426 A | 1/1954 | | JP | 6026312 U | 4/1994 |
| GB | 2128842 B | 4/1986 | | JP | 6137828 A | 5/1994 |
| GB | 2213047 A | 8/1989 | | JP | 6293095 A | 10/1994 |
| GB | 2225221 A | 5/1990 | | JP | 06-327598 | 11/1994 |
| GB | 2 283 838 | 5/1995 | | JP | 6105781 B | 12/1994 |
| GB | 2284957 A | 6/1995 | | JP | 7059702 A2 | 3/1995 |
| GB | 2267360 B | 12/1995 | | JP | 07-129239 | 5/1995 |
| GB | 2300082 B | 9/1999 | | JP | 7059702 B | 6/1995 |
| GB | 2 344 747 | 6/2000 | | JP | 7222705 A | 8/1995 |
| GB | 2404330 B | 7/2005 | | JP | 7222705 A2 | 8/1995 |

| | | | | | | |
|---|---|---|---|---|---|---|
| JP | 7-281752 | | 10/1995 | JP | 10260727 A2 | 9/1998 |
| JP | 7270518 | A | 10/1995 | JP | 10295595 A | 11/1998 |
| JP | 7281742 | A2 | 10/1995 | JP | 11015941 A | 1/1999 |
| JP | 7281752 | A | 10/1995 | JP | 11102220 A | 1/1999 |
| JP | 7-295636 | | 11/1995 | JP | 11065655 A2 | 3/1999 |
| JP | 7311041 | A2 | 11/1995 | JP | 11085269 A2 | 3/1999 |
| JP | 7313417 | A | 12/1995 | JP | 11102219 A | 4/1999 |
| JP | 7313417 | A | 12/1995 | JP | 11102220 A | 4/1999 |
| JP | 7319542 | A2 | 12/1995 | JP | 11162454 A | 6/1999 |
| JP | 8-16776 | | 1/1996 | JP | 11174145 A | 7/1999 |
| JP | 8000393 | B2 | 1/1996 | JP | 11175149 A | 7/1999 |
| JP | 8000393 | Y2 | 1/1996 | JP | 11178764 A | 7/1999 |
| JP | 8016241 | A2 | 1/1996 | JP | 11178765 A | 7/1999 |
| JP | 8016776 | B2 | 2/1996 | JP | 11-508810 | 8/1999 |
| JP | 8063229 | A2 | 3/1996 | JP | 11212642 A | 8/1999 |
| JP | 8083125 | A | 3/1996 | JP | 11212642 A2 | 8/1999 |
| JP | 8083125 | A2 | 3/1996 | JP | 11213157 A | 8/1999 |
| JP | 08-089451 | | 4/1996 | JP | 11-510935 | 9/1999 |
| JP | 7089449 | A | 4/1996 | JP | 11248806 A | 9/1999 |
| JP | 2520732 | B2 | 5/1996 | JP | 11282532 A | 10/1999 |
| JP | 8123548 | A | 5/1996 | JP | 11282533 A | 10/1999 |
| JP | 8213548 | A | 5/1996 | JP | 11295412 A | 10/1999 |
| JP | 08-152916 | | 6/1996 | JP | 11346964 A2 | 12/1999 |
| JP | 8152916 | A2 | 6/1996 | JP | 2000047728 A | 2/2000 |
| JP | 2555263 | | 8/1996 | JP | 2000056006 | 2/2000 |
| JP | 8256960 | A2 | 10/1996 | JP | 2000056006 A | 2/2000 |
| JP | 8263137 | A | 10/1996 | JP | 2000056831 | 2/2000 |
| JP | 8263137 | A | 10/1996 | JP | 2000056831 A | 2/2000 |
| JP | 8286741 | A2 | 11/1996 | JP | 2000066722 | 3/2000 |
| JP | 8286744 | A2 | 11/1996 | JP | 2000066722 A | 3/2000 |
| JP | 8322774 | A | 12/1996 | JP | 2000075925 | 3/2000 |
| JP | 8322774 | A2 | 12/1996 | JP | 2000075925 A | 3/2000 |
| JP | 8335112 | A | 12/1996 | JP | 10240343 A2 | 5/2000 |
| JP | 8335112 | A | 12/1996 | JP | 2000275321 A | 10/2000 |
| JP | 9-43901 | | 2/1997 | JP | 11-162454 | 12/2000 |
| JP | 9043901 | A | 2/1997 | JP | 2000353014 A | 12/2000 |
| JP | 9044240 | A | 2/1997 | JP | 2000353014 A2 | 12/2000 |
| JP | 9047413 | A | 2/1997 | JP | 200122443 | 1/2001 |
| JP | 9066855 | A | 3/1997 | JP | 2001022443 A | 1/2001 |
| JP | 9066855 | A | 3/1997 | JP | 2001067588 A | 3/2001 |
| JP | 9145309 | A | 6/1997 | JP | 2001087182 | 4/2001 |
| JP | 9160644 | A | 6/1997 | JP | 2001087182 A | 4/2001 |
| JP | 9160644 | A2 | 6/1997 | JP | 2001121455 A | 5/2001 |
| JP | 8-393 | | 7/1997 | JP | 2001125641 A | 5/2001 |
| JP | 9-179625 | | 7/1997 | JP | 2001216482 A | 8/2001 |
| JP | 9179625 | A2 | 7/1997 | JP | 2001-258807 | 9/2001 |
| JP | 9179685 | A2 | 7/1997 | JP | 2001265437 | 9/2001 |
| JP | 9192069 | A2 | 7/1997 | JP | 2001265437 A | 9/2001 |
| JP | HEI 9-192069 | | 7/1997 | JP | 2001-275908 | 10/2001 |
| JP | 9204223 | A2 | 8/1997 | JP | 2001289939 A | 10/2001 |
| JP | 9206258 | A | 8/1997 | JP | 2001306170 A | 11/2001 |
| JP | 9206258 | A2 | 8/1997 | JP | 2001320781 A | 11/2001 |
| JP | 9233712 | A | 9/1997 | JP | 2001-525567 | 12/2001 |
| JP | 09251318 | | 9/1997 | JP | 2002-78650 | 3/2002 |
| JP | 9251318 | A | 9/1997 | JP | 2002-204768 | 7/2002 |
| JP | 9265319 | A | 10/1997 | JP | 2002204769 A | 7/2002 |
| JP | 9265319 | A | 10/1997 | JP | 2002247510 A | 8/2002 |
| JP | 9269807 | A | 10/1997 | JP | 2002-532178 | 10/2002 |
| JP | 9269807 | A | 10/1997 | JP | 3356170 | 10/2002 |
| JP | 9269810 | A | 10/1997 | JP | 2002-323925 | 11/2002 |
| JP | 9269810 | A | 10/1997 | JP | 3375843 | 11/2002 |
| JP | 02555263 | Y2 | 11/1997 | JP | 2002333920 | 11/2002 |
| JP | 9319431 | A | 12/1997 | JP | 2002333920 A | 11/2002 |
| JP | 9319431 | A2 | 12/1997 | JP | 2002-355206 | 12/2002 |
| JP | 9319432 | A | 12/1997 | JP | 2002-360471 | 12/2002 |
| JP | 9319432 | A | 12/1997 | JP | 2002-360482 | 12/2002 |
| JP | 9319434 | A | 12/1997 | JP | 2002-369778 | 12/2002 |
| JP | 9319434 | A | 12/1997 | JP | 2002360479 A | 12/2002 |
| JP | 9325812 | A | 12/1997 | JP | 2002366227 A | 12/2002 |
| JP | 9325812 | A | 12/1997 | JP | 2002369778 A | 12/2002 |
| JP | 10055215 | A | 2/1998 | JP | 2002369778 A2 | 12/2002 |
| JP | 10117973 | | 5/1998 | JP | 2003-10076 | 1/2003 |
| JP | 10117973 | A2 | 5/1998 | JP | 2003010076 A | 1/2003 |
| JP | 10118963 | A | 5/1998 | JP | 2003010088 | 1/2003 |
| JP | 10177414 | A | 6/1998 | JP | 2003010088 A | 1/2003 |
| JP | 10214114 | A | 8/1998 | JP | 2003015740 | 1/2003 |
| JP | 10214114 | A2 | 8/1998 | JP | 2003015740 A | 1/2003 |
| JP | 10228316 | | 8/1998 | JP | 2003028528 A | 1/2003 |
| JP | 10240342 | A2 | 9/1998 | | | |

| | | | | | | |
|---|---|---|---|---|---|---|
| JP | 2003-5296 | 2/2003 | | WO | WO9617258 A3 | 2/1997 |
| JP | 2003-036116 | 2/2003 | | WO | WO 97/15224 | 5/1997 |
| JP | 2003-38401 | 2/2003 | | WO | WO 97/40734 | 11/1997 |
| JP | 2003-38402 | 2/2003 | | WO | WO 97/41451 | 11/1997 |
| JP | 2003-52596 | 2/2003 | | WO | WO 98/53456 | 11/1998 |
| JP | 2003-505127 | 2/2003 | | WO | WO9905580 A2 | 2/1999 |
| JP | 2003047579 A | 2/2003 | | WO | WO 99/16078 | 4/1999 |
| JP | 2003052596 A | 2/2003 | | WO | WO 99/28800 | 6/1999 |
| JP | 2003-061882 | 3/2003 | | WO | WO 99/38056 | 7/1999 |
| JP | 2003084994 A | 3/2003 | | WO | WO 99/38237 | 7/1999 |
| JP | 2003167628 | 6/2003 | | WO | WO 99/43250 | 9/1999 |
| JP | 2003167628 A | 6/2003 | | WO | WO 99/59042 | 11/1999 |
| JP | 2003180586 A | 7/2003 | | WO | WO 00/04430 | 1/2000 |
| JP | 2003180587 A | 7/2003 | | WO | WO 00/36962 | 6/2000 |
| JP | 2003186539 A | 7/2003 | | WO | WO 00/38026 | 6/2000 |
| JP | 2003190064 A | 7/2003 | | WO | WO 00/38029 | 6/2000 |
| JP | 2003190064 A2 | 7/2003 | | WO | WO0038028 A1 | 6/2000 |
| JP | 2003-190064 | 8/2003 | | WO | WO 00/78410 | 12/2000 |
| JP | 2003241836 A | 8/2003 | | WO | WO 01/06904 | 2/2001 |
| JP | 2003262520 | 9/2003 | | WO | WO0106905 | 2/2001 |
| JP | 2003262520 A | 9/2003 | | WO | WO 01/80703 | 11/2001 |
| JP | 2003285288 A | 10/2003 | | WO | WO0180703 A1 | 11/2001 |
| JP | 2003304992 | 10/2003 | | WO | WO 01/91623 | 12/2001 |
| JP | 2003304992 A | 10/2003 | | WO | WO0191623 A2 | 12/2001 |
| JP | 2003-310489 | 11/2003 | | WO | WO 02/39864 | 5/2002 |
| JP | 2003310509 | 11/2003 | | WO | WO 02/39868 | 5/2002 |
| JP | 2003310509 A | 11/2003 | | WO | WO 02/058527 | 8/2002 |
| JP | 2003330543 A | 11/2003 | | WO | WO 02062194 | 8/2002 |
| JP | 2004123040 | 4/2004 | | WO | WO 02/067744 | 9/2002 |
| JP | 2004123040 A | 4/2004 | | WO | WO 02/067745 | 9/2002 |
| JP | 2004148021 | 5/2004 | | WO | WO 02/067752 | 9/2002 |
| JP | 2004148021 A | 5/2004 | | WO | WO 02/071175 | 9/2002 |
| JP | 2004160102 | 6/2004 | | WO | WO 02/074150 | 9/2002 |
| JP | 2004160102 A | 6/2004 | | WO | WO 02/075356 | 9/2002 |
| JP | 2004166968 A | 6/2004 | | WO | WO 02/075469 | 9/2002 |
| JP | 2004174228 | 6/2004 | | WO | WO 02/075470 | 9/2002 |
| JP | 2004174228 A | 6/2004 | | WO | WO02067752 A1 | 9/2002 |
| JP | 2004198330 A | 7/2004 | | WO | WO02069774 A1 | 9/2002 |
| JP | 2004219185 A | 8/2004 | | WO | WO02069775 A2 | 9/2002 |
| JP | 2004-351234 | 12/2004 | | WO | WO02075350 A1 | 9/2002 |
| JP | 2005352707 | 2/2005 | | WO | WO02081074 A1 | 10/2002 |
| JP | 2005118354 A | 5/2005 | | WO | WO 02/101477 | 12/2002 |
| JP | 2005135400 | 5/2005 | | WO | WO03015220 A1 | 2/2003 |
| JP | 2005135400 A | 5/2005 | | WO | WO 03/024292 | 3/2003 |
| JP | 2005211360 A | 8/2005 | | WO | WO03024292 A2 | 3/2003 |
| JP | 20055224265 A | 8/2005 | | WO | WO 03/026474 | 4/2003 |
| JP | 2005230032 A | 9/2005 | | WO | WO 03/040546 | 5/2003 |
| JP | 2005245916 | 9/2005 | | WO | WO 03/040845 | 5/2003 |
| JP | 2005245916 A | 9/2005 | | WO | WO 03/040846 | 5/2003 |
| JP | 2005296511 A | 10/2005 | | WO | WO02069775 A3 | 5/2003 |
| JP | 2005346700 A2 | 12/2005 | | WO | WO03040546 A1 | 5/2003 |
| JP | 2005352707 A | 12/2005 | | WO | WO03062850 A2 | 7/2003 |
| JP | 2006043071 | 2/2006 | | WO | WO03062852 A1 | 7/2003 |
| JP | 2006043071 A | 2/2006 | | WO | WO 2004/006034 | 1/2004 |
| JP | 2006155274 | 6/2006 | | WO | WO-2004004533 | 1/2004 |
| JP | 2006155274 A | 6/2006 | | WO | WO2004004534 A1 | 1/2004 |
| JP | 2006164223 A | 6/2006 | | WO | WO2004005956 A1 | 1/2004 |
| JP | 2006227673 A | 8/2006 | | WO | WO2004043215 A1 | 5/2004 |
| JP | 2006247467 | 9/2006 | | WO | WO 2004/058028 | 7/2004 |
| JP | 2006260161 | 9/2006 | | WO | WO 2004/059409 | 7/2004 |
| JP | 2006260161 A | 9/2006 | | WO | WO-2004058028 | 7/2004 |
| JP | 2006624746 A | 9/2006 | | WO | WO2004058028 | 7/2004 |
| JP | 2006293662 | 10/2006 | | WO | WO2005006935 A1 | 1/2005 |
| JP | 2006293662 A | 10/2006 | | WO | WO2005036292 A1 | 4/2005 |
| JP | 2006296697 | 11/2006 | | WO | WO 2005/055795 | 6/2005 |
| JP | 2006296697 A | 11/2006 | | WO | WO2005055796 | 6/2005 |
| JP | 2007034866 | 2/2007 | | WO | WO2005055796 A2 | 6/2005 |
| JP | 2007034866 A | 2/2007 | | WO | WO 2005/077244 | 8/2005 |
| JP | 2007213180 | 8/2007 | | WO | WO2005076545 A1 | 8/2005 |
| JP | 2007213180 A | 8/2007 | | WO | WO2005077243 A1 | 8/2005 |
| JP | 04074285 B2 | 4/2008 | | WO | WO-2005077244 | 8/2005 |
| JP | 2009015611 | 1/2009 | | WO | WO2005081074 A1 | 9/2005 |
| JP | 2009015611 A | 1/2009 | | WO | WO2005082223 A1 | 9/2005 |
| JP | 2010198552 | 9/2010 | | WO | WO2005098475 A1 | 10/2005 |
| JP | 2010198552 A | 9/2010 | | WO | WO2005098476 A1 | 10/2005 |
| US | RE28268 E1 | 12/1974 | | WO | WO2006046400 A1 | 5/2006 |
| WO | WO 95/26512 | 10/1995 | | WO | WO 2006/061133 | 6/2006 |
| WO | WO 95/30887 | 11/1995 | | WO | WO-2006068403 | 6/2006 |
| WO | WO9530887 A1 | 11/1995 | | WO | WO2006073248 A1 | 7/2006 |

| | | | |
|---|---|---|---|
| WO | WO2007036490 A2 | 4/2007 |
| WO | WO2007036490 A3 | 5/2007 |
| WO | WO2007065033 A2 | 6/2007 |
| WO | WO2007137234 A2 | 11/2007 |

OTHER PUBLICATIONS

Real-time Area-Covering Operations with Obstacle Avoidance for Cleaning Robots, 2002, IEEE, p. 2359-2364.*

Yamamoto et al., Motion Analysis of a Cleaner Robot for Vertical Type Air Conditioning Duct Apr. 2004, IEEE, pp. 442-447.*

Chen et al. Complete Coverage Motion Control of a Cleaning Robot Using Infrared Sensors, Jul. 2005, IEEE,pp. 543-548.*

Oh et al. Development of Small Robot for Home Floor Cleaning, 2002, IEEE, pp. 3222-3223.*

Plalacin et al., Building a Mobile Robot for a Floor-Cleaning Operation in Domestic Environments, May 2003, IEEE, pp. 1391-1396.*

Denning Roboscrub image (1989).

Robotics World Jan. 2001: "A Clean Sweep" (Jan. 2001).

Invitation to Pay Additional Fees and Partial International Search Report for International Application No. PCT/US2006/006550, mailed from the International Search Authority on Jun. 19, 2006, 7 pgs.

International Search Report for International Application No. PCT/US2006/006550, mailed from the International Search Authority on Sep. 18, 2006, 12 pgs.

Doty, Keith L et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct. 22-24, 1993, pp. 1-6.

eVac Robotic Vacuum S1727 Instruction Manual, Sharper Image Corp, Copyright 2004, 16 pgs.

Facts on the Trilobite webpage: "http://trilobiteelectroluxse/presskit_en/node11335asp?print=yes&pressID=" accessed Dec. 12, 2003 (2 pages).

Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.

Kärcher Product Manual Download webpage: "http://wwwkarchercom/bta/downloadenshtml?ACTION=SELECTTEILENR&ID=rc3000&submitButtonName=Select+Product+Manual" and associated pdf file "5959-915enpdf (47 MB) English/English" accessed Jan. 21, 2004 (16 pages).

Karcher RC 3000 Cleaning Robot—user manual Manufacturer: Alfred-Karcher GmbH & Co, Cleaning Systems, Alfred Karcher-Str 28-40, PO Box 160, D-71349 Winnenden, Germany, Dec. 2002.

Kärcher RoboCleaner RC 3000 Product Details webpages: "http://wwwrobocleanerde/english/screen3html" through "...screen6html" accessed Dec. 12, 2003 (4 pages).

Koolvac Robotic Vacuum Cleaner Owner's Manual, Koolatron, Undated, 26 pgs.

Schofield, Monica, "Neither Master nor Slave" A Practical Study in the Development and Employment of Cleaning Robots, Emerging Technologies and Factory Automation, 1999 Proceedings EFA'99 1999 7th IEEE International Conference on Barcelona, Spain Oct. 18-21, 1999, pp. 1427-1434.

NorthStar Low-Cost, Indoor Localization, Evolution robotics, Powering Intelligent Products, 2 pgs.

Put Your Roomba . . . On "Automatic" webpages: "http://www.acomputeredge.com/roomba," accessed Apr. 20, 2005, 5 pgs.

Put Your Roomba . . . On "Automatic" Roomba Timer> Timed Cleaning-Floorvac Robotic Vacuum webpages: http://cgi.ebay.com/ws/eBayISAPI.d11?ViewItem&category=43575198387&rd=1, accessed apr. 20, 2005, 5 pgs.

Friendly Robotics Robotic Vacuum RV400-The Robot Store website: http://www.therobotstore.com/s.nl/sc.9/category,-109/it.A/id.43/.f, accessed Apr. 20, 2005, 5 pgs.

Zoombot Remote Controlled Vaccum-RV-500 New Roomba 2, website: http://cgi.ebay.com/ws/eBayISAPI.d11?ViewItem&category=43526&item=4373497618&rd=1, accessed Apr. 20, 2005, 7 pgs.

Everday Robots, website: http://www.everydayrobots.com/index.php?option=content&task=view&id=9, accessed Apr. 20, 2005, 7 pgs.

Robot Review Samsung Robot Vacuum (VC-RP3OW), website: http://www.onrobo.com/reviews/At_Home/Vacuun_Cleaners/on00vcrp3Orosam/index.htm, accessed Mar. 18, 2005, 11 pgs.

Robotic Vacuum Cleaner-Blue, website: http://www.sharperimage.com/us/en/catalog/productview.jhtml?sku=S1727BLU, accessed Mar. 18, 2005, 3 pgs.

Hitachi: News release: The home cleaning robot of the autonomous movement type (experimental machine) is developed, website: http://www.i4u.com/japanreleases/hitachirobot.htm., accessed Mar. 18, 2005, 5 pgs.

Karcher USA, RC3000 Robotic Cleaner, website: http://www.karcher-usa.com/showproducts.php?op=view_prod&param1=143& param2=¶m3=, accessed Mar. 18, 2005, 6 pgs.

Electrolux designed for the well-lived home, website: http://www.electroluxusa.com/node57.as[?currentURL=node142.asp%3F, acessed Mar. 18, 2005, 5 pgs.

RoboMaid Sweeps Your Floors So You Won't Have to, the Official Site, website:http://www.thereobomaid.com/, acessed Mar. 18, 2005, 2 pgs.

Wired News: Robot Vacs Are in the House, website: http://www.wired.com/news/print/0,1294,59237,00.html, accessed Mar. 18, 2005, 6 pgs.

International Search Report and Written Opinion on the International Searching Authority in connection with the International Application No. PCT/US2007/080138 dated Jun. 25, 2009. 68 pages.

Search Report for corresponding application PCT/US2008/063252, dated Feb. 3, 2009.

Examination report for European Patent Application No. 06721029.4 dated Jan. 11, 2008.

Examination report for European Patent Application No. 09175479.6 dated Dec. 30, 2009.

Examination report for Japanese Patent Application No. 2006-551023 dated Dec. 8, 2009.

Examination report for U.S. Appl. No. 11/207,574 dated Jul. 30, 2007.

Examination report for U.S. Appl. No. 11/207,574 dated Jun. 23, 2008.

Examination report for U.S. Appl. No. 11/207,574 dated Oct. 17, 2008.

Examination report for U.S. Appl. No. 11/207,620 dated Oct. 12, 2007.

Examination report for U.S. Appl. No. 11/359,961 dated Mar. 8, 2010.

Examination report for U.S. Appl. No. 11/835,355 dated Jun. 9, 2010.

Examination report for U.S. Appl. No. 11/835,355 dated Dec. 2, 2008.

Examination report for U.S. Appl. No. 11/835,355 dated Sep. 14, 2009.

Examination report for U.S. Appl. No. 11/835,361 dated Feb. 6, 2009.

Examination report for U.S. Appl. No. 11/835,361 dated Oct. 26, 2009.

Examination report for U.S. Appl. No. 11/835,363 dated Jun. 16, 2009.

Examination report for U.S. Appl. No. 11/835,363 dated Aug. 28, 2008.

Feature definition; Hitachi Appliances, Inc., retrieved from the World Wide Web at http://kadenfan.hitachi.co.jp/robot/feature/feature.html, accessed Nov. 19, 2008.

Intelligent Machines; InMach Intelligente Maschinen Gmbh, retrieved from the World Wide Web at http://www.inmach.de/inside.html, accessed Nov. 19, 2008.

Product; Microrobot.com, retrieved from the World Wide Web at http://www.microrobot.com/main/pages/product1.asp, accessed Nov. 19, 2008.

Sadath M Malik et al. "Virtual Prototyping for Conceptual Design of a Tracked Mobile Robot," Electrical and Computer IEeE, PI. May 1, 2006, pp. 2349-2352.

Examination report with translation dated Jan. 18, 2011 for corresponding application (JP) 2007-556430.

Search report dated Apr. 11, 2011 for corresponding EP application 10183099.
Search report dated Apr. 11, 2011 for corresponding EP application 10183086.
Search report dated Apr. 13, 2011 for corresponding EP application 10183153.
Prassler et al., "A Short History of Cleaning Robots", Autonomous Robots 9, 211-226, 2000.
U.S. Appl. No. 60/605,066, filed Aug. 27, 2004, Taylor.
U.S. Appl. No. 60/605,181, filed Aug. 27, 2004, Taylor.
EBay, Roomba Timer → Timed Cleaning- Floorvac Robotic Vacuum, Cgi.ebay.com/ws/eBay|SAP|.dll?viewitem&category=43526&item=4375198387&rd=1, 5 pages, Apr. 20, 2005.
Electrolux, Welcome to the Electrolux trilobite, www.electroluxusa.com/node57.asp?currentURL=node142.asp%3F, 2 pages, Mar. 18, 2005.
Euroflex Intellegente Monstre Mauele (English only except).
Hammacher Schlemmer, Electrolux Trilobite Robotic Vacuum, www.hammacher.com/publish/71579.asp?promo=xsells , 3 pages,Mar. 18, 2005.
http://ascii.jp/elem/000/000/330/330024/.
http://robotbg.com/news/2003/04/22/lg_announces_the_first_robotic_vacuum_cleaner_of_korea.
http://techon.nikkeibp.co.jp/members/01db/200203/1006501/.
http://us.aving.net/news/view.php?articleId=23031.
http://us.aving.net/news/view.php?articleId=7257.
http://warp.ndl.go.jp/info:ndljp/pid/258151/www.soumu.go.jp/joho_tsusin/policyreports/chousa/netrobot/pdf/030214_1_33_a.pdf.
http://www.consensus.com.au/SoftwareAwards/CSAarchive/CSAart04/FloorBot/FX1%20Product%20Description%2020%20January%202004.pdf.
http://www.electrolux-ui.com:8080/2002%5C822%5C833102EN.pdf.
http://www.euroflex.tv/novita_dett.php?id=15.
http://www.frc.ri.cmu.edu/~hpm/talks/Extras/trilobite.desc.html.
http://www.gizmag.com/go/1282/.
http://www.hitachi.co.jp/New/cnews/hl_030529_hl_030529.pdf.
http://www.itmedia.co.jp/news/0111/16/robofesta_m.html.
http://www.popco.net/zboard/view.php?id=tr_review&no=40.
http://www.rakuten.co.jp/matsucame/587179/711512/.
http://www.robocon.co.kr/trilobite/Presentation_Trilobite_Kor_030104.ppt.
http://www.robotsandrelax.com/PDFs/RV400Manual.pdf.
http://www.taipeitimes.com/News/worldbiz/archives/2002/03/26/0000129338.
http://www.toshiba.co.jp/tech/review/2004/09/59_09pdf/a13.pdf.
Iirobotics.com Samsung Unveils Its Multifunction Robot Vacuum, www.iirobotics.com/webpages/hotstuff.php?ubre=111 , 3 pages, Mar. 18, 2005.
Jarosiewicz et al., Final Report—Lucid University of Florida, Departmetn of Electrical and Computer Engineering, EEL 5666—Intelligent Machine Design Laboratory, 50 pages, Aug. 4, 1999.
Kahney Robot Vacs are in the House, www.wired.com/news/technology/o,1282,59237,00.html , 6 pages, Jun. 18, 2003.
Karcher Product Manual Download Karch, www.karcher.com , 17 pages, Jun. 26, 1905.
Karlsson, et al, Core Technologies for service Robotics IEEE/RSJ International Conference on Intelligent Robots and Systems (IROS 2004), endai, Japan vol. 3, pp. 2979-2984, Sep. 28-Oct. 2, 2004.
Matsutek Enterprises Co. Ltd Automatic Rechargeable Vacuum Cleaner, http://matsutek.manufacturer.globalsources.com/si/6008801427181/pdtl/Home-vacuum/10 ., Apr. 23, 2007.
Microbot,Home Robot—UBOT www.micorbotusa.com/product_1_1_.html , 2 pages, Dec. 2, 2008.
MobileMag,Samsung Unveils High-tech Robot Vacuum Cleaner, http://www.mobilemag.com/content/100/102/C2261/, 4 pages, Mar. 18, 2005.
OnRobo,Samsung Unveils Its Multifunction Robot Vacuum, www.onrobo.com/enews/0210/samsung_vacuum.shtml, 3 pages, Mar. 18, 2005.
Robovacc 1999.
The Sharper Image, E Vac Robotic Vacuum, www.sharperiamge.com/us/en/templates/products/pipmorework1printable.jhtml, 2 pg, Mar. 18, 2005.
UAMA (Asia) Industrial Co., Ltd. RobotFamily, Jun. 27, 1905.
Wong, EIED Online>> Robot BusinessED Online ID# 13114, 17 pages, Jul. 2006.
Wolf et al. "Robust Vision-based Localization for Mobile Robots Using an Image Retrieval System Based on Invariant Features", Proceedings of the 2002 IEEE International Conference on Robotics & Automation, Washington, D.C. pp. 359-365, May 2002.
Wolf et al. "Robust Vision-Based Localization by Combining an Image-Retrieval System with Monte Carol Localization", IEEE Transactions on Robotics, vol. 21, No. 2, pp. 208-216, Apr. 2005.
Wong "EIED Online>> Robot Business", ED Online ID# 13114, 17 pages, Jul. 2006.
Yamamoto et al. "Optical Sensing for Robot Perception and Localizaton", 2005 IEEE Workshop on Advanced Robotics and its Social Impacts, pp. 14-17, 2005.
Yata et al. "Wall Following Using Angle Information Measured by a Single Ultrasonic Transducer", Proceedings of the 1998 IEEE, International Conference on Robotics & Automation, Leuven, Belgium. pp. 1590-1596, May 1998.
Yun, et al. "Image-Based Absolute Positioning System for Mobile Robot Navigation", IAPR International Workshops SSSR, Hong Kong, pp. 261-269, Aug. 17-19, 2006.
Yun, et al. "Robust Positioning a Mobile Robot with Active Beacon Sensors". Lecture Notes in Computer Science, 2006, vol. 4251, pp. 890-897, 2006.
Yuta, et al. "Implementation of an Active Optical Range sensor Using Laser Slit for In-Door Intelligent Mobite Robot", IEE/RSJ International workshop on Intelligent Robots and systems (IROS 91) vol. 1, Osaka, Japan, pp. 415-420, Nov. 3-5, 1991.
Zha et at. "Mobile Robot Localization Using Incomplete Maps for Change Detection in a Dynamic Environment", Advanced Intelligent Mechatronics '97. Final Program and Abstacts., IEEE/ASME International Conference, pp. 110, Jun. 16-20, 1997.
Zhang, et al. "A Novel Mobile Robot Localization Based on Vision", SPIE vol. 6279, 6 pages, Jan. 29, 2007.
Roboking—not just a vacuum cleaner, a robot! Jan. 21, 2004, 5 pages.
Popco.net Make your digital life http://www.popco.net/zboard/view.php?id=tr_review&no=40 accessed Nov. 1, 2011.
Matsumura Camera Online Shop http://www.rakuten.co.jp/matsucame/587179/711512 accessed Nov. 1, 2011.
Dyson's Robot Vacuum Cleaner—the DC06, May 2, 2004 http://www.gizmag.com/go/1282/accessed Nov. 11, 2011.
Electrolux Trilobite, Time to enjoy life, 38 pages http://www.robocon.co.kr/trilobite/Presentation_Trilobite_Kor_030104. ppt accessed Dec. 22, 2011.
Facts on the Trilobite http://www.frc.ri.cmu.edu/~hpm/talks/Extras/trilobite.desc.html 2 pages accessed Nov. 1, 2011.
Euroflex Jan. 1, 2006 http://www.euroflex.tv/novita_dett.php?id=15 1 page accessed Nov. 1, 2011.
FloorBotics, VR-8 Floor Cleaning Robot, Product Description for Manufacturers, http://www.consensus.com.au/SoftwareAwards/CSAarchive/CSA2004/CSAart04/FloorBot/F.
Friendly Robotics, 18 pages http://www.robotsandrelax.com/PDFs/RV400Manual.pdf accessed Dec. 22, 2011.
It's eye, 2003 www.hitachi.co.jp/rd/pdf/topics/hitac2003_10.pdf 2 pages.
Hitachi, May 29, 2003 http://www.hitachi.co.jp/New/cnews/hl_030529_hl_030529.pdf 8 pages.
Robot Buying Guide, LG announces the first robotic vacuum cleaner for Korea, Apr. 21, 2003 http://robotbg.com/news/2003/04/22/lg_announces_the_first_robotic_vacu.
CleanMate 365, Intelligent Automatic Vacuum Cleaner, Model No. QQ-1, User Manual www.metapo.com/support/user_manual.pdf 11 pages.
UBOT, cleaning robot capable of wiping with a wet duster, http:/us.aving.net/news/view.php?articleId=23031, 4 pages accessed Nov. 1, 2011.
Taipei Times, Robotic vacuum by Matsuhita about ot undergo testing, Mar. 26, 2002 http://www.taipeitimes.com/News/worldbiz/archives/2002/03/2610000129338 accessed.

Tech-on! http://techon.nikkeibp.co.jp/members/01db/200203/1006501/, 4 pages, accessed Nov. 1, 2011.
IT media http://www.itmedia.co.jp/news/0111/16/robofesta_m.html accessed Nov. 1. 2011.
Yujin Robotics, an intelligent cleaning robot 'Iclebo Q' AVING USA http://us.aving.net/news/view.php?articleld=7257, 8 pages accessed Nov. 4, 2011.
Special Reports, Vacuum Cleaner Robot Operated in Conjunction with 3G Celluar Phone vol. 59, No. 9 (2004) 3 pages http://www.toshiba.co.jp/tech/review/2004/09/59_0.
Toshiba Corporation 2003, http://warp.ndl.go.jp/info:ndljp/pid/258151/www.soumu.go.jp/joho_tsusin/policyreports/chousa/netrobot/pdf/030214_1_33_a.pdf 16 pages.
http://www.karcher.de/versions/intg/assets/video/2_4_robo_en.swf. Accessed Sep. 25, 2009.
McLurkin "The Ants: A community of Microrobots", Paper submitted for requirements of BSEE at MIT, May 12, 1995.
Grumet "Robots Clean House", Popular Mechanics, Nov. 2003.
McLurkin Stupid Robot Tricks: A Behavior-based Distributed Algorithm Library for Programming Swarms of Robots, Paper submitted for requirements of BSEE at MIT, May 2004.
Kurs et al, Wireless Power transfer via Strongly Coupled Magnetic Resonances, Downloaded from www.sciencemag.org, Aug. 17, 2007.
OnRobo "Samsung Unveils Its Multifunction Robot Vacuum", www.onrobo.com/enews/0210/samsung_vacuum.shtml, 3 pages, Mar. 3, 2005.
Pages et al. "Optimizing Plane-to-Plane Positioning Tasks by Image-Based Visual Servoing and Structured Light". IEEE Transactions on Robotics. vol. 22, No. 5, pp. 1000-1010, Oct. 2006.
Pages et al. "A camera-projector sysem for robot positoning by vsual sevoing", Proceedings of the 2006 Conference on Computer Vision and Pattern Recognition Workshop (CVPRW06), 8 pages, Jun. 17-22, 2006.
Pages, et al. "Robust decoupled visual servoing based on structured light", 2005 IEEE/RSJ Int. Conf. on Intelligent Robots and Systems, pp. 2676-2681, 2005.
Park et al. "A Neural Network Based Real-Time Robot Tracking Controller Using Position Sensitive Detectors." IEEE World Congress on Computational Intelligence., 1994 IEEE International Conference on Neutral Networks, Orlando, Florida pp. 2754-2758, Jun. 27-Jul. 2, 1994.
Park, et al. "Dynamic Visual Servo Control of Robot Manipulators using Neutral Networks", The Korean Institute Telematics and Electronics, vol. 29-B, No. 10, pp. 771-779, Oct. 1992.
Paromtchik, et al. "Optical Guidance System for Multiple mobile Robots", Proceedings 2001 ICRA. IEEE International Conference on Robotics and Automation, vol. 3, pp. 2935-2940 (May 21-26, 2001).
Penna, et al. "Models for Map Building and Navigation", IEEE Transactions on Systems. Man, and Cybernetics, vol. 23 No. 5, pp. 1276-1301. Sep./Oct. 1993.
Pirjanian "Reliable Reaction", Proceedings of the 1996 IEEE/SICE/RSJ International Conference on Multisensor Fusion and Integration for Intelligent Systems, pp. 158-165, 1996.
Pirjanian "Challenges for Standards for consumer Robotics", IEEE Workshop on Advanced Robotics and its Social impacts, pp. 260-264, Jun. 12-15, 2005.
Pirjanian et al. "Distributed Control for a Moduler, Reconfigurable Cliff Robot" Proceedings of the 2002 IEEE International Conference on Robotics & Automation, Washington, D.C. pp. 4083-4088, May 2002.
Pirjanian et al. "Representation and Execution of Plan Sequences for Multi-Agent Systems", Proceedings of the 2001 IEEE/RSJ International Conference on Intelligent Robots and Systems, Maui, Hawaii, pp. 2117-2123, Oct. 29-Nov. 3, 2001.
Pirjanian et al. "Multi-Robot Target Acquisition using Multiple Objective Behavior Coordination", Proceedings of the 2000 IEEE International Conference on Robotics & Automation, San Francisco, CA, pp. 2696-2702, Apr. 2000.
Pirjanian et al. "A decision-theoretic approach to fuzzy behavior coordination", 1999 IEEE International Symposium on Computational Intelligence in Robotics and Automation, 1999. CIRA '99., Monterey, CA, pp. 101-106. Nov. 8-9, 1999.

Pirjanian et al. "Improving Task Reliability by Fusion of Redundant Homogeneous Modules Using Voting Schemes", Proceedings of the 1997 IEEE International Conference on Robotics and Automation, Albuquerque, NM, pp. 425-430. Apr. 1997.
Prassler et al., "A Short History of Cleaning Robots", Autonomous Robots 9, 211-226, 2000, 16 pages.
Remazeilles, et al. "Image based robot navigation in 3D environments", Proc. of SPIE, vol. 6052, pp. 1-14, Dec. 6, 2005.
Rives, et al. "Visual servoing based on ellipse features", SPIE vol. 2056 Intelligent Robots and Computer Vision pp. 356-367, 1993.
Robotics World Jan 2001: "A Clean Sweep" (Jan. 2001).
Ronnback "On Methods for Assistive Mobile Robots", http://www.openthesis.org/documents/methods-assistive-mobile-robots-595019.html, 218 pages, Jan. 1, 2006.
Roth-Tabak, et al. "Environment Model for mobile Robots Indoor Navigation", SPIE vol. 1388 Mobile Robots pp. 453-463, 1990.
Sadath M Malik et al. "Virtual Prototyping for Conceptual Design of a Tracked Mobile Robot". Electrical and Computer Engineering, Canadian Conference on, IEEE, PI. May 1, 2006, pp. 2349-2352.
Sahin, et al. "Development of a Visual Object Localization Module for Mobile Robots", 1999 Third European Workshop on Advanced Mobile Robots, (Eurobot '99), pp. 65-72, 1999.
Salomon, et al. "Low-Cost Optical Indoor Localization system for Mobile Objects without Image Processing", IEEE Conference on Emerging Technologies and Factory Automation, 2006. (ETFA '06), pp. 629-632, Sep. 20-22, 2006.
Sato "Range Imaging Based on Moving Pattern Light and Spatio-Temporal Matched Filter", Proceedings International Conference on Image Processing, vol. 1., Lausanne, Switzerland, pp. 33-36, Sep. 16-19, 1996.
Schenker et al. "Lighweight rovers for Mars science exploration and sample return", Intelligent Robots and Computer Vision XVI, SPIE Proc. 3208, pp. 24-36, 1997.
Sebastian Thrun, Learning Occupancy Grid Maps With Forward Sensor Models, School of Computer Science, Carnegie Mellon University, pp. 1-28.
Shimoga et al. "Touch and Force Reflection for Telepresence Surgery", Engineering in Medicine and Biology Society, 1994. Engineering Advances: New Opportunities for Biomedical Engineers. Proceedings of the 16th Annual International Conference of the IEEE. Baltimore, MD, pp. 1049-1050, 1994.
Sim, et al "Learning Visual Landmarks for Pose Estimation", IEEE International Conference on Robotics and Automation, vol. 3, Detroit, Mi, pp. 1972-1978, May 10-15, 1999.
Sobh et al. "Case Studies in Web-Controlled Devices and Remote Manipulation", Automation Congress, 2002 Proceedings of the 5th Biannual World, pp. 435—440, Dec. 10, 2002.
Stella, et al. "Self-Location for Indoor Navigaton of Autonomous Vehices", Part of the SPIE conference on Enhanced and Synthetic Vision SPIE vol. 3364 pp. 298-302, 1998.
Summet "Tracking Locations of Moving Hand-held Displays Using Projected Light", Pervasive 2005, LNCS 3468 pp. 37-46 (2005).
Svedman et al. "Structure from Stereo Vision using Unsynchronized Cameras for Simultaneous Localization and Mapping", 2005 IEEE/RSJ International Conference on Intelligent Robots and Systems, pp. 2993-2998, 2005.
Takio et al. "Real-Time Position and Pose Tracking Method of Moving Object Using Visual Servo System", 47th IEEE International Symposium on Circuits and Systems, pp. 167-170, 2004.
Teller "Pervasive pose awareness for people, Objects and Robots", http://www.ai.mit.edu/lab/dangerous-ideas/Spring2003/teller-pose.pdf, 6 pages, Apr. 30, 2003.
Terada et al. "An Acquisition of the Relation between Vision and Action using Self-Organizing Map and Reinforcement Learning", 1998 Second International Conference on Knowledge-Based Intelligent Electronic Systems, Adelaide, Australiam pp. 429-434, Apr. 21-23, 1998.
The Sharper Image "Robotic Vacuum Cleaner—Blue" www.Sharperimage.com, 2 pages, Mar. 18, 2005.
The Sharper Image "E Vac Robotic Vacuum", www.sharperiamge.com/us/templates/products/pipmorework1printable.jhtml, 2 pages, Mar. 18, 2005.

TheRobotStore.com "Friendly Robotics Robotic Vacuum RV400—The Robot Store", www.therobotstore.com/s.nl/sc.9/category.-109/it.A/id.43/f, 1 page, Apr. 20, 2005.

TotalVac.com RC3000 RoboCleaner website Mar. 18, 2005.

Trebi-Ollennu et al. "Mars Rover Pair Cooperatively Transporting a Long Payload" Proceedings of the 2002 IEEE International Conference on Robotics & Automation, Washington, D.C. pp. 3136-3141, May 2002.

Tribelhorn et al., "Evaluating the Roomba:A low-cost ubiquitous platform for robotics research and education" 2007, IEEE, pp. 1393-1399.

Tse et al. "Design of a Navigation System for a Household Mobile Robot Using Neural Neworks" Department of Manufacturing Engg. & Engg. Management, City University of Hong Kong, pp. 2151-2156, 1998.

UAMA (Asia) Industrial Co., Ltd. "RobotFamily", 2005.

Watanabe et al. "Position Estimation of Mobile Robots With Internal and External Sensors Using Uncertainty Evolution Technique", 1990 IEEE International Conference on Robotics and Automation, Cincinnati, OH, pp. 2011-2016, May 13-18, 1990.

Watts "Robot, boldly goes where no man can", The Times—pp. 20, Jan. 1985.

Wijk et al. "Triangulation-Based Fusion of Sonar Data with Application in Robot Pose Tracking", IEEE Transactions on Robotics and Automation, vol. 16, No. 6, pp. 740-752, Dec. 2000.

Jarosiewicz et al. "FinalReport—Lucid", University of Florida Departmetn of Electrical and Computer Engineering, EEL 5666—Intelligent Machine Design Laboratory, 50 pages, Aug. 4, 1999.

Jensfelt, et al. "Active Global Localization for a mobile robot using multiple hypothesis tracking", IEEE Transactions on Robots and Automation vol. 17, No. 5, pp. 748-760, Oct. 2001.

Jeong, et al. "An intelligent map-buiding system for indoor mobil robot using low cost photo sensors"SPIE vol. 6042 6 pages, 2005.

Kahney, "Robot Vacs are in the House," www.wired.com/news/technology/o,1282,59237,00.html, 6 pages, Jun. 18, 2003.

Karcher "Product Manual Download Karch", www.karcher.corn, 17 pages, 2004.

Karcher "Karcher RoboCleaner RC 3000", www.robocleaner.de/english/screen3.html, 4 pages, Dec. 12, 2003.

Karcher USA "RC 3000 Robotics cleaner", www.karcher-usa.com, 3 pages, Mar. 18, 2005.

Karlsson et al., The vSLM Algorithm or Robust Localization and Mapping Proceedings of the 2005 IEEE International Conference on Robotics and Automation, Barcelona, Spain, pp. 24-29, Apr. 2005.

Karlsson, et al Core Technologies for service Robotics, IEEE/RSJ International Conference on Intelligent Robots and Systems (IROS 2004). vol. 3, pp. 2979-2984, Sep. 28-Oct. 2, 2004.

King "Heplmate-TM-Autonomous mobile Robots Navigation Systems", SPIE vol. 1388 Mobile Robots pp. 190-198, 1990.

Kleinberg, The Localization Problem for Mobile Robots, Laboratory for Computer Science, Massachusetts Institute of Technology, 1994 IEEE, pp. 521-531, 1994.

Knight, et al., "Localization and Identification of Visual Landmarks", Journal of Computing Sciences in Colleges, vol. 16 Issue 4, 2001 pp. 312-313, May 2001.

Kolodko et al. "Expermental System for Real-Time Motion Estimation", Proceedings of the 2003 IEEE/ASME International Conference on Advanced Intelligent Mechatronics (AIM 2003), pp. 981-986, 2003.

Komoriya et al., Planning of Landmark Measurement for the Navigation of a Mobile Robot, Proceedings of the 1992 IEEE/RSJ International Conference on Intelligent Robots and Systems, Raleigh, NC pp. 1476-1481, Jul. 7-10, 1992.

Krotov, et al. "Digital Sextant", Downloaded from the internet at: http//:www.cs.cmu.edu/~epk/, 1 page, 1995.

Krupa et al. "Autonomous 3-D Positioning of Surgical Instruments in Robotized Laparoscopic Surgery Using Visual Servoing", IEEE Transactions on Robotics and Automation, vol. 19, No. 5, pp. 842-853, Oct. 5, 2003.

Kuhl, et al., "Self Localization in Environments using Visual Angles" VRCAI '04 Proceedings of the 2004 ACM SIGGRAPH international conference on Virtual Reality continuum and its applications in industry, pp. 472-475, 2004.

Kurth, "Range-Only Robot Localization and SLAM with Radio", http://www.ri.cmu.edu./pub_files/pub4/kurth_derek_2004_1./kurth_derek_2004_1.pdf. 60 pages, May 2004.

Lambrinos, et al. "A mobile robot employing insect strategies for navigation", http://www8.cs.umu.se/kurser/TDBD17/VT04/dl/Assignment%20Papers/larnbrinos-RAS-2000.pdf, 38 pages, Feb. 19, 1999.

Lang et al. "Visual Measurement of Orientation Using Ceiling Features", 1994 IEEE, pp. 552-555, 1994.

Lapin, "Adaptive position estimation for an automated guided vehicle", SPIE vol. 1831 Mobile Robots VII, pp. 82-94, 1992.

LaValle et al. "Robot Motion Planning in a Changing, Partially Predictable Environment", 1994 IEEE International Symposium on Intelligent Control Columbus, OH, pp. 261-266, Aug. 16-18, 1994.

Lee, et al. "Localization of a Mobile Robot Using the Image of a Moving Object", IEEE Transaction on Industrial Electronics, vol. 50, No. 3 pp. 612-619, Jun. 2003.

Lee, et al. "Development of Indoor Navigation system for Humanoid Robot Using Multi-sensors Integration", ION NTM, San Diego, CA pp. 798-805, Jan. 22-24, 2007.

Leonard et al. "Mobile Robot Localization by tracking Geometric Beacons", IEEE Transaction on Robotics and Automation, vol. 7, No. 3 pp. 376-382, Jun. 1991.

Li et al. "Robust Statistical Methods for Securing Wireless Localization in Sensor Netorks", Wireless Information Network Laboratory, Rutgers University.

Li et al. "Making a Local Map of Indoor Environments by Swiveling a Camera and a Sonar" Proceedings of the 1999 IEEE/RSJ International Conference on Intelligent Robots and Systems, pp. 954-959, 1999.

Lin, et al.. "Mobile Robot Navigation Using Artificial Landmarks", Journal of robotics System 14(2). pp. 93-106, 1997.

Linde "Dissertation, "On Aspects of Indoor Localization"" https://eldorado.tu-dortmund.de/handle/2003/22854, University of Dortmund, 138 pages, Aug. 28, 2006.

Lumelsky, et al. "An Algorithm for Maze Searching with Azimuth Input" 1994 IEEE International Conference on Robotics and Automation, San Diego, CA vol. 1, pp. 111-116, 1994.

Luo et al., "Real-time Area-Covering Operations with Obstacle Avoidance for Cleaning Robots," 2002, IEeE, p. 2359-2364.

Ma "Thesis: Documentation on Northstar", California Institute of Technology, 14 pages, May 17, 2006.

Madsen, et al. "Optimal landmark selection for triangulaton of robot position", Journal of Robotics and Autonomous Systems vol. 13 pp. 277-292, 1998.

Martishevcky, "The Accuracy of point light target coordinate determination by dissectoral tracking system", SPIE vol. 2591 pp. 25-30.

Matsutek Enterprises Co. Ltd "Automatic Rechargeable Vacuum Cleaner", http://matsutek.manufacturer.globalsources.com/si/6008801427181/pdtl/Home-vacuum/10. . . , Apr. 23, 2007.

McGillem, et al, "Infa-red Lacation System for Navigation and Autonomous Vehicles", 1988 IEEE Inernational Conference on Robotics and Automation, vol. 2, pp. 1236-1238, Apr. 24-29, 1988.

McGillem, et al. "A Beacon Navigation Method for Autonomous Vehicles", IEEE Transactions on Vehicular Technology, vol. 38, No. 3, pp. 132-139, Aug. 1989.

Michelson "Autonomous Navigation", 2000 Yearbook of Science & Technology, McGraw-Hill, New York, ISBN 0-07-052771-7, pp. 28—30, 1999.

Miro, et al. "Towards Vision Based Navigation in Large Indoor Environments", Proceedings of the IEEE/RSJ International Conference on Intelligent Robots and Systems, Beijing, China, pp. 2096-2102, Oct. 9-15, 2006.

MobileMag "Samsung Unveils High-tech Robot Vacuum Cleaner", http://www.mobilemag.com/content/100/102/C2261/, 4 pages, Mar. 18, 2005.

Monteiro, et al. "Visual Sevoing for Fast Mobile Robot: Adaptive Estimation of Kinematic Parameters", Proceedings of the IECON '93., International Conference on Industrial Electronics, Maui, HI, pp. 1588-1593, Nov. 15-19, 1993.

Moore, et al. A simple Map-bases Localization strategy using range measurements, SPIE vol. 5804 pp. 612-620, 2005.

Munich et al. "SIFT-ing Through Features with ViPR", IEEE Robotics & Automation Magazine, pp. 72-77, Sep. 2006.
Munich et al, "ERSP: A Software Platform and Achitecture or the Service Robotics Industry", Intelligent Robots and Systems, 2005. (IROS 2005), pp. 460-467, Aug. 2-6, 2005.
Nam, et al. "Real-Time Dynamic Visual Tracking Using PSD Sensors and extended Trapezoidal Motion Planning", Applied Intelligence 10, pp. 53-70, 1999.
Nitu et al. "Optomechatronic System or Postion Detection of a Mobile Mini-Robot" IEEE Ttransactons on Industrial Electronics, vol. 52, No. 4, pp. 969-973, Aug. 2005.
On Robo "Robot Reviews Samsung Robot Vacuum (VC-RP30W)", www.onrobo.com/reviews/AT_Home/vacuum_cleaners/on00vcrb30rosam/index.htm.. 2 pages, 2005.
InMach "lntelligent Machines", www.inmach.de/inside.html, 1 page, Nov. 19, 2008.
Innovation First "2004 EDU Robot Controller Reference Guide", http://www.ifirobotics.com, 13 pgs., Mar. 1, 2004.
Borges et al. "Optimal Mobile Robot Pose Estimation Using Geometrical Maps", IEEE Transactions on Robotics and Automation, vol. 18, No. 1, pp. 87-94, Feb. 2002.
Braunstingl et al. "Fuzzy Logic Wall Following of a Mobile Robot Based on the Concept of General Perception" ICAR '95, 7th International Conference on Advanced Robotics, Sant Feliu De Guixols, Spain, pp. 367-376, Sep. 1995.
Bulusu, et al. "Self Configuring Localizaton systems: Design and Experimental Evaluaton", ACM Transactions on Embedded Computing Systems vol. 3 No. 1 pp. 24-60, 2003.
Caccia, et al. "Bottom-Following for Remotely Operated Vehicies", 5th IFAC conference, Alaborg, Denmark, pp. 245-250 Aug. 1, 2000.
Chae, et al. "StarLITE: A new artificial landmark for the navigation of mobile robots", http://www.irc.atr.jp/jk-nrs2005/pdf/Starlite.pdf, 4 pages, 2005.
Chamberlin et al. "Team 1: Robot Locator Beacon System" NASA Goddard SFC, Design Proposal, 15 pages, Feb. 17, 2006.
Champy "Physical management of IT assets in Data Centers using RFID technologies", RFID 2005 University, Oct. 12-14, 2005.
Chiri "Joystick Control for Tiny OS Robot"http://eecs.berkeley.edu/Programs/ugrad/superb/papes2002/chiri.pdf. 12 pages, Aug. 8, 2002.
Christensen et al. "Theoretical Methods for Planning and Control in Mobile Robotics" 1997 First International Conference on Knowledge-Based Intelligent Electronic Systems, Adelaide, Australia, pp. 81-86, May 21-27, 1997.
Clerentin, et al. "A localization method based on two omnidirectional percepton systems coopeaton" Proc of IEEE International Conference on Robotics & Automation, San Francisco, CA vol. 2, pp. 1219-1224, Apr. 2000.
Corke "High Performance Visual serving for robots end-point control". SPIE vol. 2056 Intelligent robots and computer vision 1993.
Cozman et al. "Robot Localization using a Computer Vision Sextant", IEEE International Midwest Conference on Robotics and Automation, pp. 106-111, 1995.
D'Orazio, et al. "Model based Vision System for mobile robot position estimation", SPIE vol. 2058 Mobile Robots VIII, pp. 38-49, 1992.
De Bakker, et al. "Smart PSD- array for sheet of light range imaging", Proc. Of SPIE vol. 3965. pp. 1-12, May 15, 2000.
Desaulniers et al, "An Efficient Algorithm to find a shortest path for a car-like Robot", IEEE Transactions on robotics and Automation vol. 11 No. 6, pp. 819-828, Dec. 1995.
Dorfmüller-Ulhaas "Optical Tracking From User Motion to 3D Interaction", http://www.cg.tuwiejn.ac.at/research/publications/2002/Dorfrnueller-Ulhaas-thesis, 182 pages, 2002.
Dorsch, et al. "Laser Triangulation: Fundamental uncertainty in distance measurement", Applied Optics. vol. 33 No. 7. pp. 1306-1314, Mar. 1, 1994.
Dudek, et al. "Localizing A Robot with Minimum Travel"Proceedings of the sixth annual ACM-SIAM symposium on Discrete algorithms, vol. 27 No. 2 pp. 583-604, Apr. 1998.
Dulimarta, et al. "Mobile Robot Localization in Indoor Environment", Pattern Recognition, vol. 30, No. 1, pp. 99-111, 1997.

EBay "Roomba Timer → Timed Cleaning—Floorvac Robotic Vacuum", Cgi.ebay.com/ws/eBay|SAP|.dll? viewitem&category=43526&item=4375198387&rd=1, 5 pages, Apr. 20, 2005.
Electrolux "Welcome to the Electrolux trilobite" www.electroluxusa.com/node57.asp?currentURL=node142.asp%3F, 2 pages, Mar. 18, 2005.
Eren, et al. "Accuracy in position estimation of mobile robots based on coded infrared signal transmission", Proceedings: Integrating Intelligent Instrumentation and Control, Instrumentation and Measurement Technology Conference, 1995. IMTC/95, pp. 548-551, 1995.
Eren, et al. "Operation of Mobile Robots in a Structured Infrared Environment", Proceedings. 'Sensing, Processing, Networking', IEEE Instrumentation and Measurement Technology Conference, 1997 (IMTC/97), Ottawa, Canada vol. 1, pp. 20-25, May 19-21, 1997.
Becker, et al. "Reliable Navigation Using Landmarks" IEEE International Conference on Robotics and Automation, 0-7803-1965-6, pp. 401-406, 1995.
Benayad-Cherif, et al., "Mobile Robot Navigation Sensors" SPIE vol. 1831 Mobile Robots, VII, pp. 378-387, 1992.
Facchinetti, Claudio et al. "Using and Learning Vision-Based Self-Positioning for Autonomous Robot Naviaton", ICARCV '94, vol. 3 pp. 1694-1698, 1994.
Betke, et al., "Mobile Robot localization using Landmarks" Proceedings of the IEEE/RJS/GI International Conference on Intelligent Robots and Systems '94 "Advanced Robotic Systems and the Real World" (IROS '94), vol.
Facchinetti, Claudio et al, "Self-Positioning Robot Navigation Using Ceiling Images Sequences", ACCV '95, 5 pages, Dec. 5-8, 1995.
Fairfield, Nathaniel et al. "Mobile Robot Localization with Sparse Landmarks", SPIE vol. 4573 pp. 148-155, 2002.
Favre-Bulle, Bernard "Efficient tracking of 3D—Robot Position by Dynamic Triangulation", IEEE Instrumentation and Measurement Technology Conference IMTC 98 Session on Instrumentation and Measurement in Robotics, vol. 1, pp. 446-449, May 18-21, 1998.
Fayman "Exploiting Process Integration and Composition in the context of Active Vision". IEEE Transactions on Systems, Man, and Cybernetics—Part C: Application and reviews, vol. 29 No. 1, pp. 73-86, Feb. 1999.
Florbot GE Plastics Image (1989-1990).
Franz, et al. "Biomimetric robot navigation", Robotics and Autonomous Systems vol. 30 pp. 133-153, 2000.
Friendly Robotics "Friendly Robotics—Friendly Vac, Robotic Vacuum Cleaner", www.friendlyrobotics.com/vac.htm. 5 pages Apr. 20, 2005.
Fuentes, et al. "Mobile Robotics 1994", University of Rochester. Computer Science Department, TR 588, 44 pages, Dec. 7, 1994.
Bison, P et al., "Using a structured beacon for cooperative positon estimation" Robotics and Autonomous Systems vol. 29, No. 1, pp. 33-40, Oct. 1999.
Fukuda, et al. "Navigation System based on Ceiling Landmark Recognition for Autonomous mobile robot", 1995 IEEE/RSJ International Conference on Intelligent Robots and Systems 95. 'Human Robot Interaction and Cooperative Robots', Pittsburgh, PA, pp. 1466/1471, Aug. 5-9, 1995.
Gionis "A hand-held optical surface scanner for environmental Modeling and Virtual Reality", Virtual Reality World, 16 pages 1996.
Goncalves et al. "A Visual Front-End for Simultaneous Localzation and Mapping"Proceedings of the 2005 IEEE International Conference on Robotics and Automation, Barcelona, Spain, pp. 44-49, Apr. 2005.
Gregg et al. "Autonomous Lawn Care Applications", 2006 Florida Conference on Recent Advances in Robotics, FCRAR 2006, pp. 1-5, May 25-26, 2006.
Hamamatsu "SI PIN Diode S5980, S5981 S5870-Multi-element photodiodes for surface mounting", Hamatsu Photonics, 2 pages Apr. 2004.
Hammacher Schlemmer "Electrolux Trilobite Robotic Vacuum" www.hammacher.com/publish/71579.asp?promo=xsells, 3 pages, Mar. 18, 2005.

Haralick et al. "Pose Estimation from Corresponding Point Data", IEEE Transactions on systems, Man, and Cybernetics, vol. 19, No. 6, pp. 1426-1446, Nov. 1989.

Hausler "About the Scaling Behaviour of Optical Range Sensors"Fringe—'97 Prceedings of the 3rd International Workshop on Automatic Processing of Fringe Patterns, Bremen, Germany, pp. 147-155, Sep. 15-17, 1997.

Blaasvaer, et al "AMOR—An Autonomous Mobile Robot Navigaton Sysem", Proceedings of the IEEE Intenatonal Conference on Systems, Man, and Cybernetics, pp. 2266-2271, 1994.

Hoag, et al. "Navigation and Guidance in interstellar space", ACTA Astronautica vol. 2, pp. 513-533, Feb. 14, 1975.

Huntsberger et al. "CAMPOUT: A Control Architecture for Tightly Coupled Coordination of Multirobot Systems for Planetary Surface Exploration", IEEE Transactions on Systems, Man, and Cybernetics —Part A: Systems and Humans, vol. 33, No. 5, pp. 550-559, Sep. 2003.

Iirobotics.com "Samsung Unveils Its Multifunction Robot Vacuum", www.iirobotics.com/webpages/hotstuff.php? ubre=111, 3 pages, Mar. 18, 2005.

SVET Computers—New Technologies—Robot vacuum cleaner, 1 page, Oct. 1, 1999.

http://ascii.jp/elem/000/000/330/330024/, Mar. 25, 2002.

Paromtchik "Toward Optical Guidance of Mobile Robots", Jul. 23, 2000.

Andersen et al., "Landmark based navigation strategies," SPIE Conference on Mobile Robots XIII, SPIE vol. 3525, Jan. 8, 1999.

Roboking—not just a vacuum cleaner, a robot!, Jan. 21, 2004.

Ascii, Mar. 25, 2002, http://ascii.jp/elem/000/000/330/330024/ accessed Nov. 1, 2011.

U.S. Appl. No. 60/605,066 as provided to WIPO in PCT/US2005/030422, corresponding to U.S. National Stage Entry U.S. Appl. No. 11/574,290, U.S. publication 2008/0184518, filed Aug. 27, 2004.

U.S. Appl. No. 60/605,181 as provided to WIPO in PCT/US2005/030422, corresponding to U.S. National Stage Entry U.S. Appl. No. 11/574,290, U.S. publication 2008/0184518, filed Aug. 27, 2004.

Derek Kurth, "Range-Only Robot Localization and SLAM with Radio", http://www.ri.cmu.edu/pub_files/pub4/kurth_derek_2004_1/kurth_derek_2004_1.pdf. 60 pages, May, 2004, accessed Jul. 27, 2012.

Electrolux Trilobite, Jan. 12, 2001, http:www.electrolux-ui.com:8080/2002%5C822%5C833102EN.pdf, accessed Jul. 2, 2012, 10 pages.

Florbot GE Plastics, 1989-1990, 2 pages, available at http://www.fuseid.com/, accessed Sep. 27, 2012.

Gregg et al., "Autonomous Lawn Care Applications," 2006 Florida Conference on Recent Advances in Robotics, Miami, Florida, May 25-26, 2006, Florida International University, 5 pages.

Hitachi 'Feature', http://kadenfan.hitachi.co.jp/robot/feature/feature.html, 1 page, Nov. 19, 2008.

Hitachi, http://www.hitachi.co.jp/New/cnews/hi_030529_hi_030529.pdf, 8 pages, May 29, 2003.

Home Robot—UBOT; Microbotusa.com, retrieved from the WWW at www.microrobotusa.com, accessed Dec. 2, 2008.

King and Weiman, "Helpmate™ Autonomous Mobile Robots Navigation Systems," SPIE vol. 1388 Mobile Robots, pp. 190-198 (1990).

Li et al. "Robust Statistical Methods for Securing Wireless Localization in Sensor Networks," Information Procesing in Sensor Networks, 2005, Fourth International Symposium on, pp. 91-98, Apr. 2005.

Martishevcky, "The Accuracy of point light target coordinate determination by dissectoral tracking system", SPIE vol. 2591, pp. 25-30, Oct. 23, 2005.

Maschinemarkt Würzburg 105, Nr. 27, pp. 3, 30, Jul. 5, 1999.

Miwako Doi "Using the symbiosis of human and robots from approaching Research and Development Center," Toshiba Corporation, 16 pages, available at http://warp.ndl.go.jp/info:ndljp/pid/258151/www.soumu.go.jp/joho_tsusin/policyreports/chousa/netrobot/pdf/030214_1_33_a.pdf, Feb. 26, 2003.

Paromtchik "Toward Optical Guidance of Mobile Robots," Proceedings of the Fourth World Multiconference on Systemics, Cybernetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012.

Roboking—not just a vacuum cleaner, a robot!, Jan. 21, 2004, infocom.uz/2004/01/21/robokingne-prosto-pyilesos-a-robot/, accessed Oct. 10, 2011, 7 pages.

Sebastian Thrun, "Learning Occupancy Grid Maps With Forward Sensor Models," Autonomous Robots 15, 111-127, Sep. 1, 2003.

SVET Computers—New Technologies—Robot Vacuum Cleaner, Oct. 1999, available at http://www.sk.rs/1999/10/sknt01.html, accessed Nov. 1, 2011.

Written Opinion of the International Searching Authority, PCT/US2004/001504, Aug. 20, 2012, 9 pages.

* cited by examiner

AUTONOMOUS SURFACE CLEANING ROBOT FOR WET CLEANING

CROSS-REFERENCE TO RELATED APPLICATIONS

This application claims priority under 35 U.S.C. §119(e) to U.S. Provisional Application Ser. No. 60/654,838, the entire disclosure of which is herein incorporated by reference it its entirety. This application also claims priority under 35 U.S.C. §120 to U.S. application Ser. No. 11/134,212, U.S. application Ser. No. 11/134,213, and U.S. application Ser. No. 11/133,796, the entire disclosures of which are herein incorporated by reference in their entireties. This application relates to and herein incorporates by reference in their entireties the disclosures of the application entitled "Autonomous Surface Cleaning Robot for Wet and Dry Cleaning," by Casey et al., filed on even date herewith, and identified by attorney docket no. IRO-017CP1; and the application entitled "Autonomous Surface Cleaning Robot for Dry Cleaning," by Gilbert et al., filed on even date herewith, and identified by attorney docket no. IRO-017CP2.

BACKGROUND OF THE INVENTION

The present invention relates to cleaning devices, and more particularly, to an autonomous surface cleaning robot. In particular, the surface cleaning robot includes two separate cleaning zones with a first cleaning zone configured to collect loose particulates from the surface and with a second cleaning zone configured to apply a cleaning fluid onto the surface, scrub the surface and thereafter collect a waste liquid from the surface. The surface cleaning robot may also include at least two containers, carried thereby, to store cleaning fluid and waste materials.

DESCRIPTION OF RELATED ART

Autonomous robot floor cleaning devices having a low enough end user price to penetrate the home floor cleaning market are known in the art. For example, and U.S. Pat. No. 6,883,201 by Jones et al. entitled Autonomous Floor Cleaning Robot, the disclosure of which is herein incorporated by reference it its entirety, discloses an autonomous robot. The robot disclosed therein includes a chassis, a battery power subsystem, a motive drive subsystem operative to propel the autonomous floor cleaning robot over a floor surface for cleaning operations, a command and control subsystem operative to control the cleaning operations and the motive subsystem, a rotating brush assembly for sweeping up or collecting loose particulates from the surface, a vacuum subsystem for suctioning up or collecting loose particulates on the surface, and a removable debris receptacle for collecting the particulates and storing the loose particulates on the robot during operation. Models similar to the device disclosed in the '201 patent are commercially marketed by IROBOT CORPORATION under the trade names ROOMBA RED and ROOMBA DISCOVERY. These devices are operable to clean hard floor surfaces, e.g. bare floors, as well as carpeted floors, and to freely move from one surface type to the other unattended and without interrupting the cleaning process.

In particular, the '201 patent describes a first cleaning zone configured to collect loose particulates in a receptacle. The first cleaning zone includes a pair of counter-rotating brushes engaging the surface to be cleaned. The counter-rotating brushes are configured with brush bristles that move at an angular velocity with respect to floor surface as the robot is transported over the surface in a forward transport direction. The angular movement of the brush bristles with respect to the floor surface tends to flick loose particulates laying on the surface into the receptacle which is arranged to receive flicked particulates.

The '201 patent further describes a second cleaning zone configured to collect loose particulates in the receptacle and positioned aft of the first cleaning zone such that the second cleaning zone performs a second cleaning of the surface as the robot is transported over the surface in the forward direction. The second cleaning zone includes a vacuum device configured to suction up any remaining particulates and deposit them into the receptacle.

In other examples, home use autonomous cleaning devices are disclosed in each of U.S. Pat. No. 6,748,297, and U.S. Patent Application Publication No. 2003/0192144, both by Song et al. and both assigned to Samsung Gwangiu Electronics Co. The disclosures of the '297 patent and '144 published application are herein incorporated by reference it their entireties. In these examples, autonomous cleaning robots are configured with similar cleaning elements that utilize rotating brushes and a vacuum device to flick and suction up loose particulates and deposit them in a receptacle.

While each of the above examples provide affordable autonomous floor clearing robots for collecting loose particulates, there is heretofore no teaching of an affordable autonomous floor cleaning robot for applying a cleaning fluid onto the floor to wet clean floors in the home. A need exists in the art for such a device and that need is addressed by the present invention, the various functions, features, and benefits thereof described in more detail herein.

Wet floor cleaning in the home has long been done manually using a wet mop or sponge attached to the end of a handle. The mop or sponge is dipped into a container filled with a cleaning fluid, to absorb an amount of the cleaning fluid in the mop or sponge, and then moved over the surface to apply a cleaning fluid onto the surface. The cleaning fluid interacts with contaminants on the surface and may dissolve or otherwise emulsify contaminants into the cleaning fluid. The cleaning fluid is therefore transformed into a waste liquid that includes the cleaning fluid and contaminants held in suspension within the cleaning fluid. Thereafter, the sponge or mop is used to absorb the waste liquid from the surface. While clean water is somewhat effective for use as a cleaning fluid applied to floors, most cleaning is done with a cleaning fluid that is a mixture of clean water and soap or detergent that reacts with contaminants to emulsify the contaminants into the water. In addition, it is known to clean floor surfaces with water and detergent mixed with other agents such as a solvent, a fragrance, a disinfectant, a drying agent, abrasive particulates and the like to increase the effectiveness of the cleaning process.

The sponge or mop may also be used as a scrubbing element for scrubbing the floor surface, and especially in areas where contaminants are particularly difficult to remove from the floor. The scrubbing action serves to agitate the cleaning fluid for mixing with contaminants as well as to apply a friction force for loosening contaminants from the floor surface. Agitation enhances the dissolving and emulsifying action of the cleaning fluid and the friction force helps to break bonds between the surface and contaminants.

One problem with the manual floor cleaning methods of the prior art is that after cleaning an area of the floor surface, the waste liquid must be rinsed from the mop or sponge, and this usually done by dipping the mop or sponge back into the container filled with cleaning fluid. The rinsing step contaminates the cleaning fluid with waste liquid and the cleaning fluid becomes more contaminated each time the mop or sponge is rinsed. As a result, the effectiveness of the cleaning fluid deteriorates as more of the floor surface area is cleaned.

While the traditional manual method is effective for floor cleaning, it is labor intensive and time consuming. Moreover, its cleaning effectiveness decreases as the cleaning fluid becomes contaminated. A need exists in the art for an improved method for wet cleaning a floor surface to provide an affordable wet floor cleaning device for automating wet floor cleaning in the home.

In many large buildings, such as hospitals, large retail stores, cafeterias, and the like, there is a need to wet clean the floors on a daily or nightly basis, and this problem has been addressed by the development of industrial floor cleaning robots capable of wet cleaning floors. An example of one industrial wet floor cleaning device is disclosed in U.S. Pat. No. 5,279,672 by Betker et al., and assigned to Windsor Industries Inc. The disclosure of the '672 patent is herein incorporated by reference it its entirety. Betker et al. disclose an autonomous floor cleaning device having a drive assembly providing a motive force to autonomously move the wet cleaning device along a cleaning path. The device provides a cleaning fluid dispenser for dispensing cleaning fluid onto the floor; rotating scrub brushes in contact with the floor surface for scrubbing the floor with the cleaning fluid, and a waste liquid recovery system, comprising a squeegee and a vacuum system for recovering the waste liquid from the floor surface. While the device disclosed by Betker et al. is usable to autonomously wet clean large floor areas, it is not suitable for the home market, and further, lacks many features, capabilities, and functionality of the present invention as described further herein. In particular, the industrial autonomous cleaning device disclosed by Betker et al. is too large, costly and complex for use in the home and consumes too much electrical power to provide a practical solution for the home wet floor cleaning market.

Recently, improvements in conventional manual wet floor cleaning in the home are disclosed in U.S. Pat. No. 5,968,281 by Wright et al., and assigned to Royal Appliance Mfg., entitled Method for Mopping and Drying a Floor. The disclosure of the '281 patent is herein incorporated by reference it its entirety. Disclosed therein is a low cost wet mopping system for manual use in the home market. The wet mopping system disclosed by Wright et al. comprises a manual floor cleaning device having a handle with a cleaning fluid supply container supported on the handle. The device includes a cleaning fluid dispensing nozzle supported on the handle for spraying cleaning fluid onto the floor and a floor scrubber sponge attached to the end of the handle for contact with the floor. The device also includes a mechanical device for wringing waste liquid out of the scrubbing sponge. A squeegee and an associated suction device are supported on the end of the handle and used to collect waste liquid up from the floor surface and deposit the waste liquid into a waste liquid container, supported on the handle separate from the cleaning solution reservoir. The device also includes a battery power source for powering the suction device. While Wright et al. describes a self contained wet cleaning device as well as an improved wet cleaning method that separates waste liquid from cleaning fluid the device is manually operated and lacks robotic functionality and other benefits and features identified in the present disclosure.

BRIEF SUMMARY OF THE INVENTION

The present invention overcomes the problems cited in the prior by providing, inter alia, low cost autonomous robot capable of wet cleaning floors and affordable for home use. The problems of the prior art are addressed by the present invention which provides an autonomous cleaning robot comprising a chassis and a transport drive system configured to autonomously transport cleaning elements over a cleaning surface. The robot is supported on the cleaning surface by wheels in rolling contact with the cleaning surface and the robot includes controls and drive elements configured to control the robot to generally traverse the cleaning surface in a forward direction defined by a fore-aft axis. The robot is further defined by a transverse axis perpendicular to the fore-aft axis.

The robot chassis carries a first cleaning zone A comprising cleaning elements arranged to collect loose particulates from the cleaning surface across a cleaning width. The cleaning elements of the first cleaning zone utilize a jet port disposed on a transverse edge of the robot and configured to blow a jet of air across a cleaning width of the robot towards the opposite transverse edge. A vacuum intake port is disposed on the robot opposed to the jet port to suction up loose particulates blown across the cleaning width by the jet port. The cleaning elements of the first cleaning zone may suction up loose particulates, utilize brushes to sweep the loose particulates into receptacle or otherwise remove the loose particulates from the surface.

The robot chassis may also carries a second cleaning zone B comprising cleaning elements arraigned to apply a cleaning fluid onto the surface. The second cleaning zone also includes cleaning elements configure to collect the cleaning fluid up from the surface after it has been used to clean the surface and may further include elements for scrubbing the cleaning surface and for smearing the cleaning fluid more uniformly over the cleaning surface.

The robot includes a motive drive subsystem controlled by a master control module and powered by a self-contained power module for performing autonomous movement over the cleaning surface. In one aspect, the invention relates to an autonomous cleaning robot having a chassis supported for transport over a cleaning surface, the chassis being defined by a fore-aft axis and a perpendicular transverse axis; a first collecting apparatus attached to the chassis and configured to collect loose particulates from the cleaning surface across a cleaning width, the cleaning width being disposed generally parallel with the transverse axis; a liquid applicator, attached to the chassis and configured to apply a cleaning fluid onto the cleaning surface; and, wherein the arrangement of the first collecting apparatus with respect to the liquid applicator causes the first collecting apparatus to precede the liquid applicator over the cleaning surface when transporting the chassis in a forward direction.

In one embodiment of the above aspect, the autonomous cleaning robot also includes a smearing element attached to the chassis and configured to smear the cleaning fluid applied onto the cleaning surface to more uniformly spread the cleaning fluid over the cleaning surface; wherein the arrangement of the liquid applicator with respect to the smearing element causes the liquid applicator to precede the smearing element over the cleaning surface when transporting the chassis in a forward direction. In another embodiment, the robot includes a scrubbing element configured to scrub the cleaning surface; wherein the arrangement of the liquid applicator with respect to the scrubbing element causes the liquid applicator to precede the scrubbing element over the cleaning surface when transporting the chassis in the forward direction. In certain embodiments, the robot also includes a second collecting apparatus configured to collect waste liquid from the cleaning surface, the waste liquid comprising the cleaning fluid applied by the liquid applicator plus any contaminants, removed from the cleaning surface by the clean fluid; wherein the arrangement of the scrubbing element with respect to the second collecting apparatus causes the scrubbing element to precede the second collecting apparatus over the cleaning surface as the chassis is transported in the forward direction.

In certain embodiments of the above aspect, the robot includes a first waste storage container attached to the chassis and arranged to receive the loose particulates therein, and/or a second waste storage container attached to the chassis and arranged to receive the waste liquid therein. Some embodiments of the autonomous robot of the above aspect include a cleaning fluid storage container attached to the chassis and configured to store a supply of the cleaning fluid therein and to deliver the cleaning fluid to the liquid applicator. In some embodiments, the cleaning fluid comprises water and/or water mixed with any one of soap, solvent, fragrance, disinfectant, emulsifier, drying agent and abrasive particulates. In some embodiments, the first and second waste containers are configured to be removable from the chassis by a user and to be emptied by the user, and/or said cleaning fluid storage container is configured to be removable from the chassis by a user and to be filled by the user. Certain embodiments include a combined waste storage container attached to the chassis and configured to receive the loose particulates from the first collecting apparatus and to receive the waste liquid from the second collecting apparatus therein. In other embodiments the waste storage container is configured to be removable from the chassis by a user and to be emptied by the user. Still other embodiments include a cleaning fluid storage container, attached to the chassis and configured to store a supply of the cleaning fluid therein and to deliver the cleaning fluid to the liquid applicator, and in some cases, said cleaning fluid storage container is configured to be user removable from the chassis and to be filled by the user.

In some embodiments of the above aspect, the autonomous cleaning robot according to claim 4 further includes an integrated liquid storage container, attached to the chassis, and formed with two separate container portions comprising; a waste storage container portion configured to receive the loose particulates from the first collecting apparatus and the waste liquid from the second collecting apparatus therein; and, a cleaning fluid storage container portion configured to store a supply of the cleaning fluid therein and to deliver the cleaning fluid to the liquid applicator. In other embodiments, the autonomous cleaning robot of the above aspect includes the integrated liquid storage container configured to be removable from the chassis by a user and for the cleaning fluid storage container to be filled by and for the waste storage container to be emptied by the user. In some embodiments of the above aspect, the robot includes a second collecting apparatus configured to collect waste liquid from the cleaning surface, the waste liquid comprising the cleaning fluid applied by the liquid applicator plus any contaminants, removed from the cleaning surface by the cleaning fluid; and, wherein the arrangement of the liquid applicator with respect to the second collecting apparatus causes the liquid applicator to precede the second collecting apparatus over the cleaning surface as the chassis is transported in the forward direction. Certain embodiments of the above aspect include a smearing element attached to the chassis and configured to smear the cleaning fluid applied onto the cleaning surface to more uniformly spread the cleaning fluid over the cleaning surface; and, wherein the arrangement of the liquid applicator with respect to the smearing element causes the liquid applicator to precede the smearing element over the cleaning surface when transporting the chassis in a forward direction.

In some embodiments, the robot includes a waste storage container attached to the chassis and configured to receive the loose particulates from the first collecting apparatus and to receive the waste liquid from the second collecting apparatus therein, and in certain cases, the waste storage container is configured to be removable from the chassis by a user and to be emptied by the user. Some embodiments of the robot include a cleaning fluid storage container, attached to the chassis and configured to store a supply of the cleaning fluid therein and to deliver the cleaning fluid to the liquid applicator, and in some cases, said cleaning fluid storage container is configured to be removable from the chassis by a user and to be filled by the user. In other embodiments, the robot of the above aspect includes an integrated liquid storage container, attached to the chassis, and formed with two separate container portions comprising; a waste storage container portion configured to receive the loose particulates from the first collecting apparatus and to receive the waste liquid from the second collecting apparatus therein; and, a cleaning fluid storage container configured to store a supply of the cleaning fluid therein and to deliver the cleaning fluid to the liquid applicator. In certain embodiments, said integrated liquid storage container is configured to be removable from the chassis by a user and for the cleaning fluid storage container to be filled by and for the waste storage container to be emptied by the user.

Some embodiments of the above aspect include a motive drive subsystem attached to chassis for transporting the chassis over the cleaning surface; a power module attached to the chassis for delivering electrical power to each of a plurality of power consuming subsystems attached to the chassis; and, a master control module attached to the chassis for controlling the motive drive module, the first collecting apparatus, and the liquid applicator, to autonomously transport the robot over the cleaning surface and to autonomously clean the cleaning surface. Some embodiments may also include a sensor module configured to sense conditions external to the robot and to sense conditions internal to the robot and to generate electrical sensor signals in response to sensing said conditions; a signal line for communicating the electrical sensor signals to the master control module; and, a controller incorporated within the master control module for implementing predefined operating modes of the robot in response to said conditions.

Some embodiments include a user control module configured to receive an input command from a user and to generate an electrical input signal in response to the input command; a signal line for communicating the electrical input signal to the master control module; and, a controller incorporated within the master control module for implementing predefined operating modes of the robot in response to the input command. In certain embodiments, the autonomous cleaning robot includes an interface module attached to the chassis and configured to provide an interface between an element external to the robot and at least one element attached to the chassis. In some embodiments, the element external to the robot comprises one of a battery-charging device and a data processor. Some embodiments include an interface module attached to the chassis and configured to provide an interface between an element external to the robot and at least one element attached to the chassis. In some embodiments, the element external to the robot comprises one of a battery-charging device, a data processor, a device for autonomously filling the cleaning fluid storage container with cleaning fluid, and a device for autonomously emptying the waste liquid container.

Certain embodiments of robots of the above aspect include an air jet port, attached to the chassis disposed at a first edge of the cleaning width and configured to blow a jet of air across the cleaning width proximate to the cleaning surface, to thereby force loose particulates on the cleaning surface to move away from the first edge in a direction generally parallel with the transverse axis; an air intake port, attached to the chassis and disposed at a second edge of the cleaning width, opposed from the first edge and proximate to the cleaning surface for suctioning up the loose particulates; a waste storage container configured to receive the loose particulates from the air intake port; and a fan assembly configured to generate a negative pressure within the waste storage container. In some embodiments, the fan assembly is further configured to generate a positive air pressure at the air jet port.

In other embodiments the second collecting apparatus includes a squeegee attached to the chassis and formed with a longitudinal ridge disposed proximate to the cleaning surface and extending across the cleaning width for providing a liquid collection volume at a forward edge of the ridge, said longitudinal ridge collecting waste liquid within the liquid collection volume as the chassis is transported in the forward direction; a vacuum chamber partially formed by the squeegee disposed proximate to the longitudinal ridge and extending across the cleaning width; a plurality of suction ports passing through the squeegee for providing a plurality of fluid passages for fluidly connecting the liquid collection volume and the vacuum chamber; and a vacuum for generating a negative air pressure within the vacuum chamber for drawing waste liquid collected within the liquid collection volume into the vacuum chamber. Some additional embodiments also include a waste storage container configured to receive the waste liquid from the vacuum chamber, at least one fluid conduit fluidly connecting the vacuum chamber and the waste storage container; and a fan assembly configured to generate a negative air pressure within the waste storage container and the vacuum chamber to thereby suction waste liquid up from the cleaning surface and deposit the waste liquid in the waste storage container. Other embodiments of the second collecting apparatus incorporate a squeegee attached to the chassis and formed with a longitudinal ridge disposed proximate to the cleaning surface and extending across the cleaning width for providing a liquid collection volume at a forward edge of the ridge, said longitudinal ridge collecting waste liquid within the liquid collection volume as the chassis is transported in the forward direction; a vacuum chamber partially formed by the squeegee disposed proximate to the longitudinal ridge and extending across the cleaning width; a plurality of suction ports passing through the squeegee for providing a plurality of fluid passages for fluidly connecting the liquid collection volume and the vacuum chamber; and a vacuum for generating a negative air pressure within the vacuum chamber for drawing waste liquid collected within the liquid collection volume into the vacuum chamber.

Still other embodiments of the above aspect include a waste storage container W configured to receive the waste liquid from the vacuum chamber, at least one fluid conduit fluidly connecting the vacuum chamber and the waste storage container; and, a fan assembly configured to generate a negative air pressure within the waste storage container and the vacuum chamber to thereby suction waste liquid from the cleaning surface and deposit the waste liquid in the waste storage container. In some embodiments, the fan assembly is configured to generate a positive air pressure at the air jet port.

In another aspect, the invention relates to an autonomous cleaning robot for transporting cleaning elements over a cleaning surface including a chassis, supported in rolling contact with the cleaning surface for transporting the chassis in a forward direction defined by a fore-aft axis, the chassis being further defined by a transverse axis; a first cleaning zone comprising cleaning elements attached to the chassis and arranged to collect loose particulates from the cleaning surface across a cleaning width, the cleaning width being disposed generally perpendicular with the fore-aft axis; a second cleaning zone comprising cleaning elements attached to the chassis and arranged to apply a cleaning fluid onto the cleaning surface and to collect a waste liquid from the cleaning surface across the cleaning width, said waste liquid comprising the cleaning fluid plus any contaminants removed from the cleaning surface by the cleaning fluid; and a motive drive subsystem controlled by a master control module and powered by a power module, the motive drive subsystem, master control module and power module each being electrically interconnected and attached to the chassis configured to autonomously transporting the robot over the cleaning surface and to clean the cleaning surface. In some embodiments of this aspect, the robot is configured with a circular cross-section having a vertical center axis and wherein said fore-aft axis, said transverse axis and said vertical axis are mutually perpendicular and wherein the motive drive subsystem is configured to rotate the robot about the center vertical axis for changing the orientation of the forward travel direction.

In another aspect, the invention relates to a surface cleaning apparatus having a chassis defined by a fore-aft axis and a perpendicular transverse axis, the chassis being supported for transport over the surface along the fore-aft axis, the chassis including a first collecting apparatus attached thereto and configured to collect loose particulates from the surface over a cleaning width disposed generally parallel with the transverse axis, the first collecting apparatus including an air jet port configured to expel a jet of air across the cleaning width; an air intake port configured to draw air and loose particulates in; wherein the air jet port and the air intake port are disposed at opposing ends of the cleaning width with the air jet port expelling the jet of air generally parallel with the surface and generally directed toward the air intake port. In an embodiment of the above aspect, the first collecting apparatus further includes a channel formed with generally opposed forward and aft edges, extending generally parallel with the transverse axis across the cleaning width, and generally opposed left and right edges, extending generally orthogonal to said forward and aft edges; wherein the air jet port is disposed at one of said left and right edges and the air intake port is disposed at the other of said left and right edges. In other embodiments, the surface cleaning apparatus further includes a first compliant doctor blade disposed across the cleaning width and fixedly attached to a bottom surface of the chassis proximate to said aft edge and extending from said bottom surface to the surface for guiding the jet of air and loose particulates across the cleaning width.

In other embodiments of the above aspect, the surface cleaning apparatus further includes a second compliant doctor blade fixedly attached to said bottom surface and extending from said bottom surface to the surface, for guiding the jet of air and loose particulates into the air intake port. In still other embodiments, the apparatus includes a rotary fan motor having a fixed housing and a rotating shaft extending therefrom; a fan impeller configured to move air when rotated about a rotation axis, said fan impeller being fixedly attached to the rotating shaft for rotation about the rotation axis by the fan motor; a housing for housing the fan impeller in a hollow cavity formed therein and for fixedly supporting the motor fixed housing thereon, the housing being further configured with an air intake port through which air is drawn in to the cavity, and an air exit port through which air is expelled out of the cavity when the impeller is rotated; and a first fluid conduit fluidly connected between the fan air intake port and the air intake port of said first collecting apparatus; therein each of the elements is attached to the chassis. In some embodiments, the apparatus includes a waste storage container attached to the chassis and fluidly interposed within said first fluid conduit between the fan air intake port and the air intake port. In some embodiments, the waste storage container is configured to be removable from the chassis by a user and to be emptied by the user.

Still other embodiments include an air filter element interposed within said first fluid conduit between the waste storage container and the fan air intake port for filtering loose contaminates from air being drawn in through the fan air intake port, and may also include a second fluid conduit fluidly connected between the fan exit port and the air jet port of said first collecting apparatus. In other embodiments, the surface cleaning apparatus further includes a second collecting apparatus attached to the chassis and disposed aft of the first collecting apparatus for collecting liquid from the surface over the cleaning width. In some embodiments, the second collecting zone includes a squeegee fixedly attached to the chassis aft of the first collecting apparatus and extending from a bottom surface of the chassis to the surface across the cleaning width for collecting liquid in a liquid collection volume formed between the squeegee and the surface, the squeegee further forming a vacuum chamber and providing a plurality of suction ports disposed across the cleaning width and fluidly connecting the vacuum chamber and the liquid collection volume; and a vacuum for generating a negative air pressure inside the vacuum chamber to thereby draw liquid into the vacuum chamber through the plurality of suction ports fluidly connected with the collection volume.

Other embodiments of the surface cleaning apparatus of the above aspect include a rotary fan motor having a fixed housing and a rotating shaft extending therefrom; a fan impeller configured to move air when rotated about a rotation axis, said fan impeller being fixedly attached to the rotating shaft for rotation about the rotation axis by the fan motor; a housing for housing the fan impeller in a hollow cavity formed therein and for fixedly supporting the motor fixed housing thereon, the housing being further configured with an air intake port through which air is drawn in to the cavity, and an air exit port through which air is expelled out of the cavity when the impeller is rotated; a first fluid conduit fluidly connected between the fan air intake port and the air intake port of said first collecting apparatus; and a third fluid conduit fluidly connected between the fan air intake port and the vacuum chamber; wherein these elements are attached to the chassis. The surface cleaning apparatus may also include a second fluid conduit fluidly connected between the fan exit port and the air jet port of said first collecting apparatus, and/or a waste storage container attached to the chassis and configured to store the liquid collected from the surface. Still other embodiments utilize a waste storage container attached to the chassis and configured to store the liquid collected from the surface, said waste storage container being fluidly interposed within said third fluid conduit. In some embodiments, the cleaning apparatus includes a waste storage container attached to the chassis and configured to store the liquid collected from the surface, said waste storage container being fluidly interposed within said first and said third fluid conduits. In certain cases, said waste storage container includes a sealed waste container for storing loose particulates collected by the first collecting apparatus and for storing liquid collected by the second collecting apparatus and having at least one access port formed therein for emptying waste from the container; and a plenum incorporated into a top wall of the sealed container such that the plenum is disposed vertically above the sealed waste container during operation of the cleaning apparatus; and wherein the plenum is configured with ports for fluidly interposing within each of said first, said second and said third fluid conduits.

In some embodiments, the waste storage container is configured to be removable from the chassis by a user and to be emptied by the user. Certain other embodiments include a cleaning fluid applicator assembly, attached to the chassis between the first collecting apparatus and the second collecting apparatus for applying a cleaning fluid onto the surface across the cleaning width; and a sealed cleaning fluid storage container for holding a supply of the cleaning fluid therein the storage container including at least one access port formed therein for filling the container with the cleaning fluid. In other embodiments, said sealed waste container and said sealed cleaning fluid container are integrated into a liquid storage container module and wherein the integrated liquid storage container module is configured to be removable from the chassis by a user for filling with cleaning fluid and for emptying waste therefrom. In some embodiments, the surface cleaning apparatus further includes a smearing element attached the chassis aft of the liquid applicator assembly and configured to smear the cleaning fluid across the cleaning width; and a scrubbing element attached to the chassis aft of the smearing element for scrubbing the surface across the cleaning width. In some embodiments, the surface cleaning apparatus further comprises a motive drive subsystem controlled by a master control module and power by a power module, each attached to the chassis, for autonomously transporting the surface cleaning apparatus over the surface.

In other embodiments, the surface cleaning apparatus further includes a sensor module configured to sense conditions and to generate electrical sensor signals in response to sensing said conditions; a signal line for communicating the electrical sensor signals to the master control module; and a controller incorporated within the master control module for implementing predefined operating modes in response to sensing said conditions. Still other embodiments include a motive drive subsystem controlled by a master control module and power by a power module, each attached to the chassis, for autonomously transporting the surface cleaning apparatus over the surface. Other embodiments of the surface cleaning apparatus further include a sensor module configured to sense conditions and to generate electrical sensor signals in response to sensing said conditions; a signal line for communicating the electrical sensor signals to the master control module; and a controller incorporated within the master control module for implementing predefined operating modes in response to sensing said conditions.

In yet another aspect, the invention relates to a surface cleaning apparatus having an autonomous transport drive subsystem controlled by a master control module, a sensor module for sensing conditions, a power module and cleaning elements all supported on a chassis and powered by the power module for moving the chassis over the surface in accordance with predefined operating modes and in response to conditions sensed by the sensor module, the elements being configured with a cleaning width disposed generally orthogonal to a forward transport direction and wherein the cleaning elements comprise; a first collecting apparatus for collecting loose particulates from the surface across the cleaning width, said first collecting apparatus A being positioned on the chassis to advance over the surface first as the chassis is transported in a forward transport direction; a cleaning fluid applicator for applying cleaning fluid onto the surface across the cleaning width, said cleaning fluid applicator being positioned on the chassis to advance over the surface second as the chassis is transported in a forward transport direction; a smearing element for smearing the cleaning fluid applied onto the surface across the cleaning width, said smearing element being positioned on the chassis to advance over the surface third as the chassis is transported in a forward transport direction; an active scrubbing element for actively scrubbing the surface across the cleaning width, said active scrubbing element being positioned on the chassis to advance over the surface fourth as the chassis is transported in a forward transport direction; a second collecting apparatus for collecting waste liquid from the surface, said second collecting apparatus being positioned on the chassis to advance over the surface fifth as the chassis is transported in a forward transport direction; and, an integrated storage container module comprising a waste storage container for storing loose particulates collected by said first collecting apparatus and waste liquid collected by said second collecting apparatus, a cleaning fluid supply container for storing a supply of the cleaning fluid, and wherein the integrated storage container module is configured to be removed from the chassis by a user, filled with cleaning fluid and emptied of waste and then reinstalled onto the chassis by the user.

In yet an additional aspect, the invention relates to a surface cleaning apparatus having a chassis defined by a fore-aft axis and a perpendicular transverse axis for supporting cleaning elements thereon and for transporting the cleaning elements over the surface along the fore-aft axis and wherein the cleaning elements are disposed to clean across a cleaning width disposed generally orthogonal to the fore-aft axis with a left end and a right end defining opposing edges of the cleaning width; and a liquid applicator comprising at least one nozzle disposed at one of said left end and said right end for ejecting cleaning fluid therefrom, said cleaning fluid being ejected with sufficient volume and pressure to distribute cleaning fluid across the cleaning width. In certain embodiments of the above aspect, the cleaning fluid comprises water and/or any one of soap, solvent, fragrance, disinfectant, emulsifier, drying agent and abrasive particulates.

In some embodiments of the above aspect, the apparatus includes a smearing element attached to the chassis aft of the position of the at least one nozzle and extending from the chassis to the surface across the cleaning width for smearing the cleaning fluid, and may include a scrubbing element attached to the chassis aft of the position of the at least one nozzle and extending from the chassis to the surface across the cleaning width for scrubbing the surface. In some embodiments, the scrubbing element is attached to the chassis aft of the position of the at least one nozzle and extending from the chassis to the surface across the cleaning width for scrubbing the surface. The cleaning apparatus may also include a collecting apparatus attached to the chassis aft of the position of the at least one nozzle and extending from the chassis to the surface across the cleaning width for collecting waste liquid from the surface. In some embodiments, the liquid applicator a first nozzle disposed at the left end for ejecting cleaning fluid therefrom, said cleaning fluid being ejected from the first nozzle with sufficient volume and pressure to distribute cleaning fluid across the cleaning width, a second nozzle disposed at the right end for ejecting cleaning fluid therefrom, said cleaning fluid being ejected from the second nozzle with sufficient volume and pressure to distribute cleaning fluid across the cleaning width; and wherein the first nozzle and the second nozzle are co-located on the fore-aft axis.

In certain embodiments of the above aspect each of the first and second nozzles ejects a discrete burst cleaning fluid in accordance with a burst frequency and wherein the burst frequency of the first nozzle is substantially opposite in phase with respect to the burst frequency of the second nozzle. In some embodiments, the surface cleaning apparatus also includes an autonomous transport drive subsystem, a sensor module for sensing conditions and a power module all supported by the chassis and controlled by a master control module to autonomously move the cleaning elements substantially over the entire surface over the surface in accordance with predefined operating modes and in response to conditions sensed by the sensor module. Still other embodiments utilize an autonomous transport drive subsystem, a sensor module for sensing conditions and a power module all supported by the chassis and controlled by a master control module to autonomously move the cleaning elements substantially over the entire surface over the surface in accordance with predefined operating modes and in response to conditions sensed by the sensor module.

Other embodiments of the above aspect include an autonomous transport drive subsystem, a sensor module for sensing conditions and a power module all supported by the chassis and controlled by a master control module to autonomously move the cleaning elements substantially over the entire surface over the surface in accordance with predefined operating modes and in response to conditions sensed by the sensor module. In some embodiments, the master control module is configured to vary the burst frequency in accordance with a desired rate for applying cleaning fluid onto surface, and in some cases, the master control module is configured to vary the burst frequency to apply cleaning fluid onto the surface at a substantially uniform volume of approximately 2 ml per square foot.

In some embodiments, the surface cleaning apparatus also includes a liquid storage container, carried on the chassis, for storing a supply of the cleaning fluid therein; a diaphragm pump assembly configured with a first a first pump portion for drawing cleaning fluid from the container and for delivering the cleaning fluid to the at least one nozzle; and a mechanical actuator for mechanically actuating the first pump portion. Still other embodiments include an autonomous transport drive subsystem, a sensor module for sensing conditions and a power module all supported by the chassis and controlled by a master control module to autonomously move the cleaning elements substantially over the entire surface over the surface in accordance with predefined operating modes and in response to conditions sensed by the sensor module; a liquid storage container, carried on the chassis, for storing a supply of the cleaning fluid therein; a diaphragm pump assembly having a first a first pump portion for drawing cleaning fluid from the container and for delivering the cleaning fluid to the first nozzle and a second pump portion for drawing cleaning fluid from the container and for delivering the cleaning fluid to the second nozzle; and a mechanical actuator for mechanically actuating the first pump portion and the second pump portion.

In certain embodiments of the above aspect, the diaphragm pump assembly includes a flexible element mounted between a non-flexible upper chamber element and a non-flexible lower chamber element, said flexible element being formed with a first pump chamber and a first actuator nipple attached thereto and a second pump chamber and a second actuator nipple attached thereto; an actuator link pivotally attached to the pump assembly for pivoting between a first actuator position and a second actuator position, the actuator link being fixedly attached to each of said first and said second actuator nipples and wherein movement of the actuator link toward the first actuator position decreases the volume the first pump chamber and increases the volume of the second pump chamber and further wherein movement of the actuator link toward the second actuator position increases the volume the first pump chamber and decreases the volume of the second pump chamber; a cam element configured with a circumferential cam profile and supported to move the actuator link between the first actuator position and the second actuator position; and a cam rotary drive, controlled by the master controller, for rotating the cam element in accordance with a cam rotary drive pattern.

In another aspect, the invention relates to a method for cleaning a surface with a cleaning apparatus, the method including the steps of transporting a chassis over the surface in a forward transport direction defined by a defined by a fore-aft axis, said chassis including cleaning elements supported thereon, and wherein the cleaning elements have a cleaning width disposed generally orthogonal to the fore-aft axis and wherein the cleaning width has a left end and an opposing right end; and ejecting a volume of cleaning fluid from a first nozzle attached to the chassis at one of said left end and said right end, said first nozzle being configured to eject cleaning fluid therefrom, said cleaning fluid being ejected with sufficient volume and pressure to distribute cleaning fluid across the cleaning width. In certain embodiments, the method may also include ejecting a volume of cleaning fluid from a second nozzle attached to the chassis at the other of said left end and said right end and co-located on the fore-aft axis with respect to the first nozzle, said second nozzle being configured to eject cleaning fluid therefrom, said cleaning fluid being ejected with sufficient volume and pressure to distribute cleaning fluid across the cleaning width; and ejecting cleaning fluid from each of the first nozzle and the second nozzle in discrete bursts of cleaning fluid in accordance with a burst frequency and wherein the burst frequency of the first nozzle is substantially opposite in phase with respect to the burst frequency of the second nozzle.

In still other embodiments, the method includes smearing the cleaning fluid across the cleaning width using a smearing element attached to the chassis aft of the co-located position of the first nozzle and the second nozzle, said smearing element extending across the cleaning width. Other embodiments may include scrubbing the surface across the cleaning width using a scrubbing element attached to the chassis aft of the co-located position of the first nozzle and the second nozzle, said scrubbing element extending across the cleaning width. Still other embodiments include collecting waste liquid from the surface across the cleaning width using a collecting apparatus attached to the chassis aft of the co-located position of the first nozzle and the second nozzle, said collecting apparatus extending across the cleaning width. In some embodiments of the method of the above aspect, the chassis further includes an autonomous transport drive subsystem, a sensor module for sensing conditions and a power module all supported thereon and controlled by a master control module and wherein transporting the chassis over the surface further includes controlling the transport drive subsystem in accordance with predefined operating modes and in response to conditions sensed by the sensor module to transport the cleaning elements substantially over the entire surface.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE EMBODIMENTS

Figure 1:
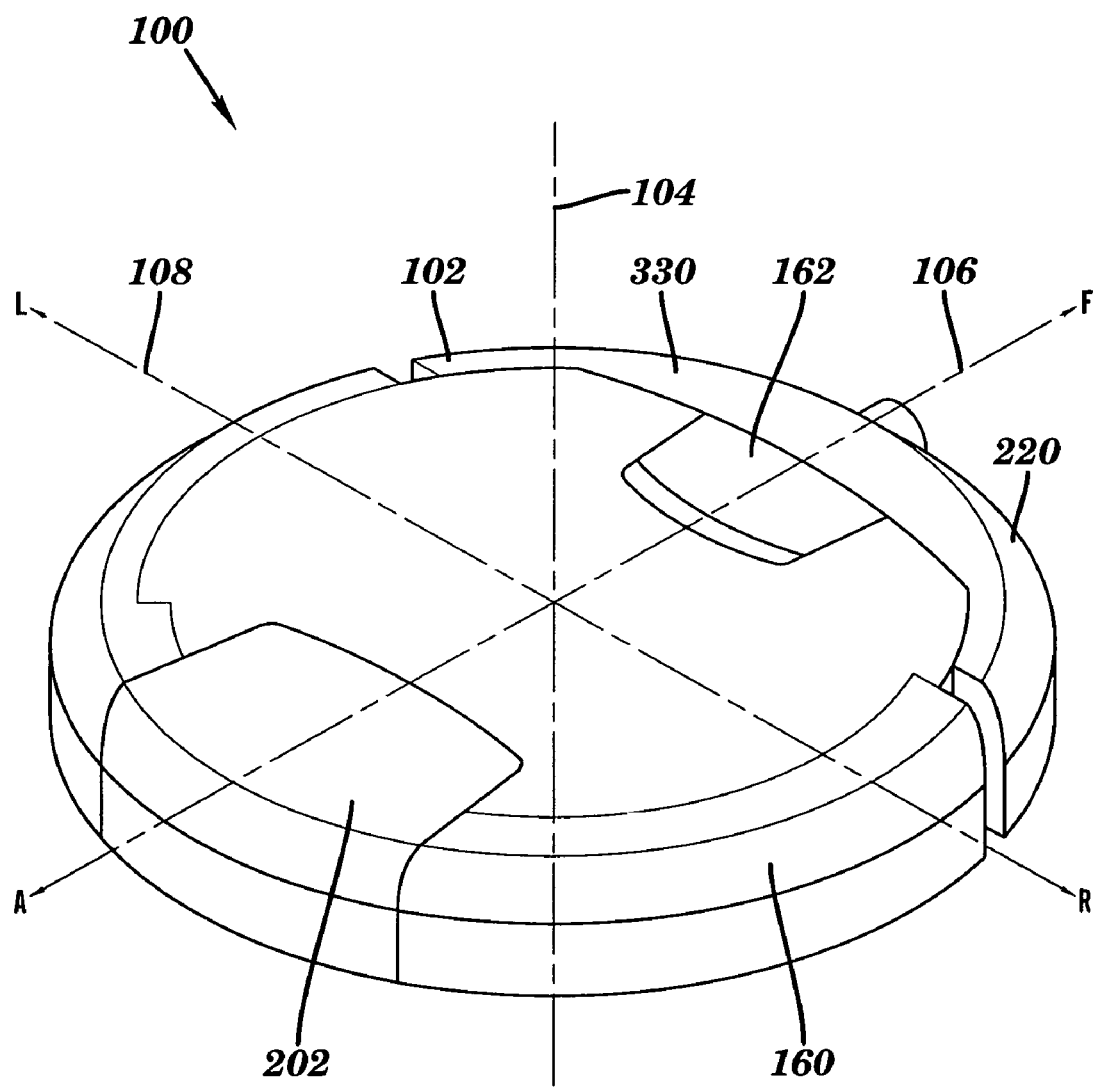
FIG. 1 depicts an isometric view of a top surface of an autonomous cleaning robot according to the present invention.

Referring now to the drawings where like reference numerals identify corresponding or similar elements throughout the several views, FIG. 1 depicts an isometric view showing the external surfaces of an autonomous cleaning robot 100 according to a preferred embodiment of the present invention. The robot 100 is configured with a cylindrical volume having a generally circular cross-section 102 with a top surface and a bottom surface that is substantially parallel and opposed to the top surface. The circular cross-section 102 is defined by three mutually perpendicular axes; a central vertical axis 104, a fore-aft axis 106, and a transverse axis 108. The robot 100 is movably supported with respect to a surface to be cleaned, hereinafter, the cleaning surface. The cleaning surface is substantially horizontal. The robot 100 is generally supported in rolling contact with the cleaning surface by a plurality of wheels or other rolling elements attached to a chassis 200. In a preferred embodiment, the fore-aft axis 108 defines a transport axis along which the robot is advanced over the cleaning surface. The robot is generally advanced in a forward or fore travel direction, designated F, during cleaning operations. The opposite travel direction, (i.e. opposed by 180°), is designated A for aft. The robot is generally not advanced in the aft direction during cleaning operations but may be advanced in the aft direction to avoid an object or maneuver out of a corner or the like. Cleaning operations may continue or be suspended during aft transport. The transverse axis 108 is further defined by the labels R for right and L for left, as viewed from the top view of FIG. 1. In subsequent figures, the R and L direction remain consistent with the top view, but may be reversed on the printed page. In a preferred embodiment of the present invention, the diameter of the robot circular cross-section 102 is approximately 370 mm (14.57 inches) and the height of the robot 100 above the cleaning surface of approximately 85 mm (3.3 inches). However, the autonomous cleaning robot 100 of the present invention may be built with other cross-sectional diameter and height dimensions, as well as with other cross-sectional shapes, e.g. square, rectangular and triangular, and volumetric shapes, e.g. cube, bar, and pyramidal.

The robot 100 may include a user input control panel, not shown, disposed on an external surface, e.g. the top surface, with one or more user manipulated actuators disposed on the control panel. Actuation of a control panel actuator by a user generates an electrical signal, which is interpreted to initiate a command. The control panel may also include one or more mode status indicators such as visual or audio indicators perceptible by a user. In one example, a user may set the robot onto the cleaning surface and actuate a control panel actuator to start a cleaning operation. In another example, a user may actuate a control panel actuator to stop a cleaning operation.

Figure 2:
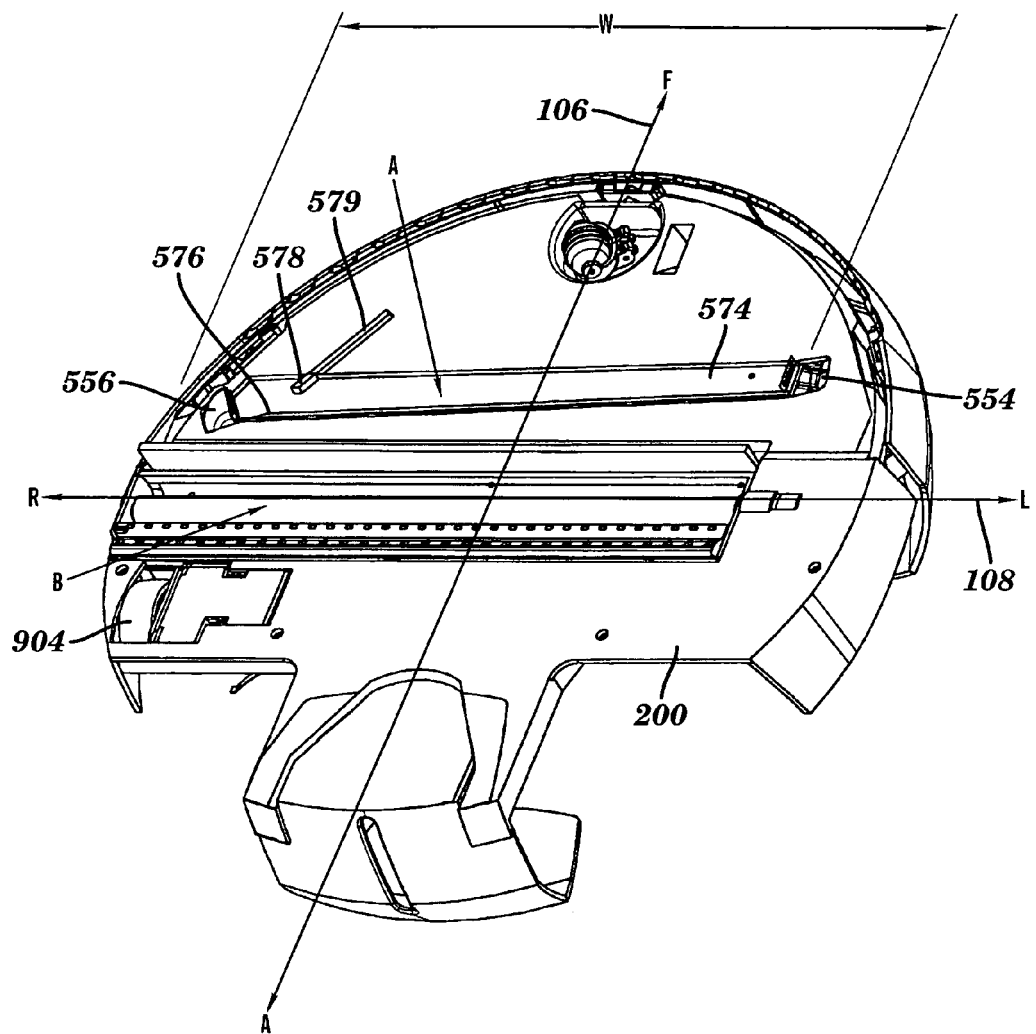
FIG. 2 depicts an isometric view of a bottom surface of a chassis of an autonomous cleaning robot according to the present invention.

Referring now to FIG. 2, the autonomous robot 100 includes a plurality of cleaning modules supported on a chassis 200 for cleaning the substantially horizontal cleaning surface as the robot is transported over the cleaning surface. The cleaning modules extend below the robot chassis 200 to contact or otherwise operate on the cleaning surface during cleaning operations. More specifically, the robot 100 is configured with a first cleaning zone A for collecting loose particulates from the cleaning surface and for storing the loose particulates in a receptacle carried by the robot. The robot 100 is further configured with a second cleaning zone B that at least applies a cleaning fluid onto the cleaning surface. The cleaning fluid may be clean water alone or clean water mixed with other ingredients to enhance cleaning. The application of the cleaning fluid serves to dissolve, emulsify or otherwise react with contaminants on the cleaning surface to separate contaminants therefrom. Contaminants may become suspended or otherwise combined with the cleaning fluid. After the cleaning fluid has been applied onto the surface, it mixes with contaminants and becomes waste material, e.g. a liquid waste material with contaminants suspended or otherwise contained therein.

The underside of the robot 100 is shown in FIG. 2 which depicts a first cleaning zone A disposed forward of the second cleaning zone B with respect to the fore-aft axis 106. Accordingly, the first cleaning zone A precedes the second cleaning zone B over the cleaning surface when the robot 100 travels in the forward direction. The first and second cleaning zones are configured with a cleaning width W that is generally oriented parallel or nearly parallel with the transverse axis 108. The cleaning width W defines the cleaning width or cleaning footprint of the robot. As the robot 100 advances over the cleaning surface in the forward direction, the cleaning width is the width of cleaning surface cleaned by the robot in a single pass. Ideally, the cleaning width extends across the full transverse width of the robot 100 to optimize cleaning efficiency; however, in a practical implementation, the cleaning width is slightly narrower that the robot transverse width due to spatial constraints on the robot chassis 200.

According to the present invention, the robot 100 traverses the cleaning surface in a forward direction over a cleaning path with both cleaning zones operating simultaneously. In a preferred embodiment, the nominal forward velocity of the robot is approximately 4.75 inches per second however; the robot and cleaning devices may be configured to clean at faster and slower forward velocities. The first cleaning zone A precedes the second cleaning zone B over the cleaning surface and collects loose particulates from the cleaning surface across the cleaning width W. The second cleaning zone B applies cleaning fluid onto the cleaning surface across the cleaning width W. The second cleaning zone may also be configured to smear the cleaning fluid applied onto the cleaning surface to smooth the cleaning fluid into a more uniform layer and to mix the cleaning fluid with contaminants on the cleaning surface. The second cleaning zone B may also be configured to scrub the cleaning surface across the cleaning width. The scrubbing action agitates the cleaning fluid to mix it with contaminants. The scrubbing action also applies a shearing force against contaminants to thereby dislodge contaminants from the cleaning surface. The second cleaning zone B may also be configured to collect waste liquid from cleaning surface across the cleaning width. According to the invention, a single pass of the robot over a cleaning path first collects loose particulates up from the cleaning surface across the cleaning width and thereafter applies a cleaning fluid onto the cleaning surface generally across the cleaning width W to interact with contaminants remaining on the cleaning surface and may further apply a scrubbing action to dislodge contaminants from the cleaning surface. A single pass of the robot 100 over a cleaning path may also smear the cleaning fluid more uniformly on the cleaning surface. A single pass of the robot over a cleaning path may also collect waste liquid up from the cleaning surface.

In general, the cleaning robot 100 is configured to clean uncarpeted indoor hard floor surface, e.g. floors covered with tiles, wood, vinyl, linoleum, smooth stone or concrete and other manufactured floor covering layers that are not overly abrasive and that do not readily absorb liquid. Other embodiments, however, may be adapted to clean, process, treat, or otherwise traverse abrasive, liquid-absorbing, and other surfaces. In addition, in a preferred embodiment of the present invention, the robot 100 is configured to autonomously transport over the floors of small enclosed furnished rooms such as are typical of residential homes and smaller commercial establishments. The robot 100 is not required to operate over predefined cleaning paths but may move over substantially all of the cleaning surface area under the control of various transport algorithms designed to operate irrespective of the enclosure shape or obstacle distribution. In particular, the robot 100 of the present invention moves over cleaning paths in accordance with preprogrammed procedures implemented in hardware, software, firmware, or combinations thereof to implement a variety of modes, such as three basic operational modes, i.e., movement patterns, that can be categorized as: (1)

a "spot-coverage" mode; (2) a "wall/obstacle following" mode; and (3) a "bounce" mode. In addition, the robot 100 is preprogrammed to initiate actions based upon signals received from sensors incorporated therein, where such actions include, but are not limited to, implementing one of the movement patterns above, an emergency stop of the robot 100, or issuing an audible alert. These operational modes of the robot of the present invention are specifically described in U.S. Pat. No. 6,809,490, by Jones et al., entitled, Method and System for Multi-Mode Coverage for an Autonomous Robot, the entire disclosure of which is herein incorporated by reference it its entirety.

In a preferred embodiment, the robot 100 is configured to clean approximately 150 square feet of cleaning surface in a single cleaning operation. The duration of the cleaning operation is approximately 45 minutes. Accordingly, the robot systems are configured for unattended autonomous cleaning for 45 minutes or more without the need to recharge a power supply, refill the supply of cleaning fluid or empty the waste materials collected by the robot.

Figure 3:
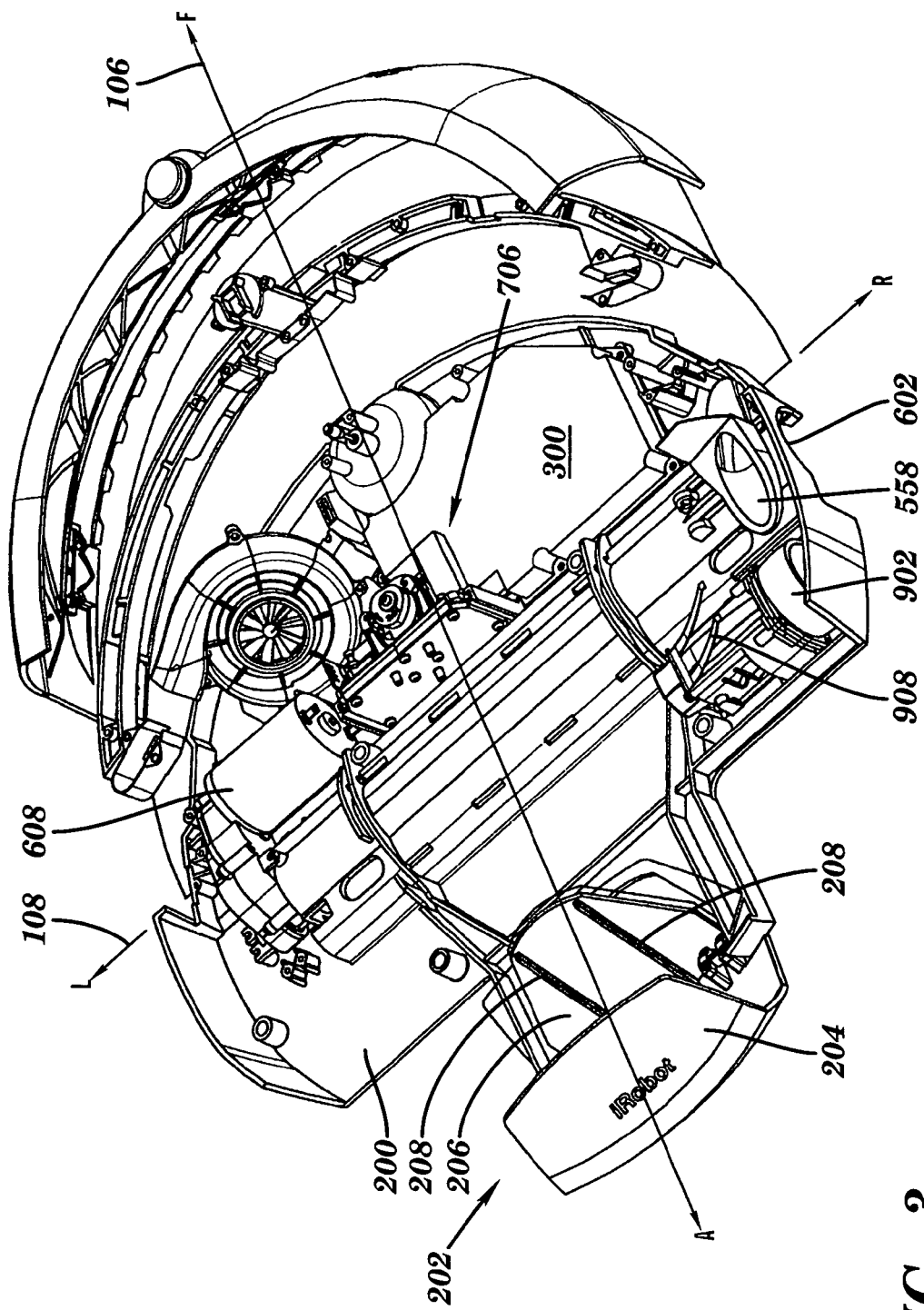
FIG. 3 depicts an exploded view of a robot chassis having robot subsystems attached thereto according to the present invention.
Figure 4:
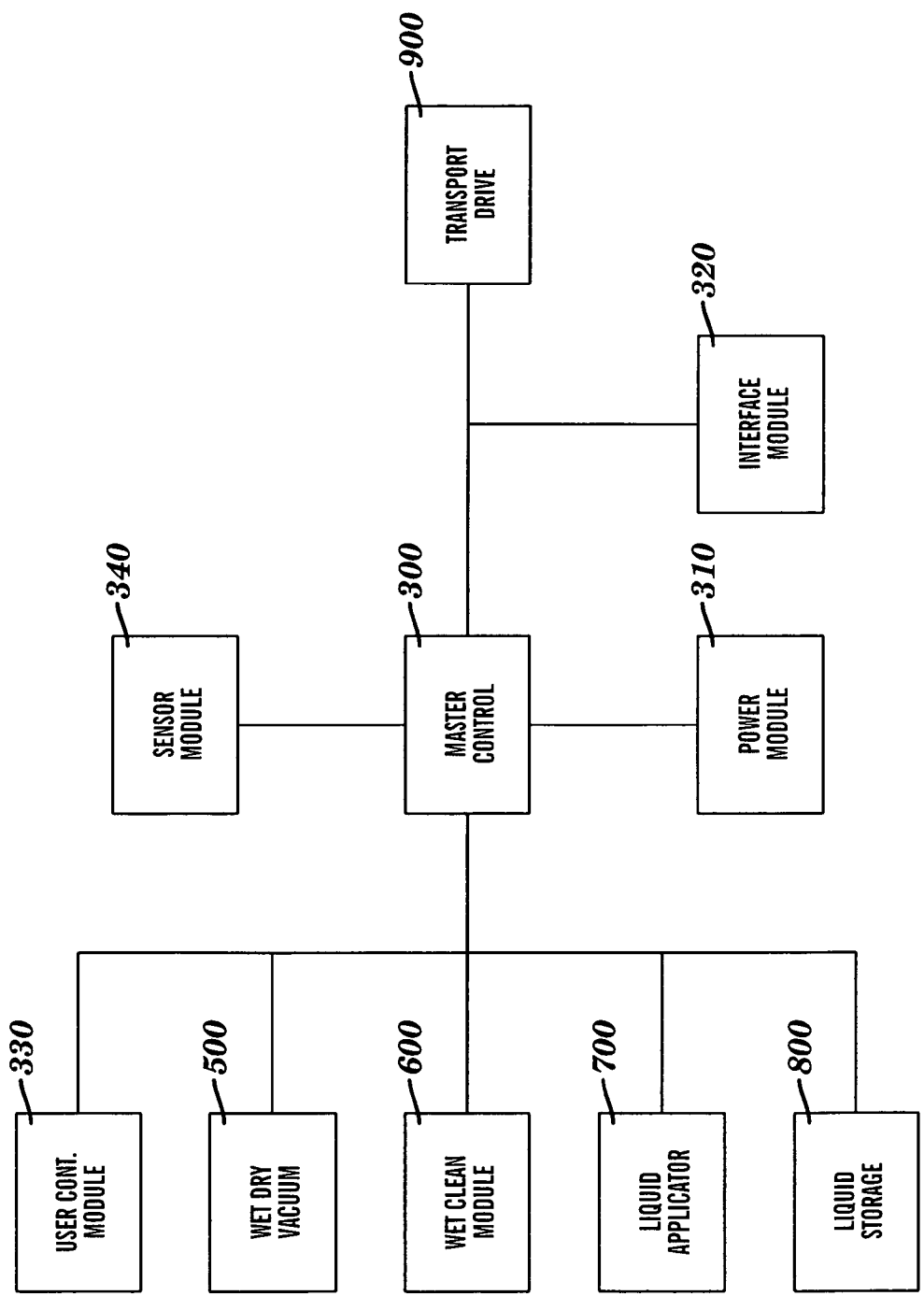
FIG. 4 depicts a schematic block diagram showing the interrelationship of subsystems of an autonomous cleaning robot according to the present invention.

As shown in FIGS. 2 and 3 the robot 100 includes a plurality of subsystems mounted to a robot chassis 200. The major robot subsystems are shown schematically in FIG. 4 which depicts a master control module 300 interconnected for two-way communication with each of a plurality of other robot subsystems. The interconnection of the robot subsystems is provided via network of interconnected wires and or conductive elements, e.g. conductive paths formed on an integrated printed circuit board or the like, as is well known. The master control module 300 at least includes a programmable or preprogrammed digital data processor, e.g. a microprocessor, for performing program steps, algorithms and or mathematical and logical operations as may be required. The master control module 300 also includes a digital data memory in communication with the data processor for storing program steps and other digital data therein. The master control module 300 also includes one or more clock elements for generating timing signals as may be required.

A power module 310 delivers electrical power to all of the major robot subsystems. The power module includes a self-contained power source attached to the robot chassis 200, e.g. a rechargeable battery, such as a nickel metal hydride battery, or the like. In addition, the power source is configured to be recharged by any one of various recharging elements and or recharging modes, or the battery may be replaced by a user when it becomes discharged or unusable. The master control module 300 may also interface with the power module 310 to control the distribution of power, to monitor power use and to initiate power conservation modes as required.

The robot 100 may also include one or more interface modules or elements 320. Each interface module 320 is attached to the robot chassis to provide an interconnecting element or port for interconnecting with one or more external devices. Interconnecting elements and ports are preferably accessible on an external surface of the robot. The master control module 300 may also interface with the interface modules 320 to control the interaction of the robot 100 with an external device. In particular, one interface module element is provided for charging the rechargeable battery via an external power supply or power source such as a conventional AC or DC power outlet. Another interface module element may be configured for one or two way communications over a wireless network and further interface module elements may be configured to interface with one or more mechanical devices to exchange liquids and loose particulates therewith, e.g. for filling a cleaning fluid reservoir or for draining or emptying a waste material container.

Accordingly, the interface module 320 may comprise a plurality of interface ports and connecting elements for interfacing with active external elements for exchanging operating commands, digital data and other electrical signals therewith. The interface module 320 may further interface with one or more mechanical devices for exchanging liquid and or solid materials therewith. The interface module 320 may also interface with an external power supply for charging the robot power module 310. Active external devices for interfacing with the robot 100 may include, but are not limited to, a floor standing docking station, a hand held remote control device, a local or remote computer, a modem, a portable memory device for exchanging code and or data with the robot and a network interface for interfacing the robot 100 with any device connected to the network. In addition, the interface module 320 may include passive elements such as hooks and or latching mechanisms for attaching the robot 100 to a wall for storage or for attaching the robot to a carrying case or the like.

In particular, an active external device according to one aspect of the present invention confines the robot 100 in a cleaning space such as a room by emitting radiation in a virtual wall pattern. The robot 100 is configured to detect the virtual wall pattern and is programmed to treat the virtual wall pattern as a room wall so that the robot does not pass through the virtual wall pattern. This particular aspect of the present invention is specifically described in U.S. Pat. No. 6,690,134 by Jones et al., entitled Method and System for Robot Localization and Confinement, the entire disclosure of which is herein incorporated by reference it its entirety.

Another active external device according to a further aspect of the present invention comprises a robot base station used to interface with the robot. The base station may comprise a fixed unit connected with a household power supply, e.g. and AC power wall outlet and or other household facilities such as a water supply pipe, a waste drain pipe and a network interface. According to invention, the robot 100 and the base station are each configured for autonomous docking and the base station may be further configure to charge the robot power module 310 and to service the robot in other ways. A base station and autonomous robot configured for autonomous docking and for recharging the robot power module is specifically described in U.S. patent application Ser. No. 10/762,219, by Cohen, et al., filed on Jan. 21, 2004, entitled Autonomous Robot Auto-Docking and Energy Management Systems and Methods, the entire disclosure of which is herein incorporated by reference it its entirety.

The autonomous robot 100 includes a self-contained motive transport drive subsystem 900 which is further detailed below. The transport drive 900 includes three wheels extending below the chassis 200 to provide three points of rolling support with respect to the cleaning surface. A nose wheel is attached to the robot chassis 200 at a forward edge thereof, coaxial with the fore-aft axis 106, and a pair of drive wheels attached to the chassis 200 aft of the transverse axis 108 and rotatable about a drive axis that is parallel with the transverse axis 108. Each drive wheel is separately driven and controlled to advance the robot in a desired direction. In addition, each drive wheel is configured to provide sufficient drive friction as the robot operates on a cleaning surface that is wet with cleaning fluid. The nose wheel is configured to self align with the direction of travel. The drive wheels may be controlled to move the robot 100 forward or aft in a straight line or along an arcuate path.

The robot 100 further includes a sensor module 340. The sensor module 340 comprises a plurality of sensors attached to the chassis and or integrated with robot subsystems for sensing external conditions and for sensing internal conditions. In response to sensing various conditions, the sensor module 340 may generate electrical signals and communicate the electrical signals to the control module 300. Individual sensors may perform such functions as detecting walls and other obstacles, detecting drop offs in the cleaning surface, called cliffs, detecting dirt on the floor, detecting low battery power, detecting an empty cleaning fluid container, detecting a full waste container, measuring or detecting drive wheel velocity distance traveled or slippage, detecting nose wheel rotation or cliff drop off, detecting cleaning system problems such rotating brush stalls or vacuum system clogs, detecting inefficient cleaning, cleaning surface type, system status, temperature, and many other conditions. In particular, several aspects of the sensor module 340 of the present invention as well as and its operation, especially as it relates to sensing external elements and conditions are specifically described in U.S. Pat. No. 6,594,844, by Jones, entitled Robot Obstacle Detection System, and U.S. patent application Ser. No. 11/166,986, by Casey et al., filed on Jun. 24, 2005, entitled Obstacle Following Sensor Scheme for a Mobile Robot, the entire disclosures of which are herein incorporated by reference it their entireties.

The robot 100 may also include a user control module 330. The user control module 330 provides one or more user input interfaces that generate an electrical signal in response to a user input and communicate the signal to the master control module 300. In one embodiment of the present invention, the user control module, described above, provides a user input interface, however, a user may enter commands via a hand held remote control device, a programmable computer or other programmable device or via voice commands. A user may input user commands to initiate actions such as power on/off, start, stop or to change a cleaning mode, set a cleaning duration, program cleaning parameters such as start time and duration, and or many other user initiated commands. User input commands, functions, and components contemplated for use with the present invention are specifically described in U.S. patent application Ser. No. 11/166,891, by Dubrovsky et al., filed on Jun. 24, 2005, entitled Remote Control Scheduler and Method for Autonomous Robotic Device, the entire disclosure of which is herein incorporated by reference it its entirety.

Cleaning Zones

Referring now to FIG. 2, a bottom surface of a robot chassis 200 is shown in isometric view. As shown therein, a first cleaning zone A is disposed forward of a second cleaning zone B with respect to the fore-aft axis 106. Accordingly, as the robot 100 is transported in the forward direction the first cleaning zone A precedes the second cleaning zone B over the cleaning surface. Each cleaning zone A and B has a cleaning width W disposed generally parallel with the transverse axis 108. Ideally, the cleaning width of each cleaning zone is substantially identical however, the actual cleaning width of the cleaning zones A and B may be slightly different. According to a preferred embodiment of the present invention, the cleaning width W is primarily defined by the second cleaning zone B which extends from proximate to the right circumferential edge of a bottom surface of the robot chassis 200 substantially parallel with the transverse axis 108 and is approximately 296 mm (11.7 inches) long. By locating the cleaning zone B proximate the right circumferential edge, the robot 100 may maneuver its right circumferential edge close to a wall or other obstacle for cleaning the cleaning surface adjacent to the wall or obstacle. Accordingly, the robot movement patterns include algorithms for transporting the right side of the robot 100 adjacent to each wall or obstacle encountered by the robot during a cleaning cycle. The robot 100 is therefore said to have a dominant right side. Of course, the robot 100 could be configured with a dominant left side instead. The first cleaning zone A is positioned forward of the transverse axis 108 and has a slightly narrower cleaning width than the second cleaning zone B, simply because of the circumference shape of the robot 100. However, any cleaning surface area not cleaned by the first cleaning zone A is cleaned by the second cleaning zone B.

First Cleaning Zone

The first cleaning zone A is configured to collect loose particulates from the cleaning surface. In a preferred embodiment, an air jet is generated by an air moving system which includes an air jet port 554 disposed on a left edge of the first cleaning zone A. The air jet port 554 expels a continuous jet or stream of pressurized air therefrom. The air jet port 554 is oriented to direct the air jet across the cleaning width from left to right. Opposed to the air jet port 554, an air intake port 556 is disposed on a right edge of the first cleaning zone A. The air moving system generates a negative air pressure zone in the conduits connected to the intake port 556, which creates a negative air pressure zone proximate to the intake port 556. The negative air pressure zone suctions loose particulates and air into the air intake port 556 and the air moving system is further configured to deposit the loose particulates into a waste material container carried by the robot 100. Accordingly, pressurized air expelled from the air jet port 554 moves across the cleaning width within the first cleaning zone A and forces loose particulates on the cleaning surface toward a negative air pressure zone proximate to the air intake port 556. The loose particulates are suctioned up from the cleaning surface through the air intake port 556 and deposited into a waste container carried by the robot 100.

The first cleaning zone A is further defined by a nearly rectangular channel formed between the air jet port 554 and the air intake port 556. The channel is defined by opposing forward and aft walls of a rectangular recessed area 574, which is a contoured shape formed in the bottom surface of the robot chassis 200. The forward and aft walls are substantially transverse to the fore-aft axis 106. The channel is further defined by a first compliant doctor blade 576, attached to the robot chassis 200, e.g. along the aft edge of the recessed area 574, and extending from the chassis bottom surface to the cleaning surface. The doctor blade is mounted to make contact or near contact with the cleaning surface. The doctor blade 576 is preferably formed from a thin flexible and compliant molded material e.g. a 1-2 mm thick bar shaped element molded from neoprene rubber or the like. The doctor blade 576, or at least a portion of the doctor blade, may be coated with a low friction material, e.g. a fluoropolymer resin for reducing friction between the doctor blade and the cleaning surface. The doctor blade 576 may be attached to the robot chassis 200 by an adhesive bond or by other suitable means.

The channel of the first cleaning zone A provides an increased volume between the cleaning surface and the bottom surface of the robot chassis 200 local to the first cleaning zone A. The increased volume guides airflow between the jet port 554 and the air intake port 556, and the doctor blade 576 prevents loose particulates and airflow from escaping the first cleaning zone A in the aft direction. In addition to guiding the air jet and the loose particulates across the cleaning width, the first doctor blade 576 may also exert a friction force against contaminants on the cleaning surface to help loosen contaminants from the cleaning surface as the robot moves in the forward direction. The first compliant doctor blade 576 is configured to be sufficiently compliant to adapt its profile form conforming to discontinuities in the cleaning surface, such a door jams moldings and trim pieces, without hindering the forward travel of the robot 100.

A second compliant doctor blade 578 may also be disposed in the first cleaning zone A to further guide the air jet toward the negative pressure zone surrounding the air intake port 554. The second compliant doctor blade is similar in construction to the first compliant doctor blade 576 and attaches to the bottom surface of the robot chassis 200 to further guide the air and loose particulates moving through the channel. In one example, a second recessed area 579 is formed in the bottom surface of the chassis 200 and the second compliant doctor blade 576 protrudes into the first recessed area 574 at an acute angle typically between 30-60° with respect to the traverse axis 108. The second compliant doctor blade extends from the forward edge of the recessed area 574 and protrudes into the channel approximately ⅓ to ½ of channel fore-aft dimension.

The first cleaning zone A traverses the cleaning surface along a cleaning path and collects loose particulates along the cleaning width. By collecting the loose particulates prior to the second cleaning zone B passing over the cleaning path, the loose particulates are collected before the second cleaning zone applies cleaning fluid onto the cleaning surface. One advantage of removing the loose particulates with the first cleaning zone is that the loose particulates are removed while they are still dry. Once the loose particulates absorb cleaning fluid applied by the second cleaning zone, they are more difficult to collect. Moreover, the cleaning fluid absorbed by the loose particulates is not available for cleaning the surface so the cleaning efficiency of the second cleaning zone B may be degraded.

In another embodiment, the first cleaning zone may be configured with other cleaning elements such as counter-rotating brushes extending across the cleaning width to flick loose particulates into a receptacle. In another embodiment, an air moving system may be configured to draw air and loose particulates up from the cleaning surface through an elongated air intake port extending across the cleaning width. In particular, other embodiments usable to provide a first cleaning zone according to the present invention are disclosed in U.S. Pat. No. 6,883,201, by Jones et al. entitled Autonomous Floor-Cleaning Robot, the entire disclosure of which is herein incorporated by reference it its entirety.

Second Cleaning Zone

The second cleaning zone B includes a liquid applicator 700 configured to apply a cleaning fluid onto the cleaning surface and the cleaning fluid is preferably applied uniformly across the entire cleaning width. The liquid applicator 700 is attached to the chassis 200 and includes at least one nozzle configured to spray the cleaning fluid onto the cleaning surface. The second cleaning zone B may also include a scrubbing module 600 for performing other cleaning tasks across the cleaning width after the cleaning fluid has been applied onto the cleaning surface. The scrubbing module 600 may include a smearing element disposed across the cleaning width for smearing the cleaning fluid to distribute it more uniformly on the cleaning surface. The second cleaning zone B may also include a passive or active scrubbing element configured to scrub the cleaning surface across the cleaning width. The second cleaning zone B may also include a second collecting apparatus configured to collect waste materials up from the cleaning surface across the cleaning width, and the second collecting apparatus is especially configured for collecting liquid waste materials.

Liquid Applicator Module

Figure 5:
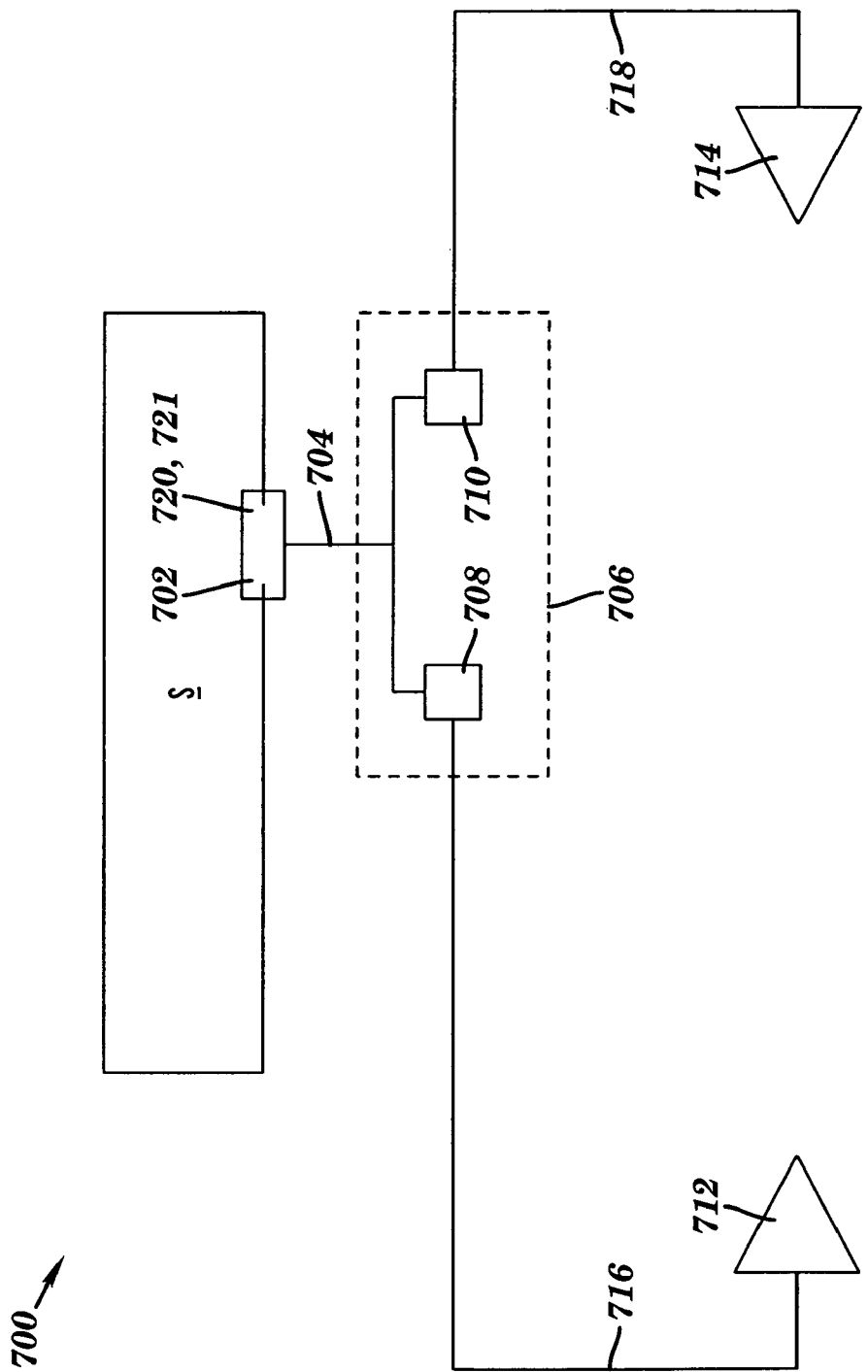
FIG. 5 depicts a schematic representation of a liquid applicator assembly according to the present invention.

The liquid applicator module 700, shown schematically in FIG. 5, is configured to apply a measured volume of cleaning fluid onto the cleaning surface across the cleaning width. The liquid applicator module 700 receives a supply of cleaning fluid from a cleaning fluid supply container S, carried on the chassis 200, and pumps the cleaning fluid through one or more spray nozzles disposed on the chassis 200. The spray nozzles are attached to the robot chassis 200 aft of the first cleaning zone A and each nozzle is oriented to apply cleaning fluid onto the cleaning surface. In a preferred embodiment, a pair of spray nozzle are attached to the robot chassis 200 at distal left and right edges of the cleaning width W. Each nozzle is oriented to spray cleaning fluid toward the opposing end of the cleaning width. Each nozzles is separately pumped to eject a spray pattern and the pumping stroke of each nozzle occurs approximately 180 degrees out phase with respect to the other nozzle so that one of the two nozzles is always applying cleaning fluid.

Referring to FIG. 5, the liquid applicator module 700 includes a cleaning fluid supply container S, which is carried by the chassis 200 and removable therefrom by a user to refill the container with cleaning fluid. The supply container S is configured with a drain or exit aperture 702 formed through a base surface thereof. A fluid conduit 704 receives cleaning fluid from the exit aperture 702 and delivers a supply of cleaning fluid to a pump assembly 706. The pump assembly 706 includes left and right pump portions 708 and 710, driven by a rotating cam, shown in FIG. 7. The left pump portion 708 pumps cleaning fluid to a left spray nozzle 712 via a conduit 716 and the right pump portion 710 pumps cleaning fluid to a right spray nozzle 714 via a conduit 718.

Figure 6:
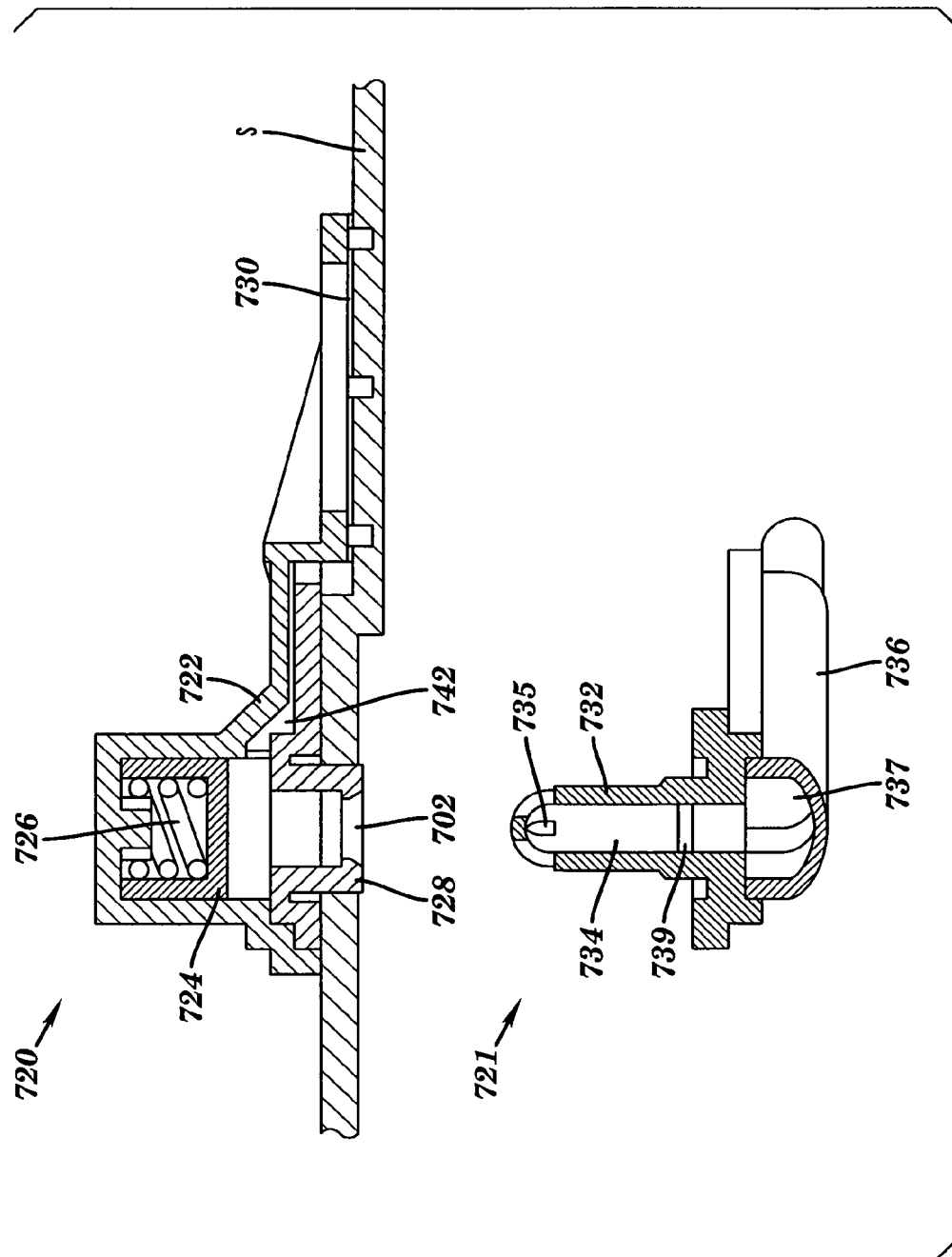
FIG. 6 depicts a schematic section view taken through a stop valve assembly installed within a cleaning fluid supply tank according to the present invention.

A stop valve assembly, shown in section view in FIG. 6, includes a female upper portion 720, installed inside the supply container S, and a male portion 721 attached to the chassis 200. The female portion 720 nominally closes and seals the exit aperture 702. The male portion 721 opens the exit aperture 702 to provide access to the cleaning fluid inside the supply container S. The female portion 720 includes an upper housing 722, a spring biased movable stop 724, a compression spring 726 for biasing the stop 724 to a closed position, and a gasket 728 for sealing the exit aperture 702. The upper housing 722 may also support a filter element 730 inside the supply container S for filtering contaminants from the cleaning fluid before the fluid exits the supply container S.

The stop valve assembly male portion 721 includes a hollow male fitting 732 formed to insert into the exit aperture 702 and penetrate the gasket 728. Insertion of the hollow male fitting 732 into the exit aperture 702 forces the movable stop 724 upward against the compression spring 726 to open the stop valve. The hollow male fitting 732 is formed with a flow tube 734 along it central longitudinal axis and the flow tube 734 includes one or more openings 735 at its uppermost end for receiving cleaning fluid into the flow tube 734. At its lower end, the flow tube 734 is in fluid communication with a hose fitting 736 attached to or integrally formed with the male fitting 732. The hose fitting 736 comprises a tube element having a hollow fluid passage 737 passing therethrough, and attaches to hose or fluid conduit 704 that receives fluid from the hose fitting 736 and delivers the fluid to the pump assembly 706. The flow tube 734 may also include a user removable filter element 739 installed therein for filtering the cleaning fluid as it exits the supply container S.

According to the invention, the stop valve male portion 721 is fixed to the chassis 200 and engages with the female portion 720, which is fixed to the container S. When the container S is installed onto the chassis in its operating position the male portion 721 engages with the female portion 720 to open the exit aperture 702. A supply of cleaning fluid flows from the supply container S to the pump assembly 706 and the flow may be assisted by gravity or suctioned by the pump assembly or both.

The hose fitting 736 is further equipped with a pair of electrically conductive elements, not shown, disposed on the internal surface of the hose fitting fluid flow passage 737 and the pair of conductive elements inside the flow chamber are electrically isolated from each other. A measurement circuit, not shown, creates an electrical potential difference between the pair of electrically conductive elements and when cleaning fluid is present inside the flow passage 737 current flows from one electrode to the other through the cleaning fluid and the measurement circuit senses the current flow. When the container S is empty, the measurement circuit fails to sense the current flow and in response sends a supply container empty signal to the master controller 300. In response to receiving the supply container empty signal, the master controller 300 takes an appropriate action.

Figure 7:
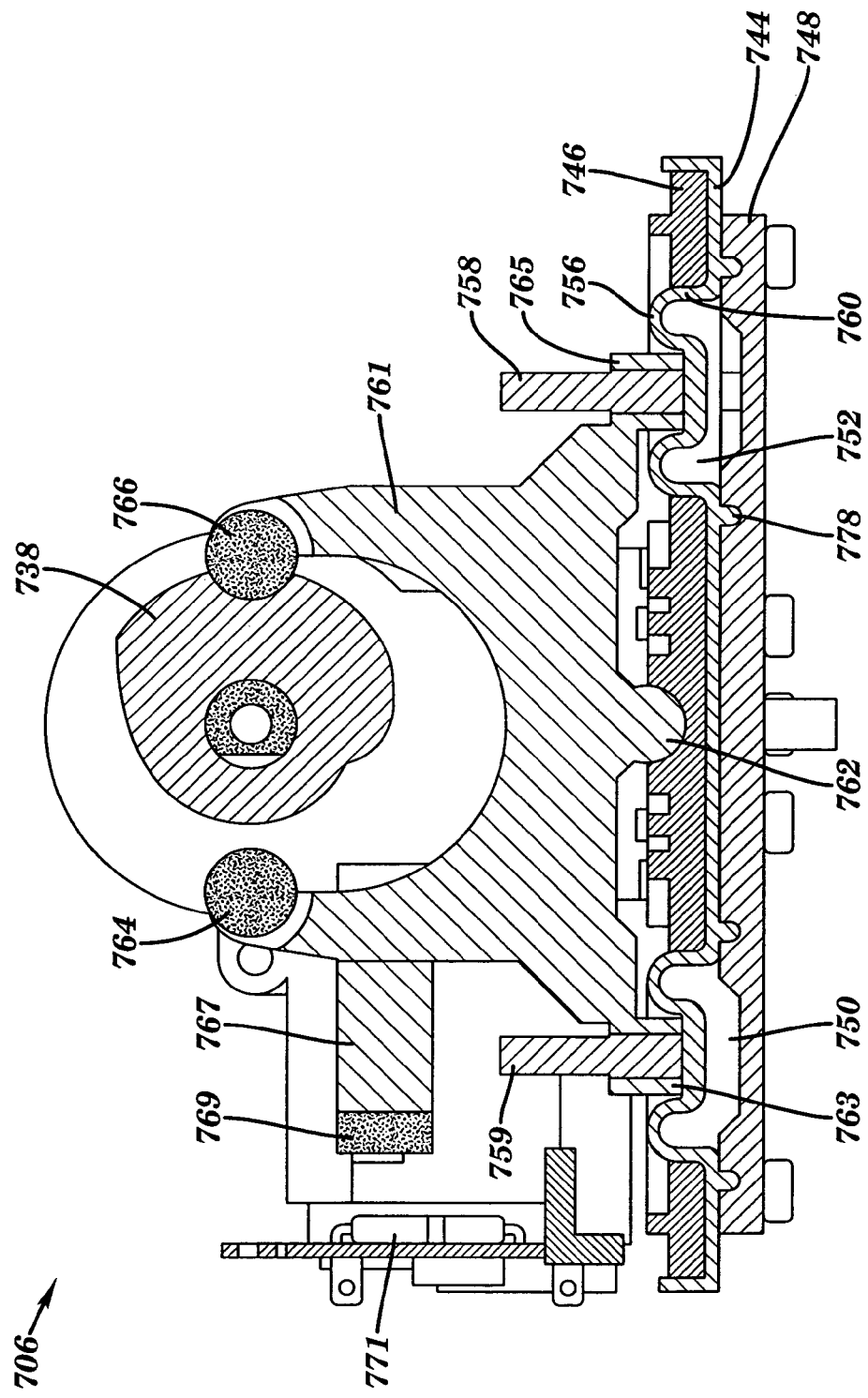
FIG. 7 depicts a schematic section view taken through a pump assembly according to the present invention.

The pump assembly 706 as depicted in FIG. 5 includes a left pump portion 708 and a right pump portion 710. The pump assembly 706 receives a continuous flow of cleaning fluid from the supply container S and alternately delivers cleaning fluid to the left nozzle 712 and the right nozzle 714. FIG. 7 depicts the pump assembly 706 in section view and the pump assembly 706 is shown mounted on the top surface of the chassis 200 in FIG. 3. The pump assembly 706 includes cam element 738 mounted on a motor drive shaft for rotation about a rotation axis. The motor, not shown, is rotates the cam element 738 at a substantially constant angular velocity under the control of the master controller 300. However, the angular velocity of the cam element 738 may be increased or decreased to vary the frequency of pumping of the left and right spay nozzles 712 and 714. In particular, the angular velocity of the cam element 738 controls the mass flow rate of cleaning fluid applied onto the cleanings surface. According to one aspect of the present invention, the angular velocity of the cam element 738 may be adjusted in proportion to the robot forward velocity to apply a uniform volume of cleaning fluid onto the cleaning surface irrespective of robot velocity. Alternately, changes in the angular velocity in the cam element 738 may be used to increase or decrease the mass flow rate of cleaning fluid applied onto the cleanings surface as desired.

The pump assembly 706 includes a rocker element 761 mounted to pivot about a pivot axis 762. The rocker element 761 includes a pair of opposed cam follower elements 764 on the left side and 766 on the right side. Each cam follower 764 and 766 remains in constant contact with a circumferential profile of the cam element 738 as the cam element rotates about its rotation axis. The rocker element 761 further includes a left pump actuator link 763 and a right pump actuator link 765. Each pump actuator link 763 and 765 is fixedly attached to a corresponding left pump chamber actuator nipple 759 and a right pump chamber actuator nipple 758. As will be readily understood, rotation of the cam element 738 forces each of the cam follower elements 764 and 766 to follow the cam circumferential profile and the motion dictated by the cam profile is transferred by the rocker element 761 to each of the left and right actuator nipples 759 and 758. As described below, the motion of the actuator nipples is used to pump cleaning fluid. The cam profile is particularly shaped to cause the rocker element 761 to force the right actuator nipple 758 downward while simultaneously lifting up on the left actuator nipple 759, and this action occurs during the first 180 degrees of cam. Alternately, the second 180 degrees of cam rotation causes the rocker element 761 to force the left actuator nipple 759 downward while simultaneously lifting up on the right actuator nipple 758.

The rocker element 761 further includes a sensor arm 767 supporting a permanent magnet 769 attached at its end. A magnetic field generated by the magnet 769 interacts with an electrical circuit 771 supported proximate to the magnet 769 and the circuit generates signals responsive to changes in the orientation of magnetic field. the signals are used to track the operation of the pump assembly 706.

Figure 8:
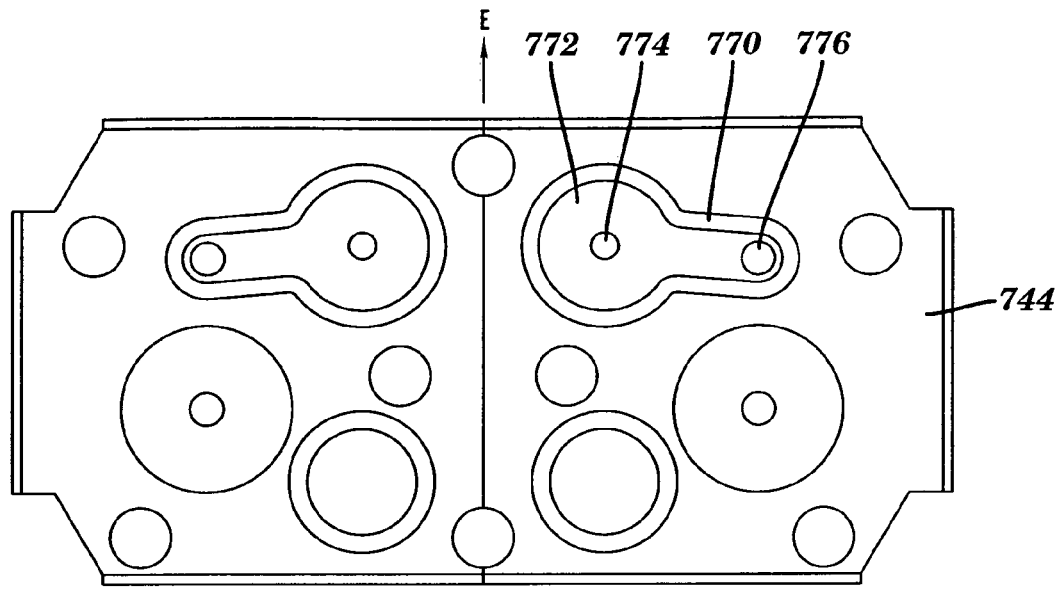
FIG. 8 depicts a schematic top view of a flexible element used as a diaphragm pump according to the present invention.
Figure 9:
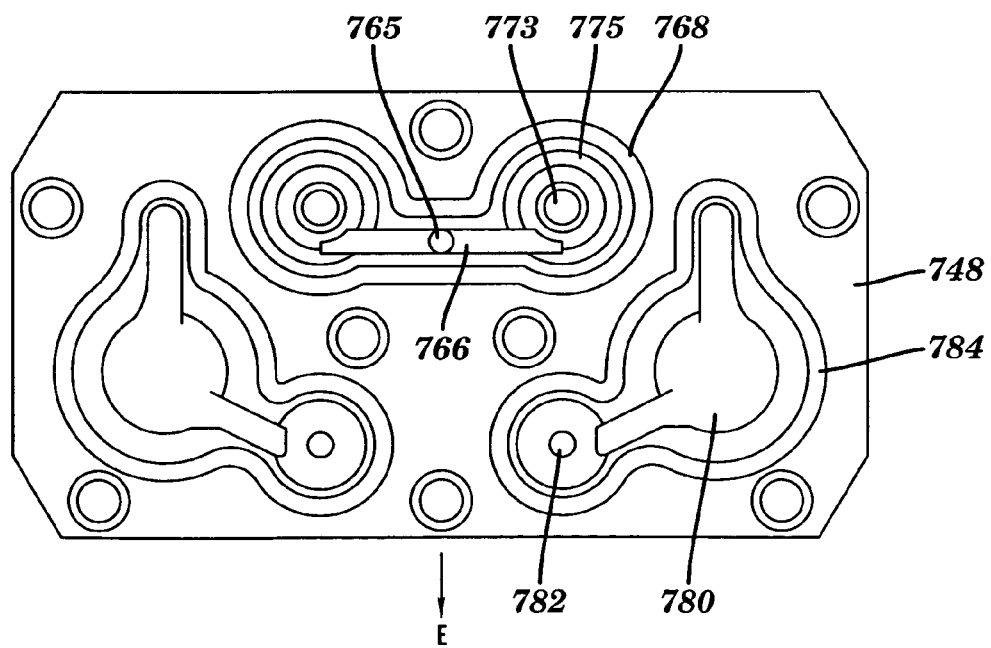
FIG. 9 depicts a schematic top view of a nonflexible chamber element used in the pump assembly according to the present invention.

Referring to FIGS. 7-9, the pump assembly 706 further comprises a flexible membrane 744 mounted between opposing upper and lower nonflexible elements 746 and 748 respectively. Referring to the section view in FIG. 7 the flexible element 744 is captured between an upper nonflexible element 746 and a lower nonflexible element 748. Each of the upper nonflexible element 746, the flexible element 744 and the lower nonflexible element 748 is formed as a substantially rectangular sheet having a generally uniform thickness. However, each element also includes patterns of raised ridges depressed valleys and other surface contours formed on opposing surfaces thereof. FIG. 8 depicts a top view of the flexible element 744 and FIG. 9 depicts a top view of the lower nonflexible element 748. The flexible element 744 is formed from a flexible membrane material such as neoprene rubber or the like and the nonflexible elements 748 and 746 are each formed from a stiff material nonflexible such as moldable hard plastic or the like.

As shown in FIGS. 8 and 9, each of the flexible element 744 and the nonflexible element 748 are symmetrical about a center axis designated E in the figure. In particular, the left sides of each of the elements 746, 744 and 748 combine to form a left pump portion and the rights side of each of the elements 746, 744 and 748 combine to form a right pump portion. The left and right pump portions are substantially identical. When the three elements are assembled together, the raised ridges, depressed valleys and surface contours of each element cooperate with raised ridges depressed valleys and surface contours of the contacting surfaces of other of the elements to create fluid wells and passageways. The wells and passageways may be formed between the upper element 746 and the flexible element 744 or between the lower nonflexible element 748 and the flexible element 744. In general, the flexible element 744 serves as a gasket layer for sealing the wells and passages and its flexibility is used to react to changes in pressure to seal and or open passages in response to local pressure changes as the pump operates. In addition, holes formed through the elements allow fluid to flow in and out of the pump assembly and to flow through the flexible element 744.

Using the right pump portion by way of example, cleaning fluid is drawn into the pump assembly through an aperture 765 formed in the center of the lower nonflexible element 748. The aperture 765 receives cleaning fluid from the fluid supply container via the conduit 704. The incoming fluid fills a passageway 766. Ridges 775 and 768 form a valley between them and a mating raised ridge on the flexible 744 fills the valley between the ridges 775 and 768. This confines the fluid within the passageway 766 and pressure seal the passageway. An aperture 774 passes through the flexible element 744 and is in fluid communication with the passageway 766. When the pump chamber, described below, expands, the expansion decreases the local pressure, which draws fluid into the passageway 776 through the aperture 774.

Fluid drawn through the aperture 774 fills a well 772. The well 772 is formed between the flexible element 744 and the upper nonflexible element 746. A ridge 770 surrounds the well 772 and mates with a feature of the upper flexible element 746 to contain the fluid in the well 772 and to pressure seal the well. The surface of the well 772 is flexible such that when the pressure within the well 772 decreases, the base of the well is lifted to open the aperture 774 and draw fluid through the aperture 774. However, when the pressure within the well 772 increases, due to contraction of the pump chamber, the aperture 774 is forced against a raised stop surface 773 directly aligned with the aperture and the well 772 act as a trap valve. A second aperture 776 passes through the flexible element 744 to allow fluid to pass from the well 772 through the flexible element 744 and into a pump chamber. The pump chamber is formed between the flexible element 744 and the lower nonflexible element 748.

Referring to FIG. 7, a right pump chamber 752 is shown in section view. The chamber 752 includes a dome shaped flexure formed by an annular loop 756. The dome shaped flexure is a surface contour of the flexible element 744. The annular loop 756 passes through a large aperture 760 formed through the upper nonflexible element 746. The volume of the pump chamber is expanded when the pump actuator 765 pulls up on the actuator nipple 758. The volume expansion decreases pressure within the pump chamber and fluid is drawn into the chamber from the well 772. The volume of the pump chamber is decreased when the pump actuator 765 pushes down on the actuator nipple 758. The decrease in volume within the chamber increases pressure and the increased pressure expels fluid out of the pump chamber.

The pump chamber is further defined by a well 780 formed in the lower nonflexible element 748. The well 780 is surrounded by a valley 784 formed in the lower nonflexible element 748, shown in FIG. 9, and a ridge 778 formed on the flexible element 744 mates with the valley 784 to pressure seal the pump chamber. The pump chamber 752 further includes an exit aperture 782 formed through the lower nonflexible element 748 and through which fluid is expelled. The exit aperture 782 delivers fluid to the right nozzle 714 via the conduit 718. The exit aperture 782 is also opposed to a stop surface which acts as a check valve to close the exit aperture 782 when the pump chamber is decreased.

Thus according to the present invention, cleaning fluid is drawn from a cleaning supply container S by action of the pump assembly 706. The pump assembly 706 comprises two separate pump chambers for pumping cleaning fluid to two separate spray nozzles. Each pump chamber is configure deliver cleaning fluid to a single nozzle in response to a rapid increase in pressure inside the pump chamber. The pressure inside the pump chamber is dictated by the cam profile, which is formed to drive fluid to each nozzle in order to spray a substantially uniform layer of cleaning fluid onto the cleaning surface. In particular, the cam profile is configured to deliver a substantially uniform volume of cleaning fluid per unit length of cleaning width W. In generally, the liquid applicator of the present invention is configured to apply cleaning fluid at a volumetric rate ranging from about 0.2 to 5.0 ml per square foot, and preferably in the range of about 0.6-2.0 ml per square foot. However depending upon the application, the liquid applicator of the present invention may apply any desired volumetric layer onto the surface. In addition, the fluid applicator system of the present invention is usable to apply other liquids onto a floor surface such as wax, paint, disinfectant, chemical coatings, and the like.

As is further described below, a user may remove the supply container S from the robot chassis and fill the supply container with a measured volume of clean water and a corresponding measured volume of a cleaning agent. The water and cleaning agent may be poured into the supply container S through a supply container access aperture 168 which is capped by a removable cap 172, shown in FIG. 17. The supply container S is configured with a liquid volume capacity of approximately 1100 ml (37 fluid ounces) and the desired volumes of cleaning agent and clean water may be poured into the supply tank in a ratio appropriate for a particular cleaning application.

Scrubbing Module

Figure 10:
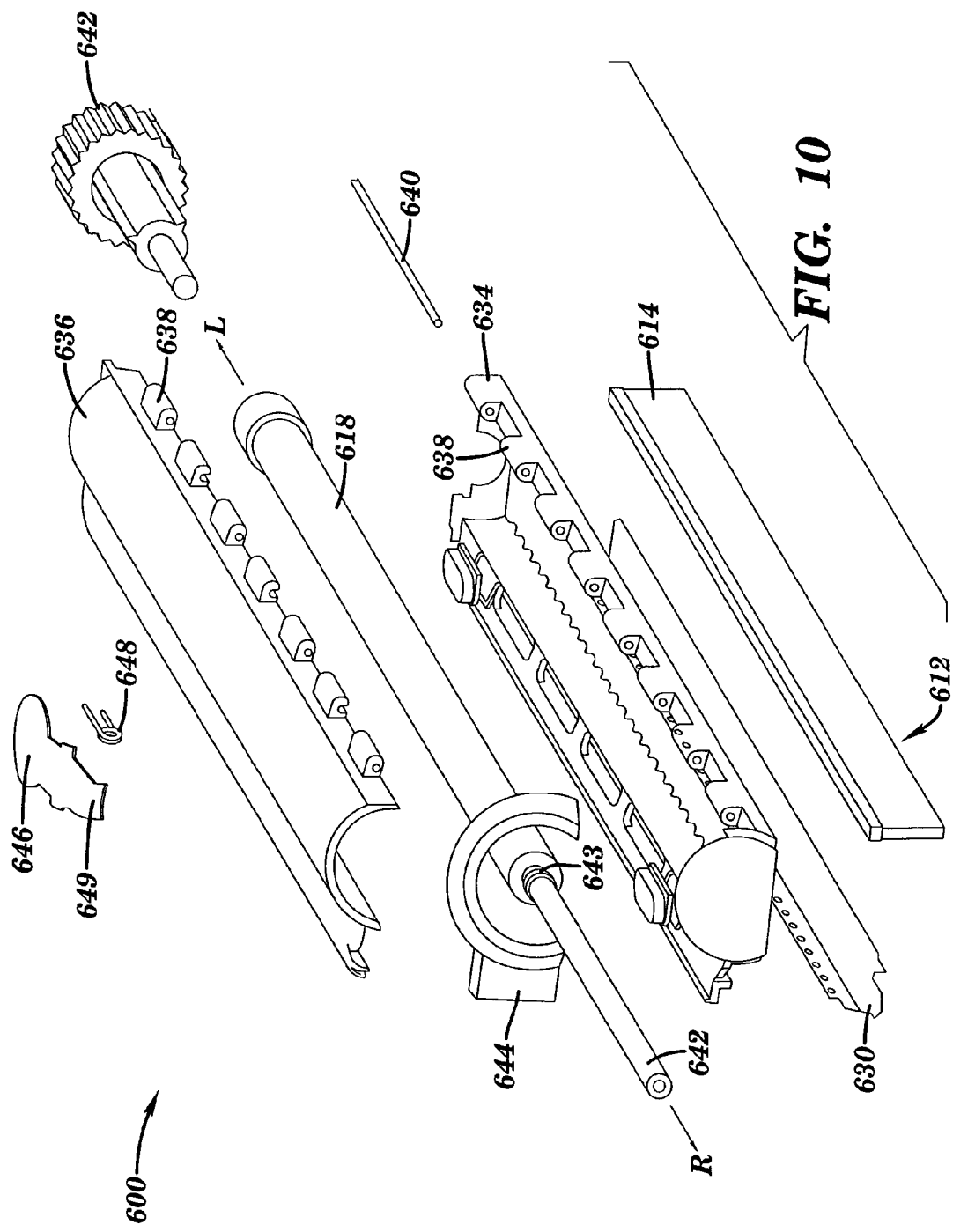
FIG. 10 depicts a schematic exploded isometric view of a scrubbing module according to the present invention.

The scrubbing module 600, according to a preferred embodiment of the present invention, is shown in exploded isometric view in FIG. 10 and in the robot bottom view shown in FIG. 2. The scrubbing module 600 is configured as a separate subassembly that attaches to the chassis 200 but is removable therefrom, by a user, for cleaning or otherwise servicing the cleaning elements thereof. However, other arrangements can be configured without deviating from the present invention. The scrubbing module 600 installs and latches into place within a hollow cavity 602, formed on the bottom side of the chassis 200. A profile of the hollow cavity 602 is displayed on the right side of the chassis 200 in FIG. 3. The cleaning elements of the scrubbing module 600 are positioned aft of the liquid applicator module 700 to perform cleaning operations on a wet cleaning surface.

In a preferred embodiment, the scrubbing module 600 includes a passive smearing brush 612 attached to a forward edge thereof and disposed across the cleaning width. The smearing brush 612 extends downwardly from the scrubbing module 600 and is configured to make contact or near contact with the cleaning surface across the cleaning width. As the robot 100 is transported in the forward direction the smearing brush 612 moves over the pattern of cleaning fluid applied down by the liquid applicator and smears, or more uniformly spreads the cleaning fluid over the cleaning surface. The smearing brush 612, shown in FIGS. 2 and 10, comprises a plurality of soft compliant smearing bristles 614 with a first end of each bristle being captured in a holder such as crimped metal channel, or other suitable holding element. A second end of each smearing bristle 614 is free to bend as each bristle makes contact with the cleaning surface. The length and diameter of the smearing bristles 614, as well as a nominal interference dimension that the smearing bristles makes with respect to the cleaning surface may be varied to adjust bristle stiffness and to thereby affect the smearing action. In a preferred embodiment of the present invention the smearing brush 612 comprises nylon bristles with an average bristle diameter in the range of about 0.05-0.2 mm (0.002-0.008 inches). The nominal length of each bristle 614 is approximately 16 mm (0.62 inches) between the holder and the cleaning surface and the bristles 614 are configured with an interference dimension of approximately 0.75 mm (0.03 inches). The smearing brush 612 may also wick up excess cleaning fluid applied to the cleaning surface and distribute the wicked up cleaning fluid to other locations. Of course, other smearing elements such as flexible compliant blade member a sponge elements or a rolling member in contact with the cleaning surface are also usable.

The scrubbing module 600 may include a scrubbing element e.g. 604; however, the present invention may be used without a scrubbing element. The scrubbing element contacts the cleaning surface during cleaning operations and agitates the cleaning fluid to mix it with contaminants to emulsify, dissolve or otherwise chemically react with contaminants. The scrubbing element also generates a shearing force as it moves with respect to the cleaning surface and the force helps to break adhesion and other bonds between contaminants and the cleaning surface. In addition, the scrubbing element may be passive element or an active and may contact the cleaning surface directly, may not contact the cleaning surface at all or may be configured to be movable into and out of contact with the cleaning surface.

In one embodiment according to the present invention, a passive scrubbing element is attached to the scrubbing module 600 or other attaching point on the chassis 200 and disposed to contact the cleaning surface across the cleaning width. A force is generated between the passive scrubbing element and the cleaning surface as the robot is transported in the forward direction. The passive scrubbing element may comprise a plurality of scrubbing bristles held in contact with the cleaning surface, a woven or non-woven material, e.g. a scrubbing pad or sheet material held in contact with the cleaning surface, or a compliant solid element such as a sponge or other compliant porous solid foam element held in contact with the cleaning surface. In particular, a conventional scrubbing brush, sponge, or scrubbing pad used for scrubbing may be fixedly attached to the robot 100 and held in contact with the cleaning surface across the cleaning width aft of the liquid applicator to scrub the cleaning surface as the robot 100 advances over the cleaning surface. In addition, the passive scrubbing element may be configured to be replaceable by a user or to be automatically replenished, e.g. using a supply roll and a take up roll for advancing clean scrubbing material into contact with the cleaning surface.

In another embodiment according to the present invention, one or more active scrubbing elements are movable with respect to the cleaning surface and with respect to the robot chassis. Movement of the active scrubbing elements increases the work done between scrubbing elements and the cleaning surface. Each movable scrubbing element is driven for movement with respect to the chassis 200 by a drive module, also attached to the chassis 200. Active scrubbing elements may also comprise a scrubbing pad or sheet material held in contact with the cleaning surface, or a compliant solid element such as a sponge or other compliant porous solid foam element held in contact with the cleaning surface and vibrated by a vibrating backing element. Other active scrubbing elements may also include a plurality of scrubbing bristles, and or any movably supported conventional scrubbing brush, sponge, or scrubbing pad used for scrubbing or an ultra sound emitter may also be used to generate scrubbing action. The relative motion between active scrubbing elements and the chassis may comprise linear and or rotary motion and the active scrubbing elements may be configured to be replaceable or cleanable by a user.

Figure 11:
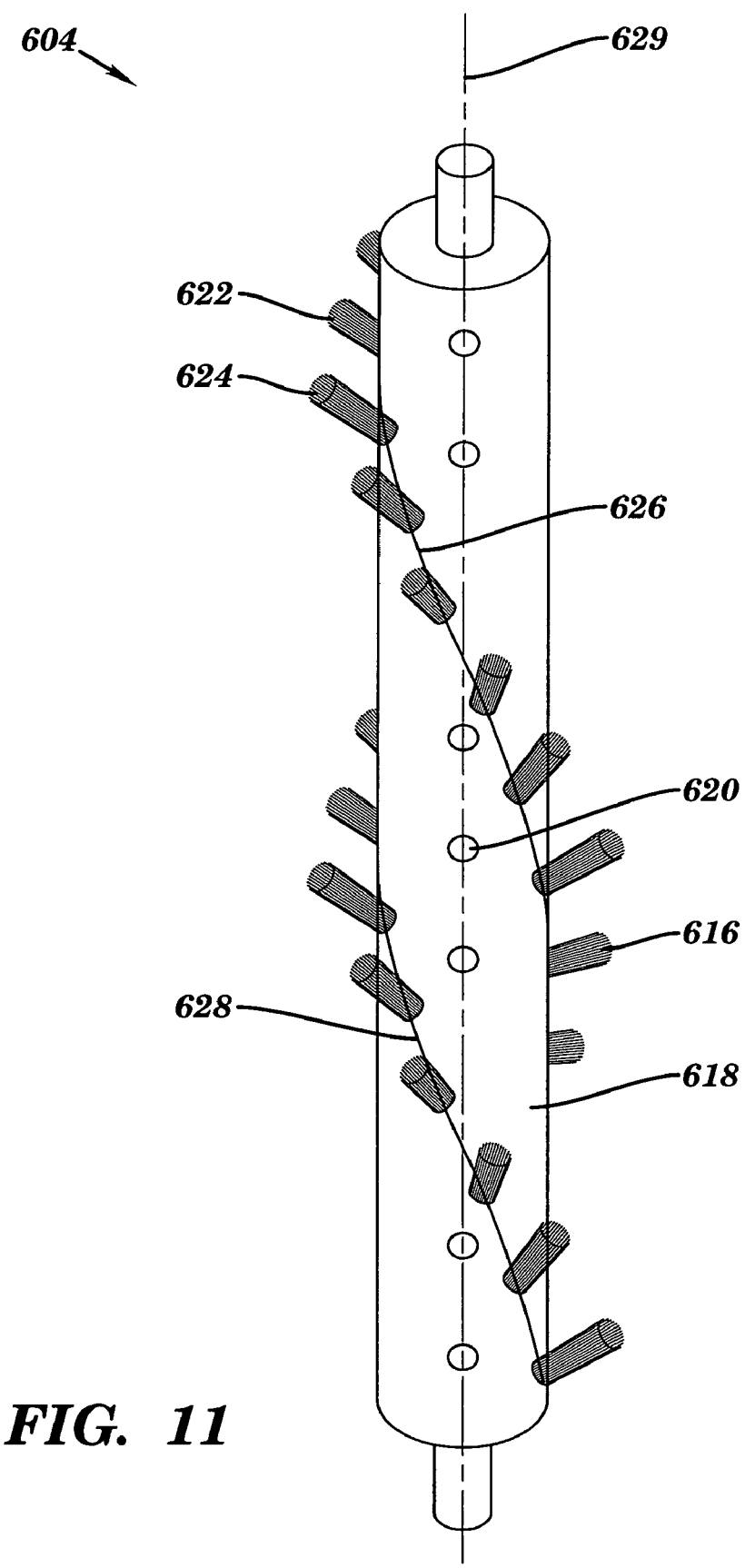
FIG. 11 depicts an isometric rotatable scrubbing brush according to the present invention.

Referring now to FIGS. 10-12 a preferred embodiment of present invention includes an active scrubbing element. The active scrubbing element comprises a rotatable brush assembly 604 disposed across the cleaning width, aft of the liquid applicator nozzles 712, 714, for actively scrubbing the cleaning surface after the cleaning fluid has been applied thereon. The rotatable brush assembly 604 comprises a cylindrical bristle holder element 618 for supporting scrubbing bristles 616 extending radially outward there from. The rotatable brush assembly 604 is supported for rotation about a rotation axis that extends substantially parallel with the cleaning width. The scrubbing bristles 616 are long enough to interfere with the cleaning surface during rotation such that the scrubbing bristles 616 are bent by the contact with the cleaning surface.

Scrubbing bristles 616 are installed in the brush assembly in groups or clumps with each clump comprising a plurality of bristles held by a single attaching device or holder. Clumps locations are disposed along a longitudinal length of the bristle holder element 618 in a pattern. The pattern places at least one bristle clump in contact with cleaning surface across the cleaning width during each revolution of the rotatable brush element 604. The rotation of the brush element 604 is clockwise as viewed from the right side such that relative motion between the scrubbing bristles 616 and the cleaning surface tends to flick loose contaminants and waste liquid in the aft direction. In addition, the friction force generated by clockwise rotation of the brush element 604 tends drive the robot in the forward direction thereby adding to the forward driving force of the robot transport drive system. The nominal dimension of each scrubbing bristles 616 extended from the cylindrical holder 618 causes the bristle to interfere with the cleaning surface and there for bend as it makes contact with the surface. The interference dimension is the length of bristle that is in excess of the length required to make contact with the cleaning surface. Each of these dimensions plus the nominal diameter of the scrubbing bristles 616 may be varied to affect bristle stiffness and therefore the resulting scrubbing action. Applicants have found that configuring the scrubbing brush element 604 with nylon bristles having a bend dimension of approximately 16-40 mm (0.62-1.6 inches) a bristle diameter of approximately 0.15 mm (0.006 inches) and an interference dimension of approximately 0.75 mm (0.03 inches) provides good scrubbing performance. In another example, stripes of scrubbing material may be disposed along a longitudinal length of the bristle holder element 618 in a pattern attached thereto for rotation therewith.

Squeegee and Wet Vacuuming

The scrubbing module 600 may also include a second collecting apparatus configured to collect waste liquid from the cleaning surface across the cleaning width. The second collecting apparatus is generally positioned aft of the liquid applicator nozzles 712, 714, aft of the smearing brush, and aft of the scrubbing element. In a preferred embodiment according to the present invention, a scrubbing module 600 is shown in section view in FIG. 12A. The smearing element 612 is shown attached to the scrubbing module at its forward edge and the rotatable scrubbing brush assembly 604 is shown mounted in the center of the scrubbing module. Aft of the scrubbing brush assembly 604, a squeegee 630 contacts the cleaning surface across its entire cleaning width to collect waste liquid as the robot 100 advances in the forward direction. A vacuum system draws air in through ports in the squeegee to suction waste liquid up from the cleaning surface. The vacuum system deposits the waste liquid into a waste storage container carried on the robot chassis 200.

Figure 12A:
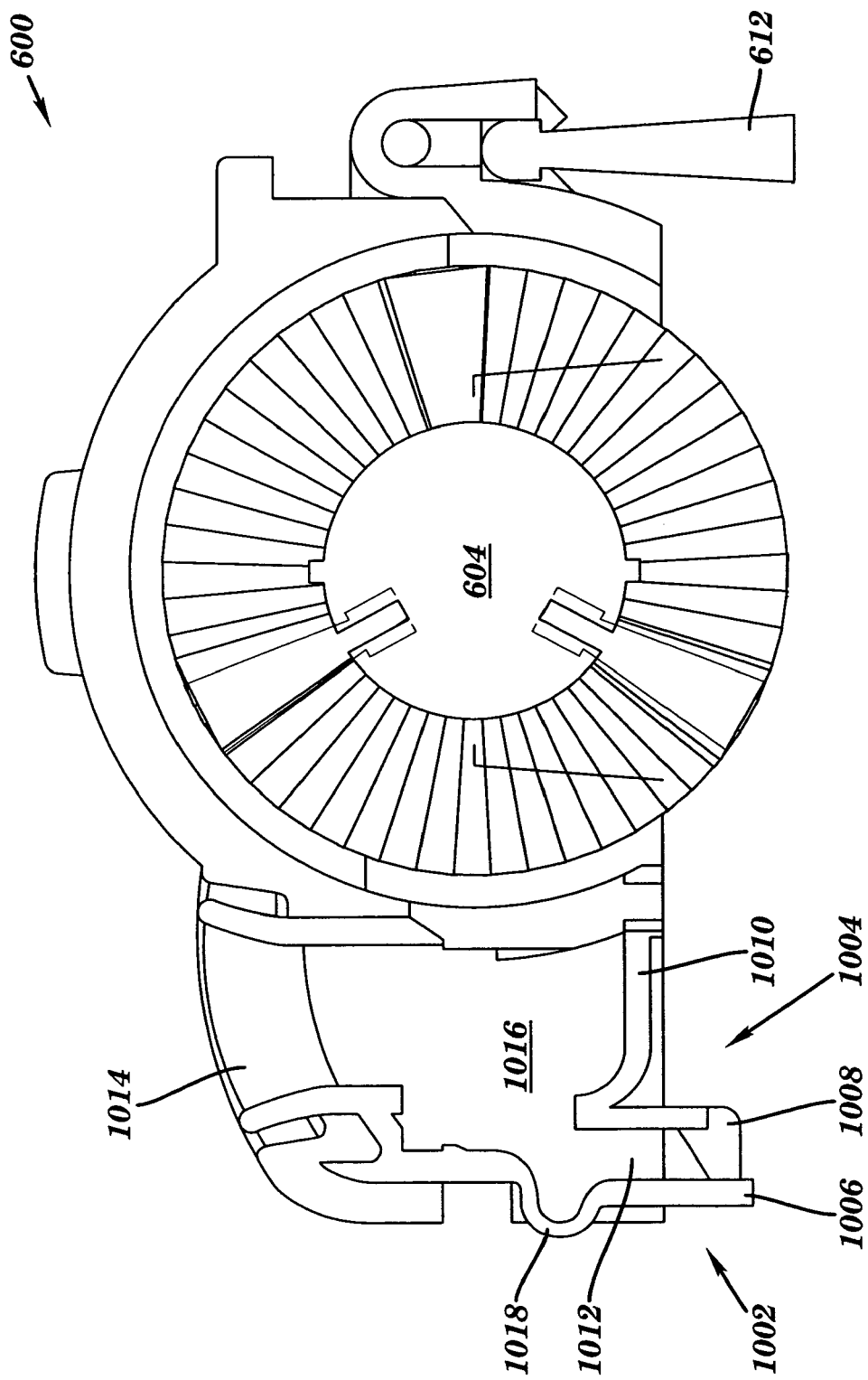
FIG. 12A depicts a schematic section view taken through a second collecting apparatus used for collecting waste liquid according to the present invention.

As detailed in the section view of FIG. 12A, the squeegee 630 comprises a vertical element 1002 and a horizontal element 1004. Each of the elements 1002 and 1004 are formed from a substantially flexible and compliant material such as neoprene rubber, silicone or the like. A single piece squeegee construction is also usable. In a preferred embodiment, the vertical element 1002 comprises a more flexible durometer material and is more bendable and compliant than the horizontal element 1004. The vertical squeegee element 1002 contacts the cleaning surface at a lower edge 1006 or along a forward facing surface of the vertical element 1002 when the vertical element is slightly bent toward the rear by interference with the cleaning surface. The lower edge 1006 or forward surface remains in contact with the cleaning surface during robot forward motion and collects waste liquid along the forward surface. The waste liquid pools up along the entire length of the forward surface and lower edge 1006. The horizontal squeegee element 1004 includes spacer elements 1008 extending rear ward form its main body 1010 and the spacer elements 1008 defined a suction channel 1012 between the vertical squeegee element 1002 and the horizontal squeegee element 1004. The spacer elements 1008 are discreet elements disposed along the entire cleaning width with open space between adjacent spacer elements 1008 providing a passage for waste liquid to be suctioned through.

A vacuum interface port 1014 is provided in the top wall of the scrubber module 600. The vacuum port 1014 communicates with the robot air moving system and withdraws air through the vacuum port 1014. The scrubber module 600 is configured with a sealed vacuum chamber 1016, which extends from the vacuum port 1014 to the suction channel 1012 and extends along the entire cleaning width. Air drawn from the vacuum chamber 1016 reduces the air pressure at the outlet of the suction channel 1012 and the reduced air pressures draws in waste liquid and air from the cleaning surface. The waste liquid drawing in through the suction channel 1012 enters the chamber 1016 and is suctioned out of the chamber 1016 and eventually deposited into a waste material container by the robot air moving system. Each of the horizontal squeegee element 1010 and the vertical squeegee element 1002 form walls of the vacuum chamber 1016 and the squeegee interfaces with the surrounding scrubbing module elements are configured to pressure seal the chamber 1016. In addition, the spacers 1008 are formed with sufficient stiffness to prevent the suction channel 1012 form closing.

The squeegee vertical element 1002 includes a flexure loop 1018 formed at its mid point. The flexure loop 1018 provides a pivot axis about which the lower end of the squeegee vertical element can pivot when the squeegee lower edge 1006 encounters a bump or other discontinuity in the cleaning surface. This also allows the edge 1006 to flex as the robot changes travel direction. When the squeegee lower edge 1006 is free of the bump or discontinuity it returns to its normal operating position. The waste liquid is further suctioned into the waste liquid storage container as described below with respect to FIG. 10.

Figure 12B:
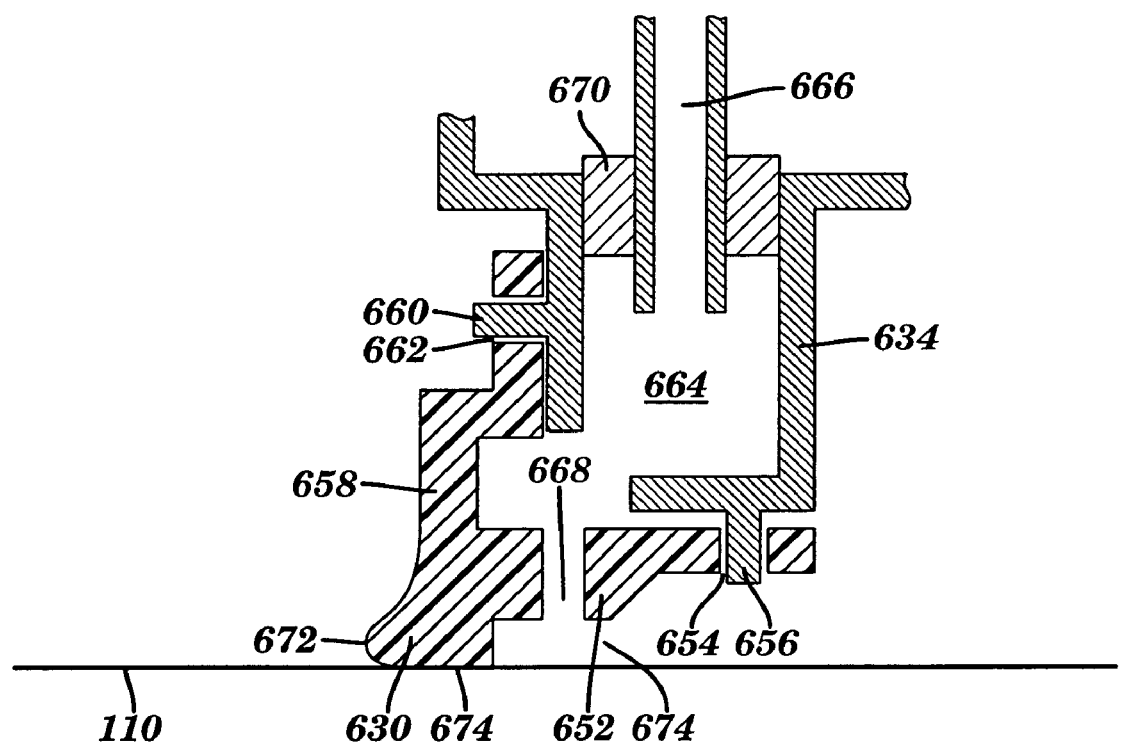
FIG. 12B depicts a schematic section view of an alternative collecting apparatus used for collecting waste liquid according to the present invention.

In an alternative shown in FIG. 12B, the second collecting apparatus comprises a squeegee 630 interconnected with a vacuum system. The squeegee 630 collects waste liquid in a liquid collection volume 676 formed between a longitudinal edge of the squeegee and the cleaning surface as the robot 100 advances in the forward direction. The vacuum system interfaces with the liquid collection volume to suction the waste liquid up from the cleaning surface and deposit the waste liquid in a waste storage tank carried on the robot chassis 200. The squeegee 630 is shown in FIG. 10 and in section view in FIG. 12B.

As shown in FIG. 12B, the squeegee 630 comprises a substantially flexible and compliant element molded from a neoprene rubber, or the like, attached to the aft end of the scrubbing module 600 and disposed across the cleaning width. The squeegee extends downward from the chassis 200 to make contact or near contact with the cleaning surface. In particular, the squeegee 630 attaches to the aft edge of the scrubber module 600 at a scrubber module lower housing element 634 and extends downwardly to contact or nearly contact the cleaning surface. As shown in FIG. 12B, the squeegee 630 includes a substantially horizontal lower section 652 that extends aft of and downwardly from the lower housing element 634 toward the cleaning surface. A forward edge of the squeegee horizontal lower section 652 includes a plurality of through holes 654, uniformly disposed across the cleaning width. Each of the plurality of through holes 654 interfaces with a corresponding mounting finger 656 formed on the lower housing element 634. The interlaced through holes 652 and mounting fingers 654 locate the forward edge of the squeegee 630 with respect to the lower housing 634 and an adhesive layer applied between the interlaced elements fluid seals the squeegee lower housing interface at the forward edge.

The squeegee 630 in FIG. 12B is further configured with an aft section 658 that attaches to an aft edge of the lower housing element 634 along the cleaning width. A plurality of aft extending mounting fingers 660 are formed on the lower housing element 634 to receive corresponding through holes formed on the squeegee aft section 658. The interlaced through holes 662 and aft mounting fingers 660 locate the squeegee aft section 658 with respect to the lower housing 634 and an adhesive layer applied between the interlaced elements fluid seals the squeegee lower housing interface at the aft edge. Of course, any attaching means can be employed.

As further shown in FIG. 12B, a vacuum chamber 664 is formed by surfaces of the squeegee lower section 652, the squeegee aft section 658 and surfaces of the lower housing element 634. The vacuum chamber 664 extends longitudinally along the squeegee and lower housing interface across the cleaning width and is fluidly connected with a waste liquid storage tank carried by the chassis by one or more fluid conduits 666, described below. In a preferred embodiment of FIG. 12B, two fluid conduits 666 interface with the vacuum chamber 664 at distal ends thereof. Each of the fluid conduits 666 couple to the vacuum chamber 664 via an elastomeric sealing gasket 670. The gasket 670 installs in an aperture of the lower housing 634 and is held therein by an adhesive bond, interference fit or other appropriate holding means. The gasket 670 includes an aperture passing therethrough and is sized to receive the fluid conduit 666 therein. The outside wall of the conduit 666 is tapered to provide a lead in to the gasket 670. The conduit 666 is integral with the waste liquid storage container and makes a liquid gas tight seal with the gasket 670 when fully inserted therein.

The squeegee of FIG. 12B includes a longitudinal ridge 672 formed at an interface between the horizontal lower section 652 and the aft section 658 across the cleaning width. The ridge 672 is supported in contact with, or nearly in contact with, the cleaning surface during normal operation. Forward of the ridge 672 the horizontal lower section 652 is contoured to provide the waste liquid collecting volume 674. A plurality of suction ports 668 extend from the liquid collecting volume 674, through the squeegee horizontal lower section 652 and into the vacuum chamber 664. When negative air pressure is generated within the vacuum chamber 664, waste liquid is drawn up from the liquid collecting volume 674 into the vacuum chamber 664. The waste liquid is further suctioned into the waste liquid storage container as described below.

Referring to FIG. 10, the scrubbing module 600 is formed as a separate subsystem that is removable from the robot chassis. The scrubbing module 600 includes support elements comprising a molded two-part housing formed by the lower housing element 634 and a mating upper housing element 636. The lower and upper housing elements are formed to house the rotatable scrubbing brush assembly 604 therein and to support it for rotation with respect to the chassis. The lower and upper housing elements 634 and 636 are attached together at a forward edge thereof by a hinged attaching arrangement. Each housing element 634 and 636 includes a plurality of interlacing hinge elements 638 for receiving a hinge rod 640 therein to form the hinged connection. Of course, other hinging arrangements can be used. The lower and upper housing elements 634 and 636 form a longitudinal cavity for capturing the rotatable scrubbing brush assembly 604 therein and may be opened by a user when the scrubbing module 600 is removed from the robot 100. The user may then remove the rotatable scrubbing brush assembly 604 from the housing to clean it replace it or to clear a jam.

The rotatable scrubbing brush assembly 604 comprises the cylindrical bristle holder 618, which may be formed as a solid element such as a sold shaft formed of glass-filled ABS plastic or glass-filled nylon. Alternately the bristle holder 618 may comprise a molded shaft with a core support shaft 642 inserted through a longitudinal bore formed through the molded shaft. The core support shaft 642 may be installed by a press fit or other appropriate attaching means for fixedly attaching the bristle holder 618 and the core support shaft 642 together. The core support shaft 642 is provided to stiffen the brush assembly 604 and is therefore formed from a stiff material such as a stainless steel rod with a diameter of approximately 10-15 mm (0.4-0.6 inches). The core support shaft 642 is formed with sufficient stiffness to prevent excessive bending of the cylindrical brush holder. In addition, the core support shaft 642 may be configured to resist corrosion and or abrasion during normal use.

The bristle holder 618 is configured with a plurality of bristle receiving holes 620 bored or otherwise formed perpendicular with the rotation axis of the scrubbing brush assembly 604. Bristle receiving holes 620 are filled with clumps of scrubbing bristles 616 which are bonded or otherwise held therein. In one example embodiment, two spiral patterns of receiving holes 620 are populated with bristles 616. A first spiral pattern has a first clump 622 and a second clump 624 and subsequent bristle clumps follow a spiral path pattern 626 around the holder outside diameter. A second spiral pattern 628 starts with a first clump 630 substantially diametrically opposed to the clump 622. Each pattern of bristle clumps is offset along the bristle holder longitudinal axis to contact different points across the cleaning width. However, the patterns are arranged to scrub the entire cleaning width with each full rotation of the bristle holder 618. In addition, the pattern is arranged to fully contact only a small number of bristle clumps with cleaning surface simultaneously, (e.g., two) in order to reduce the bending force exerted upon and the torque required to rotate the scrubbing brush assembly 604. Of course, other scrubbing brush configurations having different bristle patterns, materials and insertion angles are usable. In particular, bristles at the right edge of the scrubbing element may be inserted at an angle and made longer to extend the cleaning action of the scrubbing brush further toward the right edge of the robot for cleaning near the edge of a wall.

Figure 13:
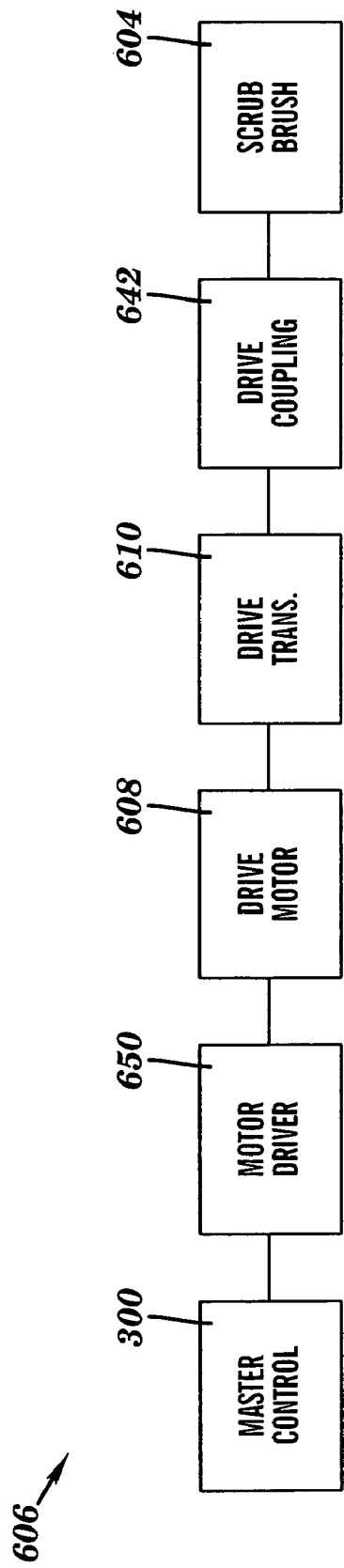
FIG. 13 is a schematic block diagram showing elements of a drive module used to rotate the scrubbing brush according to the present invention.

The scrubbing brush assembly 604 couples with a scrubbing brush rotary drive module 606 which is shown schematically in FIG. 13. The scrubbing brush rotary drive module 606 includes a DC brush rotary drive motor 608, which is driven at a constant angular velocity by a motor driver 650. The motor driver 650 is set to drive the motor 608 at a voltage and DC current level that provides the desired angular velocity of the rotary brush assembly 604, which in a preferred embodiment is about 1500 RPM. The drive motor 608 is coupled to a mechanical drive transmission 610 that increases the drive torque and transfers the rotary drive axis from the drive motor 608, which is positioned on the top side of the chassis 200, to the rotation axis of the scrubbing brush assembly 604, which is positioned on a bottom side of the chassis 200. A drive coupling 642 extends from the mechanical drive transmission 610 and mates with the rotatable scrubbing brush assembly 604 at its left end. The action of sliding the scrubber module 600 into the cavity 602 couples the left end of the rotatable brush assembly 604 with the drive coupling 642. Coupling of the rotatable brush assembly 604 aligns its left end with a desired rotation axis, supports the left end for rotation, and delivers a rotary drive force to the left end. The right end of the brush assembly 604 includes a bushing or other rotational support element 643 for interfacing with bearing surfaces provided on the module housing elements 634, 636.

The scrubber module 600 further includes a molded right end element 644, which encloses the right end of the module to prevent debris and spray from escaping the module. The right end element 644 is finished on its external surfaces to integrate with the style and form of adjacent external surfaces of the robot 100. The lower housing element 634 is configured to provide attaching features for attaching the smearing brush 612 to its forward edge and for attaching the squeegee 630 to its aft edge. A pivotal latching element 646 is shown in FIG. 10 and is used to latch the scrubber module 600 in its operating position when it is correctly installed in the cavity 632. The latch 646 attaches to attaching features provided on the top side of the chassis 200 and is biased into a closed position by a torsion spring 648. A latching claw 649 passes through the chassis 200 and latches onto a hook element formed on the upper housing 636. The structural elements of the wet cleaning module 600 may be molded from a suitable plastic material such as a polycarbonate, ABS, or other materials or combinations of materials. In particular, these include the lower housing 634, the upper housing 636, the right end element 644, and the latch 646.

Air Moving Subsystems

Figure 14:
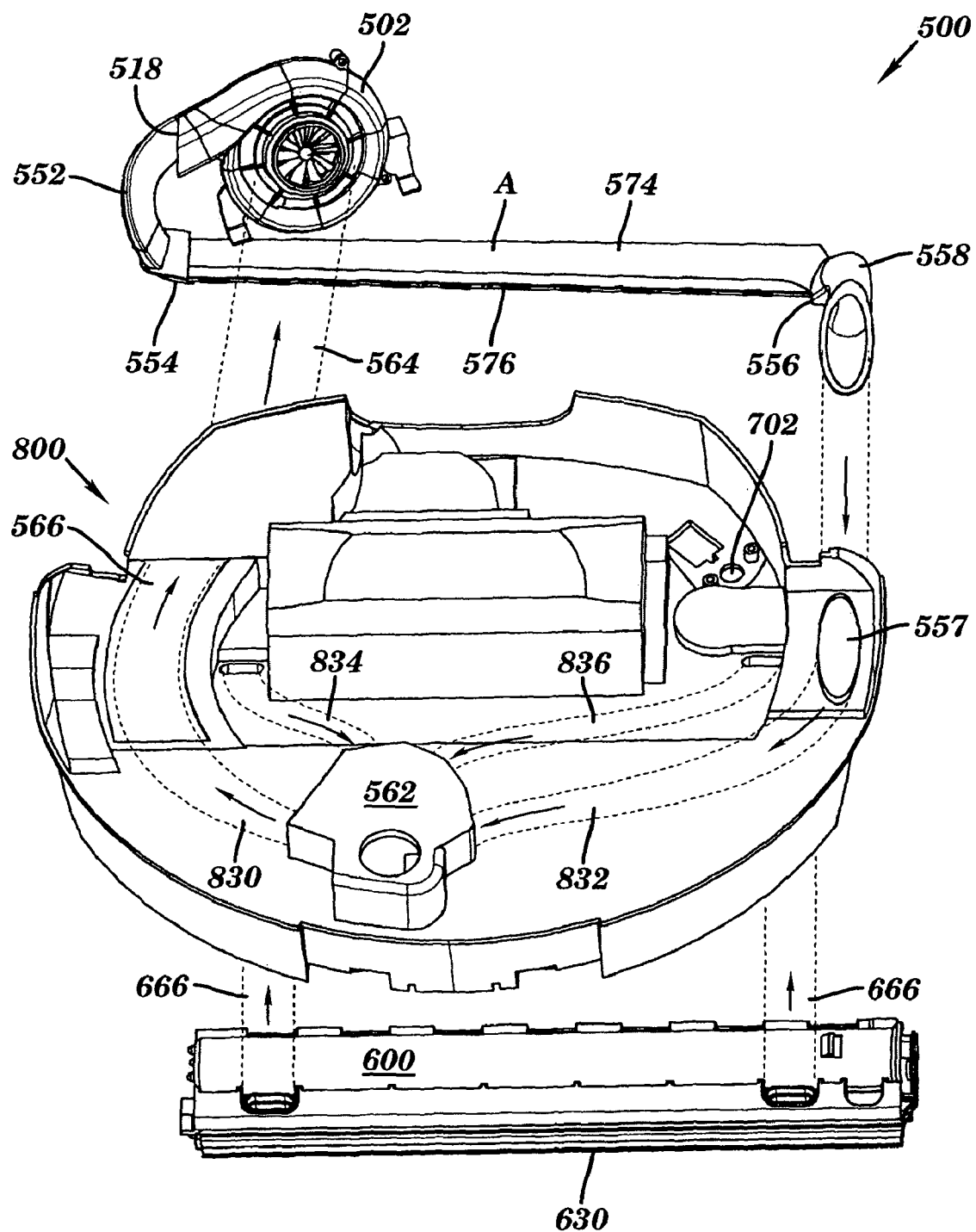
FIG. 14 is a schematic representation of an air moving system according to the present invention.

FIG. 14 depicts a schematic representation of a wet dry vacuum module 500 and its interface with the cleaning elements of the robot 100. The wet dry vacuum module 500 interfaces with the first collecting apparatus to suction up loose particulates from the cleaning surface and with the second collecting apparatus to suction up waste liquid from the cleaning surface. The wet dry vacuum module 500 also interfaces with an integrated liquid storage container 800 attached to the chassis 200 and deposits loose particulates and waste liquid into one or more waste containers housed therein.

Figure 15:
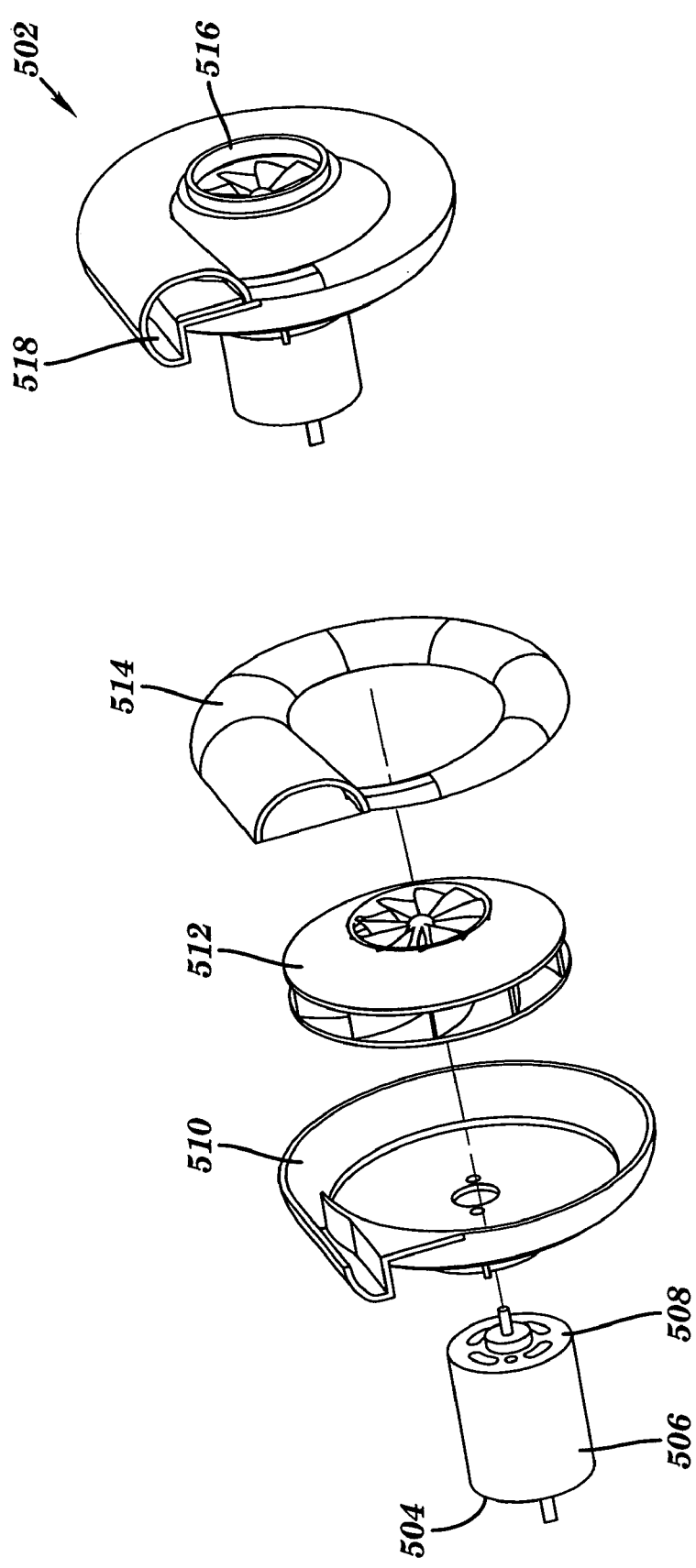
FIG. 15 depicts a schematic exploded isometric view of a fan assembly according to the present invention.

Referring to FIGS. 14 and 15, the wet dry vacuum module 500 comprises a single fan assembly 502; however, two or more fans can be used without deviating from the present invention. The fan assembly 502 includes a rotary fan motor 504, having a fixed housing 506 and a rotating shaft 508 extending therefrom. The fixed motor housing 506 attaches to the fan assembly 502 at an external surface of a rear shroud 510 by threaded fasteners, or the like. The motor shaft 508 extends through the rear shroud 510 and a fan impeller 512 is attached to the motor shaft 508 by a press fit, or by another appropriate attaching means, for causing the impeller 512 to rotate with the motor shaft 508. A front shroud 514 couples with the rear shroud 510 for housing the fan impeller 512 in a hollow cavity formed between the front and rear shrouds. The fan front shroud 514 includes a circular air intake port 516 formed integral therewith and positioned substantially coaxial with a rotation axis of the motor shaft 508 and impeller 512. The front and rear shrouds 510, 514 together form an air exit port 518 at a distal radial edge of the fan assembly 502.

The fan impeller 512 generally comprises a plurality of blade elements arranged about a central rotation axis thereof and is configured to draw air axially inward along its rotation axis and expel the air radially outward when the impeller 718 is rotated. Rotation of the impeller 512 creates a negative air pressure zone, or vacuum, on its input side and a positive air pressure zone at its output side. The fan motor 710 is configured to rotate the impeller 715 at a substantially constant rate of rotational velocity, e.g. 14,000 RPM.

As shown schematically in FIG. 14, a closed air duct or conduit 552 is connected between the fan housing exit port

518 and the air jet port 554 of the first cleaning zone A and delivers high pressure air to the air jet port 554. At the opposite end of the first cleaning zone A, a closed air duct or conduit 558 connects the air intake port 556 with the integrated liquid storage container module 800 at a container intake aperture 557. Integral with the integrated storage container 800, a conduit 832, detailed below, connects the container intake aperture 557 with a plenum 562. The plenum 562 comprises a union for receiving a plurality of air ducts connected thereto. The plenum 562 is disposed above a waste storage container portion of the integrated liquid storage container module 800. The plenum 562 and waste container portion are configured to deposit loose particulates suctioned up from the cleaning surface by the air intake port 556 into the waste container. The plenum 652 is in fluid communication with the fan intake port 516 via a closed air duct or conduit comprising a conduit 564, not shown, connected between the fan assembly and a container air exit aperture 566. The container air exit aperture 566 is fluidly connected with the plenum 562 by an air conduit 830 that is incorporated within the integrated liquid storage tank module 800. Rotation of the fan impeller 512 generates a negative air pressure or vacuum inside the plenum 560. The negative air pressure generated within the plenum 560 draws air and loose particulates in from the air intake port 556.

As further shown schematically in FIG. 14, a pair of closed air ducts or conduits 666 interface with scrubbing module 600 of the second cleaning zone B. The air conduits 666, shown in section view in FIG. 10 comprise external tubes extending downwardly from the integrated liquid container module 800. The external tubes 666 insert into the scrubber module upper housing gaskets 670.

As shown in FIG. 14, conduits 834 and 836 fluidly connect each external tube 666 to the plenum 652. Negative air pressure generated within the plenum 652 draws air from the vacuum chamber 664 via the conduits 834, 836 and 666 to suction waste liquid from the cleaning surface via the suction ports 668 passing from the vacuum chamber 664 to the waste liquid collecting volume 674. The waste liquid is draw into the plenum 562 and deposited into the waste liquid storage container.

Of course other wet dry vacuum configurations are contemplated without deviating from the present invention. In one example, a first fan assembly may be configured to collect loose particulates from the first cleaning zone and deposit the loose particulates in the first waste storage container and a second fan assembly may be configured to collect waste liquid from the second cleaning zone and deposit the waste liquid into a second waste storage container.

Integrated Liquid Storage Tank

Figure 16:
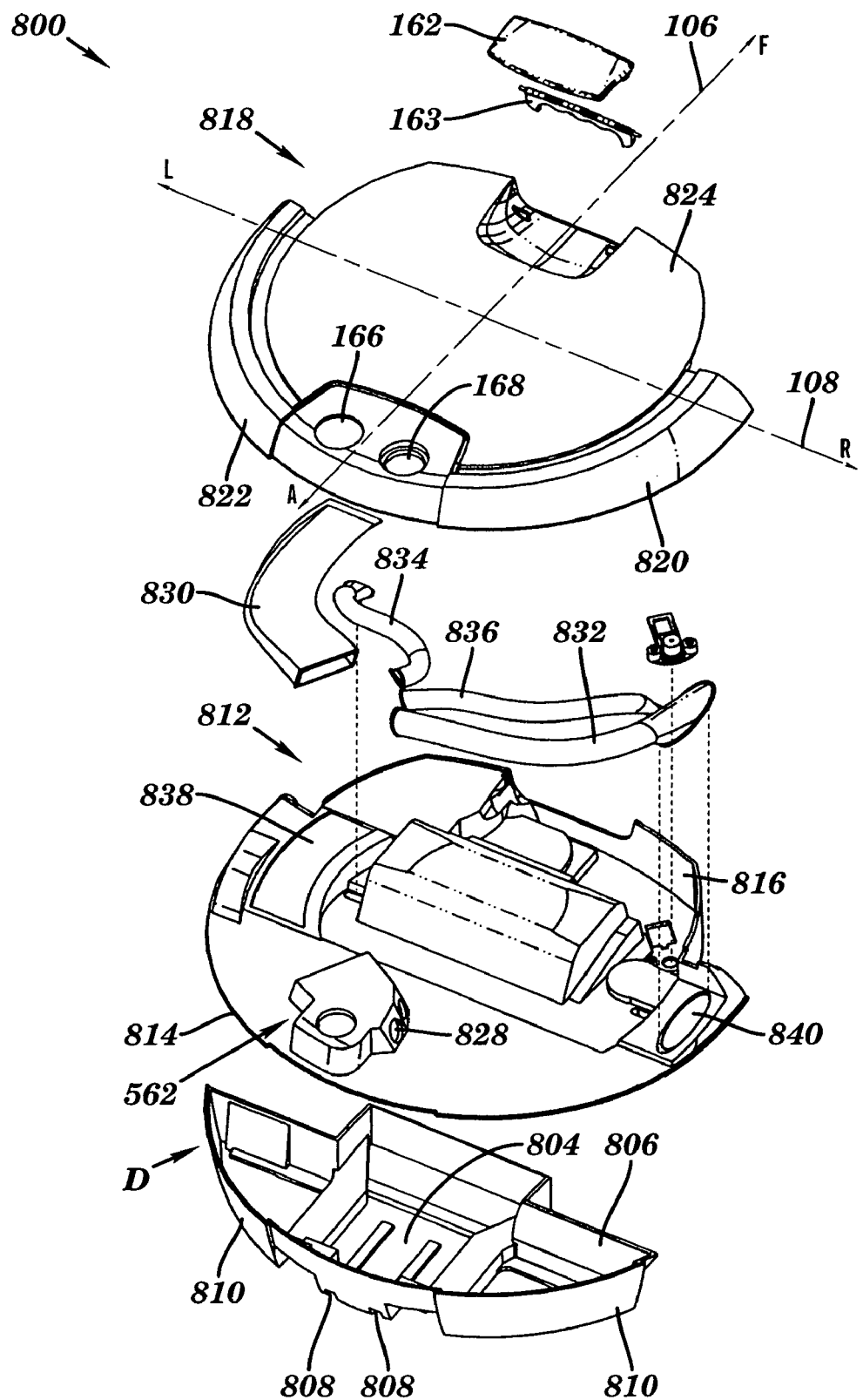
FIG. 16 depicts a schematic exploded isometric view showing elements of an integrated liquid storage module according to the present invention.

Elements of the integrated liquid storage container module 800 are shown in FIGS. 1, 12, 14, 16 and 17. Referring to FIG. 16, the integrated liquid storage container 800 is formed with at least two liquid storage container portions. One container portion comprises a waste container portion and the second container portion comprises a cleaning fluid storage container portion. In another embodiment of the present invention the two storage containers are formed as an integral unit that is configured to attach to the chassis 200 and to be removable from the chassis by a user to empty the waste container portion and to fill the cleaning fluid container portion. In an alternate embodiment, the integrated storage containers can be filled and emptied autonomously when the robot 100 is docked with a bas station configured for transferring cleaning fluid and waste material to and from the robot 100. The cleaning fluid container portion S comprises a sealed supply tank for holding a supply of the cleaning fluid. The waste container portion W comprises a sealed waste tank for storing loose particulates collected by the first collecting apparatus and for storing waste liquid collected by the second collecting apparatus.

The waste container W comprises a first molded plastic element formed with a base surface 804 and an integrally formed perimeter wall 806 disposed generally orthogonal from the base surface 804. The base surface 804 is formed with various contours to conform to the space available on the chassis 200 and to provide a detent area 164 that is used to orient the integrated liquid storage container module 800 on the chassis 200. The detent 164 includes a pair of channels 808 that interface with corresponding alignment rails 208 formed on a hinge element 202, attached to the chassis 200 and described below. The perimeter wall 806 includes finished external surfaces 810 that are colored and formed in accordance with the style and form of other external robot surfaces. The waste tank D may also include a tank level sensor housed therein and be configured to communicate a tank level signal to the master controller 300 when the waste tank D is full. The level sensor may comprise a pair of conductive electrodes disposed inside the tank and separated from each other. A measurement circuit applies an electrical potential difference between the electrodes from outside the tank. When the tank is empty no current flow between the electrodes. However, when both electrodes are submerged in waste liquid, current flows through the waste liquid from one electrode to the other. Accordingly, the electrodes may be located at positions with the tank for sensing the level of fluid within the tank.

The cleaning fluid storage container S is formed in part by a second molded plastic element 812. The second molded element 812 is generally circular in cross-section and formed with a substantially uniform thickness between opposing top and bottom surfaces. The element 812 mates with the waste container perimeter wall 810 and is bonded or otherwise attached thereto to seal the waste container W. The plenum 562 is incorporated into the second molded element 812 and positioned vertically above the waste container W when the cleaning robot is operating. The plenum 562 may also comprise a separate molded element.

The second molded element 812 is contoured to provide a second container portion for holding a supply of cleaning fluid. The second container portion is formed in part by a downwardly sloping forward section having an integrally formed first perimeter wall 816 disposed in a generally vertically upward direction. The first perimeter wall 816 forms a first portion of an enclosing perimeter wall of the liquid storage container S. The molded element 812 is further contoured to conform to the space available on the chassis 200. The molded element 812 also includes the container air input aperture 840, for interfacing with first cleaning zone air conduit 558. The molded element 812 also includes the container air exit aperture 838, for interfacing with the fan assembly 502 via the conduit 564.

A molded cover assembly 818 attaches to the molded element 812. The cover assembly 818 includes a second portion of the supply tank perimeter wall formed thereon and provides a top wall 824 of the supply tank enclosure. The cover assembly 818 attaches to the first perimeter wall portion 816 and to other surfaces of the molded element 814 and is bonded or otherwise attached thereto to seal the supply container S. The supply container S may include a tank empty sensor housed therein and be configured to communicate a tank empty signal to the master controller 300 when the upper tank is empty.

The cover assembly 818 comprises a molded plastic cover element having finished external surfaces 820, 822 and 824. The finished external surfaces are finished in accordance with the style and form of other external robot surfaces and may therefore be colored and or styled appropriately. The cover assembly 818 includes user access ports 166, 168 to the waste container W to the supply container S, respectively. The cover assembly 818 also includes the handle 162 and a handle pivot element 163 attached thereto and operable to unlatch the integrated liquid storage tank 800 from the chassis 200 or to pick up the entire robot 100.

According to the invention, the plenum 562 and each of the air conduits 830, 832, 834 and 836 are inside the cleaning fluid supply container S and the inter-connections of each of these elements are liquid and gas sealed to prevent cleaning fluid and waste materials from being mixed together. The plenum 562 is formed vertically above the waste container W so that waste liquid waste and loose particulates suctioned into the plenum 562 will drop into the waste container W under the force of gravity. The plenum side surfaces 828 include four apertures formed therethrough for interconnecting the plenum 562 with the four closed air conduits interfaced therewith. Each of the four closed air conduits 830, 832, 834 and 836 may comprise a molded plastic tube element formed with ends configured to interface with an appropriate mating aperture.

As shown in FIG. 16, the container air exit aperture 838 is generally rectangular and the conduit 830 connecting the container air exit aperture 838 and the plenum 562 is shaped with a generally rectangular end. This configuration provides a large area exit aperture 838 for receiving an air filter associated therewith. The air filter is attached to the fan intake conduit 564 to filter air drawn in by the fan assembly 502. When the integrated storage tank 800 is removed from the robot, the air filter remains attached to the air conduit 564 and may be cleaned in place or removed for cleaning or replacement as required. The area of the air filter and the container exit aperture 838 are formed large enough to allow the wet dry vacuum system to operate even when up to about 50% or more of the air flow through the filter is blocked by debris trapped therein.

Each of the container apertures 840 and 838 are configured with a gasket, not shown, positioned external to the container aperture. The gaskets provide substantially airtight seals between the container assembly 800 and the conduits 564 and 558. In a preferred embodiment, the gaskets remain affixed to the chassis 200 when the integrated liquid supply container 800 is removed from the chassis 200. The seal is formed when the container assembly 800 is latched in place on the robot chassis. In addition, some of the container apertures may include a flap seal or the like for preventing liquid from exiting the container while it is carried by a user. The flap seal remains attached to the container.

Thus according to the present invention, the fan assembly 502 generates a negative pressure of vacuum which evacuates air conduit 564, draws air through the air filter disposed at the end of air conduit 564, evacuates the fan intake conduit 830 and the plenum 562. The vacuum generated in the plenum 562 draws air from each of the conduits connected thereto to suction up loose particulates proximate to the air intake port 556 and to draw waste liquid up from the cleaning surface via the air conduits 834, 836 and 666, and via the vacuum chamber 664 and the suction ports 668. The loose particulates and waste liquid are drawn into the plenum 562 and fall into the waste container W.

Referring to FIGS. 1, 3, 16 and 17 the integrated liquid storage container 800 attaches to a top side of the robot chassis 200 by a hinge element 202. The hinge element 202 is pivotally attached to the robot chassis 200 at an aft edge thereof. The liquid storage container 800 is removable from the robot chassis 200 by a user and the user may fill the cleaning fluid supply container S with clean water and a measured volume of cleaning fluid such as soap or detergent. The user may also empty waste from the waste container W and flush out the waste container if needed.

To facilitate handling, the integrated liquid storage tank 800 includes a user graspable handle 162 formed integral with the cover assembly 818 at a forward edge of the robot 100. The handle 162 includes a pivot element 163 attached thereto by a hinge arrangement to the cover assembly 818. In one mode of operation, a user may grasp the handle 162 to pick up the entire robot 100 thereby. In a preferred embodiment, the robot 100 weights approximately 3-5 kg, (6.6-11 pounds), when filled with liquids, and can be easily carried by the user in one hand.

In a second mode of operation, the handle 162 is used to remove the integrated tank 800 from the chassis 200. In this mode, the user presses down on an aft edge of the handle 162 to initially pivot the handle downward. The action of the downward pivot releases a latching mechanism, not shown, that attaches a forward edge of the liquid storage container 800 to the robot chassis 200. With the latching mechanism unlatched the user grasps the handle 162 and lifts vertically upwardly. The lifting force pivots the entire container assembly 800 about a pivot axis 204, provided by a hinge element which pivotally attached to the aft edge of the chassis 200. The hinge element 202 supports the aft end of the integrated liquid storage container 800 on the chassis 200 and further lifting of the handle rotates the hinge element 202 to an open position that facilities removal of the container assembly 800 from the chassis 200. In the open position, the forward edge of the liquid storage container 800 is elevated such that further lifting of the handle 162 lifts the liquid storage tank 800 out of engagement with the hinge element 202 and separates it from the robot 100.

Figure 17:
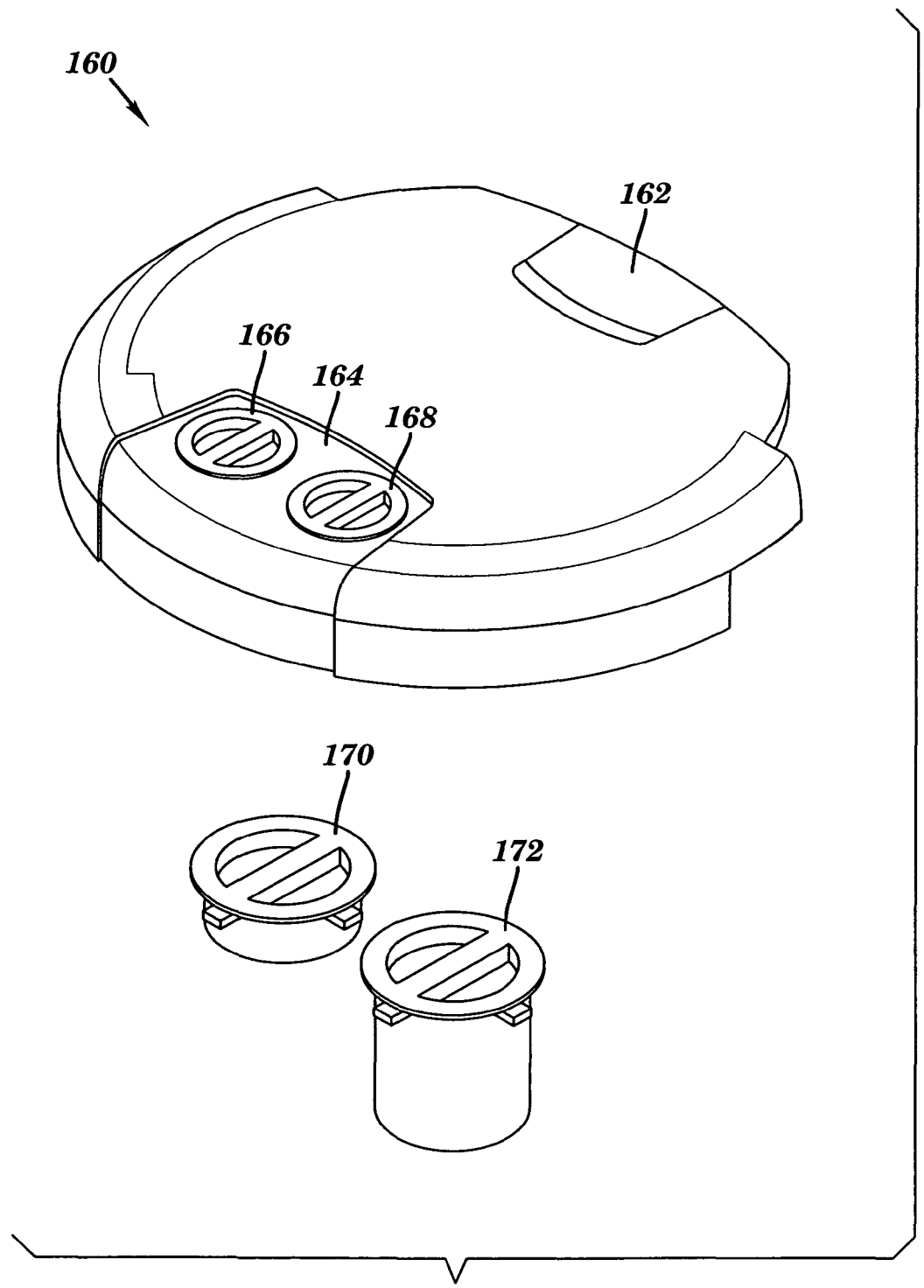
FIG. 17 depicts an external view of the integrated liquid storage module removed from the cleaning robot according to the present invention.

As shown in FIG. 17, the integrated liquid storage container 800 is formed with recessed aft exterior surfaces forming a detent area 164 and the detent area 164 is form matched to a receiving area of the hinge element 202. As shown in FIG. 3, the hinge element receiving area comprises a clevis-like cradle having upper and lower opposed walls 204 and 206 form matched to engage with and orient the storage container detent area 164. The alignment of the detent area 164 and the hinge walls 204 and 206 aligns the integrated storage container 800 with the robot chassis 200 and with the latching mechanism used to attach the container forward edge to the chassis 200. In particular, the lower wall 206 includes alignment rails 208 form-matched to mate with grooves 808 formed on the bottom side of the detent area 164. In FIG. 3, the hinge element 202 is shown pivoted to a fully open position for loading and unloading the storage container 800. The loading and unloading position is rotated approximately 75° from a closed or operating position; however, other loading and unloading orientations are contemplated. In the loading and unloading position, the storage container detent area 164 is easily engaged or disengaged from the clevis-like cradle of the hinge element 202. As shown in FIG. 1, the integrated liquid storage tank 800 and the hinge element 202 are configured to provide finished external surfaces that integrate smoothly and stylishly with other external surfaces of the robot 100.

Two access ports are provided on an upper surface of the liquid storage container 800 in the detent area 164 and these are shown in FIGS. 16 and 17. The access ports are located in the detent area 164 so as to be hidden by the hinge element upper wall 204 when the liquid storage tank assembly 800 is in installed in the robot chassis 200. A left access port 166 provides user access to the waste container W through the plenum 562. A right access port 168 provides user access to the cleaning fluid storage container S. The left and right access ports 166, 168 are sealed by user removable tank caps that may be color or form coded to be readily distinguishable.

Transport Drive System 900

In a preferred embodiment, the robot 100 is supported for transport over the cleaning surface by a three-point transport system 900. The transport system 900 comprises a pair of independent rear transport drive wheel modules 902 on the left side, and 904 on the right side, attached to the chassis 200 aft of the cleaning modules. In a preferred embodiment, the rear independent drive wheels 902 and 904 are supported to rotate about a common drive axis 906 that is substantially parallel with the transverse axis 108. However, each drive wheel may be canted with respect to the transverse axis 108 such that each drive wheel has its own drive axis orientation. The drive wheel modules 902 and 904 are independently driven and controlled by the master controller 300 to advance the robot in any desired direction. The left drive module 902 is shown protruding from the underside of the chassis 200 in FIG. 3 and the right drive module 904 is shown mounted to a top surface of the chassis 200 in FIG. 4. In a preferred embodiment, each of the left and right drive modules 902 and 904 is pivotally attached to the chassis 200 and forced into engagement with the cleaning surface by leaf springs 908, shown in FIG. 3. The leaf springs 908 are mounted to bias the each rear drive module to pivot downwardly toward the cleaning surface when the drive wheel goes over a cliff or is otherwise lifted from the cleaning surface. A wheel sensor associated with each drive wheel senses when a wheel pivots down and sends a signal to the master controller 300.

Figure 20:
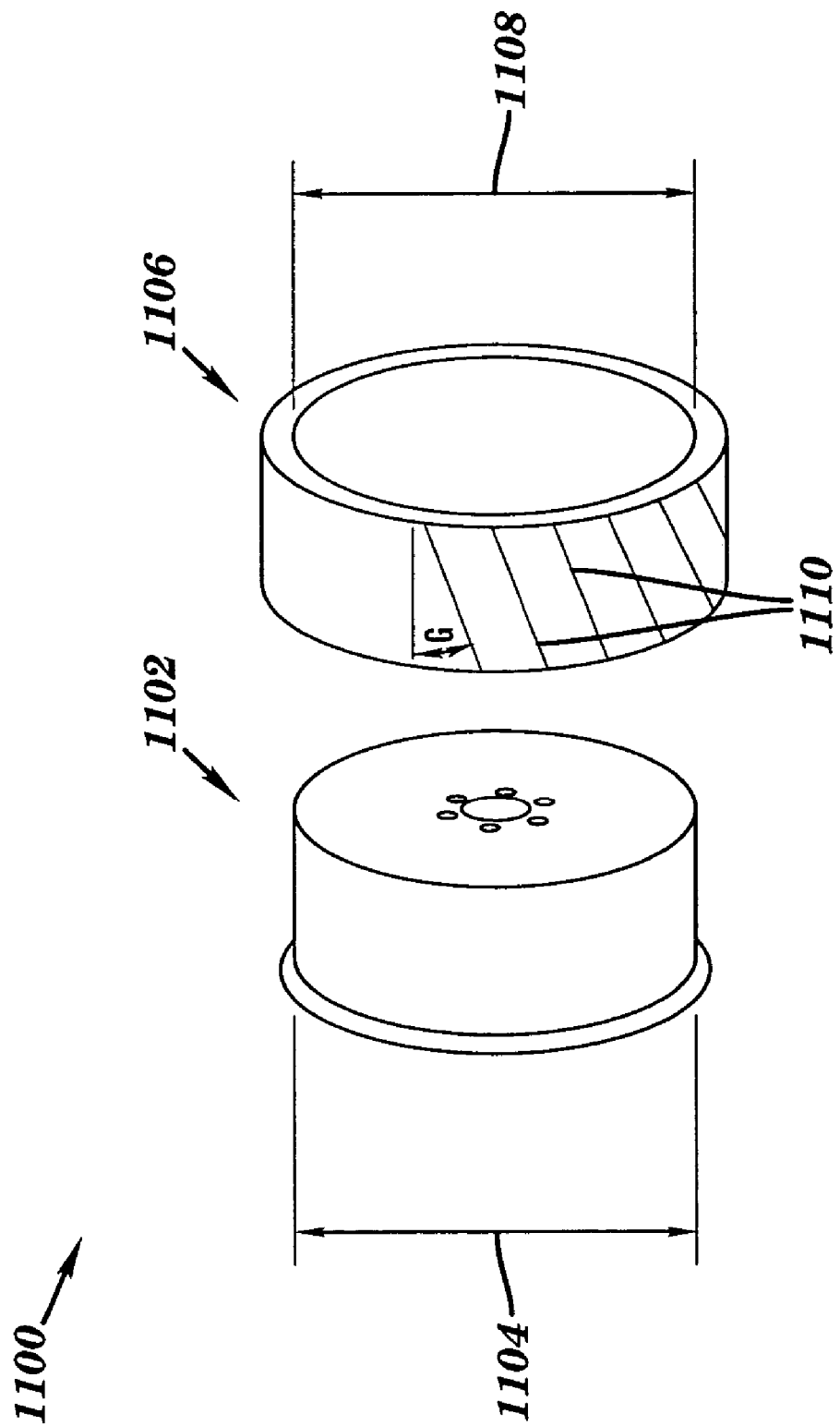
FIG. 20 depicts a schematic exploded view of a drive wheel assembly according to the present invention.

The drive wheels of the present invention are particularly configured for operating on wet soapy surfaces. In particular, as shown in FIG. 20, each drive wheel 1100 comprises a cup shaped wheel element 1102, which attaches to the a drive wheel module, 902 and 904. The drive wheel module includes a drive motor and drive train transmission for driving the drive wheel for transport. The drive wheel module may also include sensor for detecting wheel slip with respect to the cleaning surface.

The cup shaped wheel elements 1102 is formed from a stiff material such as a hard molded plastic to maintain the wheel shape and to provide stiffness. The cup shaped wheel element 1102 provides an outer diameter 1104 sized to receive an annular tire element 1106 thereon. The annular tire element 1106 is configured to provide a non-slip high friction drive surface for contacting the wet cleaning surface and for maintaining traction on the wet soapy surface.

The annular tire element 1106 comprises an internal diameter 1108 of approximately 37 mm and sized to fit appropriately over the outer diameter 1104. The tire may be bonded taped or otherwise contacted to the outer diameter 1104 to prevent slipping between the tire inside diameter 1108 and the outside diameter 1104. The tire radial thickness 1110 is approximately 3 mm. The tire material comprises a chloroprene homopolymer stabilized with thiuram disulfide black with a density of 15 pounds per cubic foot foamed to a cell size of 0.1 mm plus or minus 0.002 mm. The tire has a post-foamed hardness 69 shore 00. The tire material is sold by Monmouth Rubber and plastics Corporation under the trade name DURAFOAM DK5151HD.

To increase traction, the outside diameter of the tire is sipped. In at least one instance, the term sipped refers to slicing the tire material to provide a pattern of thin grooves 1110 in the tire outside diameter. In a preferred embodiment, each groove has a depth of approximately 1.5 mm and a width or approximately 20 to 300 microns. The groove pattern provides grooves that are substantially evenly spaced apart with approximately 2 to 200 mm spaces between adjacent grooves. The groove cut axis makes an angle G with the tire longitudinal axis and the angle G ranges from 10-50 degrees.

Figure 18:
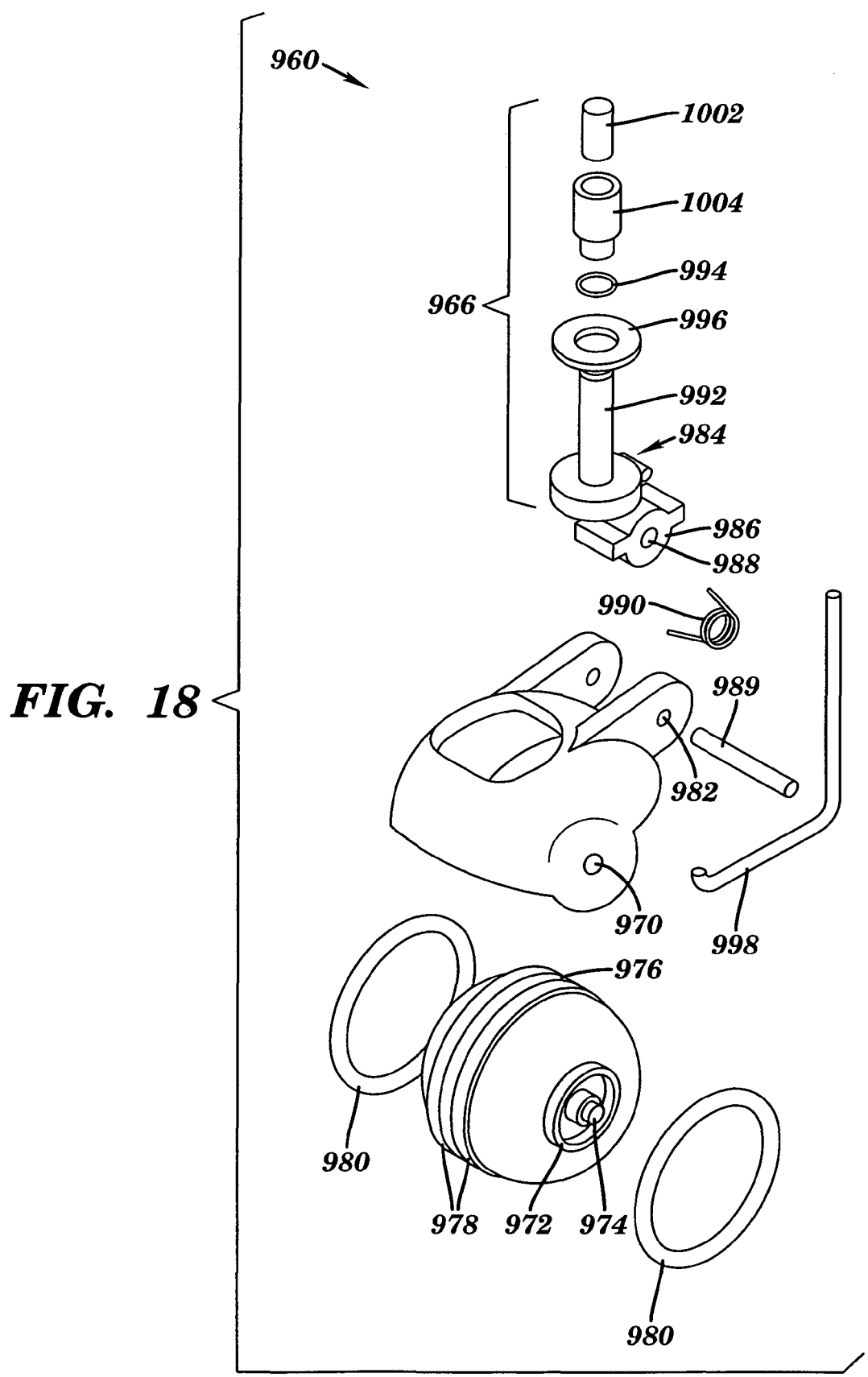
FIG. 18 depicts a schematic exploded view of a nose wheel module according to the present invention.
Figure 19:
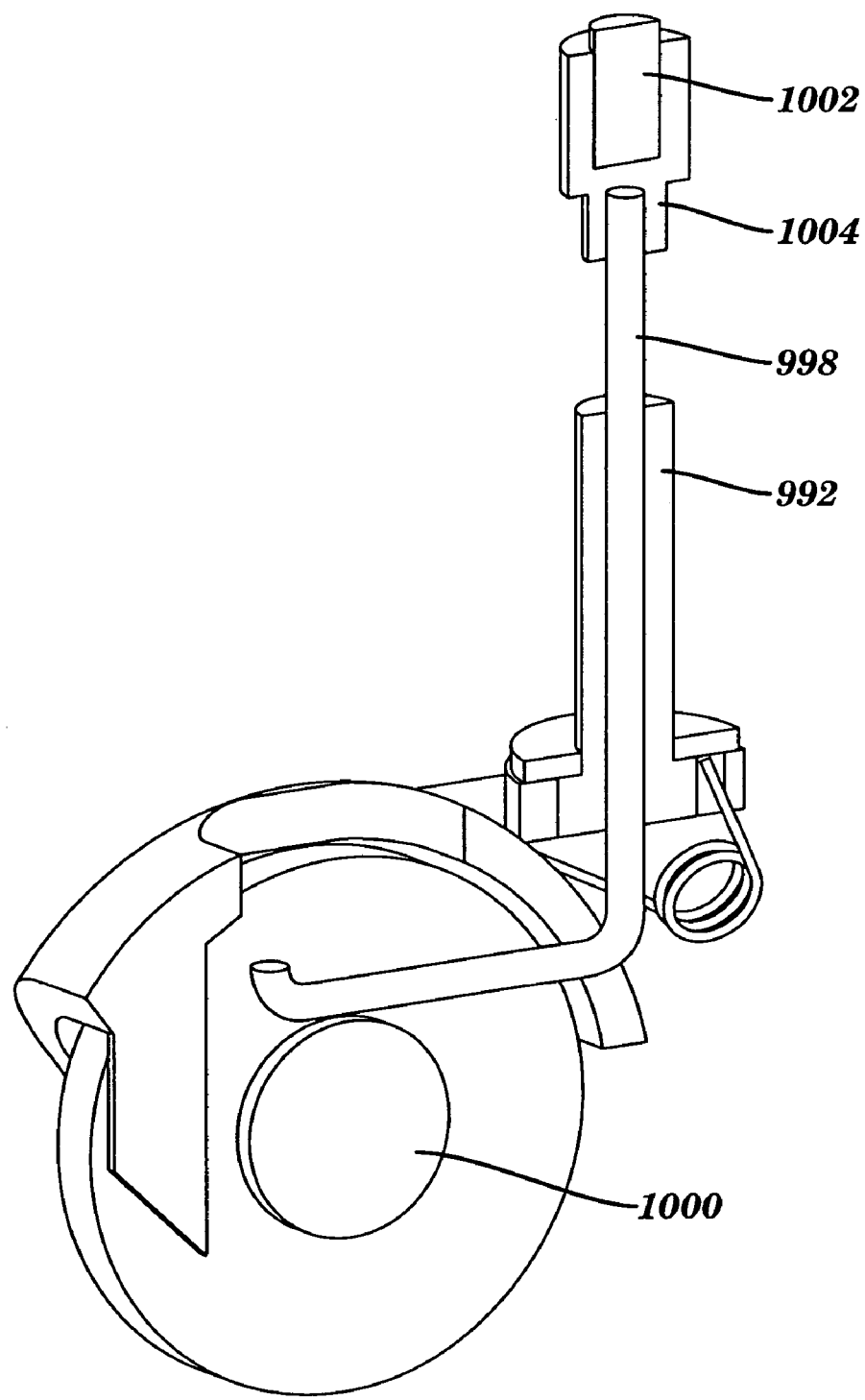
FIG. 19 depicts a schematic section view taken through a nose wheel assembly according to the present invention.

The nose wheel module 960, shown in exploded view in FIG. 18 and in section view in FIG. 19, includes a nose wheel 962 housed in a caster housing 964 and attached to a vertical support assembly 966. The nose wheel module 960 attaches to the chassis 200 forward of the cleaning modules and provide a third support element for supporting the chassis 200 with respect to the cleaning surface. The vertical support assembly 966 is pivotally attached to the caster housing 964 at a lower end thereof and allows the caster housing to pivot away from the chassis 200 when the chassis is lifted from the cleaning surface or when the nose wheel goes over a cliff. A top end of the vertical support assembly 966 passes through the chassis 200 and is rotatably supported with respect thereto to allow the entire nose wheel module 960 to rotate freely about a substantially vertical axis as the robot 100 is being transported over the cleaning surface by the rear transport drive wheels 902 and 904. Accordingly, the nose wheel module is self-aligning with respect to the direction of robot transport.

The chassis 200 is equipped with a nose wheel mounting well 968 for receiving the nose wheel module 960 therein. The well 968 is formed on the bottom side of the chassis 200 at a forward circumferential edge thereof. The top end of the vertical support assembly 966 passes through a hole through the chassis 200 and is captured in the hole to attach the nose wheel to the chassis. The top end of the vertical support assembly 966 also interfaces with sensor elements attached to the chassis 200 on its top side.

The nose wheel assembly 962 is configured with a molded plastic wheel 972 having axle protrusions 974 extending therefrom and is supported for rotation with respect to the caster housing 964 by opposed co-aligned axle holes 970 forming a drive wheel rotation axis. The plastic wheel 972 includes with three circumferential grooves in its outer diameter. A center groove 976 is providing to receive a cam follower 998 therein. The plastic wheel further includes a pair of symmetrically opposed circumferential tire grooves 978 for receiving an elastomeric o-ring 980 therein. The elastomeric o-rings 980 contacts the cleaning surface during operation and the o-ring material properties are selected to provide a desired friction coefficient between the nose wheel and the cleaning surface. The nose wheel assembly 962 is a passive element that is in rolling contact with the cleaning surface via the o-rings 980 and rotates about its rotation axis formed by the axle protrusion 974 when the robot 100 is transported over the cleaning surface.

The caster housing 964 is formed with a pair of opposed clevis surfaces with co-aligned opposed pivot holes 982 formed therethrough for receiving the vertical support assembly 966 therein. A vertical attaching member 984 includes a pivot element 986 at its bottom end for installing between the clevis surfaces. The pivot element 986 includes a pivot axis bore 988 formed therein for alignment with the co-aligned pivot hole 982. A pivot rod 989 extends through the co-aligned pivot holes 982 and is press fit within the pivot axis bore 988 and captured therein. A torsion spring 990 installs over the pivot rod 988 and provides a spring force that biases the caster housing 964 and nose wheel assembly 962 to a downwardly extended position forcing the nose wheel 962 to rotate to an orientation that places the nose wheel 962 more distally below the bottom surface of the chassis 200. The downwardly extended position is a non-operating position. The spring constant of the torsion spring 990 is small enough that the weight of the robot 100 overcomes its biasing force when the robot 100 robot is placed onto the cleaning surface for cleaning. Alternately, when the nose wheel assembly goes over a cliff, or is lifted off the cleaning surface, the torsion spring biasing force pivots the nose wheel to the downwardly extended non-operating position. This condition is sensed by a wheel down sensor, described below, and a signal is sent to the master controller 300 to stop transport or to initiate some other action.

The vertical attaching member 984 includes a hollow vertical shaft portion 992 extending upward from the pivot element 986. The hollow shaft portion 992 passes through the hole in the chassis 200 and is captured therein by an e-ring retainer 994 and thrust washer 996. This attaches the nose wheel assembly 960 to the chassis and allows it to rotate freely about a vertical axis when the robot is being transported.

The nose wheel module 960 is equipped with sensing elements that generate sensor signals used by the master control module 300 to count wheel revolutions, to determine wheel rotational velocity, and to sense a wheel down condition, i.e. when the caster 964 is pivoted downward by the force of the torsion spring 990. The sensors generate a wheel rotation signal using a cam following plunger 998 that include a sensor element that moves in response to wheel rotation. The cam follower 998 comprises an "L" shaped rod with the a vertical portion being movably supported inside the hollow shaft 992 thus passing through the hole in the chassis 200 to extend above the top surface thereof. The lower end of the rod 992 forms a cam follower that fits within the wheel center circumferential groove 976 and is movable with respect thereto. The cam follower 998 is supported in contact with an offset hub 1000 shown in FIG. 18. The offset hub 1000 comprises an eccentric feature formed non-symmetrically about the nose wheel rotation axis inside the circumferential groove 976. With each rotation of the wheel 962, the offset hub 1000 forces and oscillation of the cam follower 998 which moves reciprocally along a substantially vertical axis.

A once per revolution wheel sensor includes a permanent magnet 1002 attached to the top end of the "L" shaped rod by an attaching element 1004. The magnet 1002 oscillates through a periodic vertical motion with each full revolution of the nose wheel. The magnet 1002 generates a magnetic field which is used to interact with a reed switch, not shown, mounted to the chassis 200 in a fixed location with respect to moving magnet 1002. The reed switch is activated by the magnetic field each time the magnet 1002 is in the full up position in its travel. This generates a once per revolution signal which is sensed by the master controller 300. A second reed switch may also be positioned proximate to the magnet 1002 and calibrated to generate a wheel down signal. The second reed switch is positioned in a location that will be influenced by the magnetic field when the magnet 1002 drops to the non-operating wheel down position.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. residential floor cleaning, those skilled in the art will recognize that its usefulness is not limited thereto and that the present invention can be beneficially utilized in any number of environments and implementations including but not limited to cleaning any substantially horizontal surface. Accordingly, the claims set forth below should be construed in view of the full breadth and spirit of the invention as disclosed herein.

What is claimed is:

1. A surface cleaning apparatus comprising:
    a chassis defined by a fore-aft axis and a perpendicular transverse axis for supporting cleaning elements thereon and for transporting the cleaning elements along a direction of the fore-aft axis over work surface supporting the surface cleaning apparatus, the cleaning elements disposed to clean across a cleaning width disposed generally orthogonal to the fore-aft axis with a left end and a right end defining opposing edges of the cleaning width; and
    a liquid applicator disposed on the chassis and comprising:
        a fluid supply container;
        a conduit in fluid communication with the fluid supply container;
        a first nozzle in fluid communication with the conduit and disposed on the chassis at the left end for ejecting cleaning fluid therefrom, the cleaning fluid being ejected from the first nozzle and onto the work surface; and
        a second nozzle in fluid communication with the conduit and disposed on the chassis at the right end for ejecting cleaning fluid therefrom, the cleaning fluid being ejected from the second nozzle and onto the work surface,
            wherein the first nozzle and the second nozzle are co-located on the fore-aft axis;
            wherein each of the first and second nozzles ejects a burst of cleaning fluid in accordance with a burst frequency;
    a collecting apparatus attached to the chassis aft of the positions of the first and second nozzles and extending from the chassis to the surface across the cleaning width for colleting waste liquid from the surface; and
    an autonomous transport drive subsystem, a sensor module for sensing conditions and a power module all supported by the chassis and controlled by a master control module to autonomously move the cleaning elements substantially over the entire surface over the surface in accordance with predefined operating modes and in response to condition sensed by the sensor module,
        wherein the master control module is configured to vary the burst frequency in accordance with a desired rate for applying cleaning fluid onto surface.

2. A surface cleaning apparatus according to claim 1 wherein the cleaning fluid comprises water.

3. A surface cleaning apparatus according to claim 1 wherein the cleaning fluid further comprises any one of soap, solvent, fragrance, disinfectant, emulsifier, drying agent and abrasive particulates.

4. A surface cleaning apparatus according to claim 1 further comprising a smearing element attached to the chassis aft of the co-located position of the first and second nozzles and extending from the chassis to the surface across the cleaning width for smearing the cleaning fluid.

5. A surface cleaning apparatus according to claim 1 further comprising a scrubbing element attached to the chassis aft of the co-located position of the first and second nozzles and extending from the chassis to the surface across the cleaning width for scrubbing the surface.

6. A surface cleaning apparatus according to claim 1 further comprising a scrubbing element attached to the chassis aft of the co-located position of the first and second nozzles and extending from the chassis to the surface across the cleaning width for scrubbing the surface.

7. A surface cleaning apparatus according to claim 1 wherein each of the first and second nozzles ejects a discrete burst of cleaning fluid in accordance with a respective burst frequency and wherein the burst frequency of the first nozzle is substantially opposite in phase with respect to the burst frequency of the second nozzle.

8. A surface cleaning apparatus according to claim 1 wherein the master control module is configured to vary the burst frequency to apply cleaning fluid onto the surface at a substantially uniform volume of approximately 2 ml per square foot.

9. A surface cleaning apparatus according to claim 1 further comprising:
   a liquid storage container, carried on the chassis, for storing a supply of the cleaning fluid therein;
   a diaphragm pump assembly configured with a first pump portion for drawing cleaning fluid from the container and for delivering the cleaning fluid to at least one of the first and second nozzles; and,
   a mechanical actuator for mechanically actuating the first pump portion.

10. A surface cleaning apparatus according to claim 1 further comprising:
    a liquid storage container, carried on the chassis, for storing a supply of the cleaning fluid therein;
    a diaphragm pump assembly having a first a first pump portion for drawing cleaning fluid from the container and for delivering the cleaning fluid to the first nozzle and a second pump portion for drawing cleaning fluid from the container and for delivering the cleaning fluid to the second nozzle; and
    a mechanical actuator for mechanically actuating the first pump portion and the second pump portion.

11. A method according to claim 1 further comprising smearing the cleaning fluid across the cleaning width using a smearing element attached to the chassis aft of the co-located position of the first nozzle and the second nozzle, the smearing element extending across the cleaning width.

12. A method according to claim 1 further comprising scrubbing the surface across the cleaning width using a scrubbing element attached to the chassis aft of the co-located position of the first nozzle and the second nozzle, the scrubbing element extending across the cleaning width.

13. A method according to claim 1 further comprising collecting waste liquid from the surface across the cleaning width using a collecting apparatus attached to the chassis aft of the co-located position of the first nozzle and the second nozzle, the collecting apparatus extending across the cleaning width.

14. A surface cleaning apparatus according to claim 1 wherein each of the first and second nozzles are configured to distribute cleaning fluid across the cleaning width.

15. A surface cleaning apparatus according to claim 1 wherein at least one of the first and second nozzles is directed substantially parallel to the transverse axis.

16. A surface cleaning apparatus according to claim 1 wherein the master control module is configured to adjust the burst frequency in proportion to a forward velocity of the chassis to apply a substantially uniform volume of cleaning fluid onto the cleaning surface irrespective of the forward velocity of the chassis.

17. A surface cleaning apparatus comprising:
a chassis defined by a fore-aft axis and a perpendicular transverse axis for supporting cleaning elements thereon and for transporting the cleaning elements along a direction of the fore-aft axis over a work surface supporting the surface cleaning apparatus, the cleaning elements disposed to clean across a cleaning width disposed generally orthogonal to the fore-aft axis with a left end and a right end defining opposing edges of the cleaning width;
an autonomous transport drive subsystem, a sensor module for sensing conditions and a power module all supported by the chassis and controlled by a master control module to autonomously move the cleaning elements substantially over the entire surface over the surface in accordance with predefined operating modes and in response to conditions sensed by the sensor module;
a liquid storage container, carried on the chassis, for storing a supply of the cleaning fluid therein;
a liquid applicator disposed on the chassis and comprising:
   a fluid supply container;
   a conduit in fluid communication with the fluid supply container;
   a first nozzle disposed at the left end of the cleaning width for ejecting cleaning fluid therefrom, the cleaning fluid being ejected from the first nozzle to distribute cleaning fluid across the cleaning width, and
   a second nozzle disposed at the right end of the cleaning width for ejecting cleaning fluid therefrom, the cleaning fluid being ejected from the second nozzle to distribute cleaning fluid across the cleaning width;
   wherein the first nozzle and the second nozzle are co-located on the fore-aft axis;
a collecting apparatus attached to the chassis aft of the position of the at least one nozzle and extending from the chassis to the surface across the cleaning width for collecting waste liquid from the surface;
a diaphragm pump assembly having a first a first pump portion for drawing cleaning fluid from the container and for delivering the cleaning fluid to the first nozzle and a second pump portion for drawing cleaning fluid from the container and for delivering the cleaning fluid to the second nozzle; and
a mechanical actuator for mechanically actuating the first pump portion and the second pump portion;
wherein the diaphragm pump assembly comprises:
   a flexible element mounted between a non-flexible upper chamber element and a non-flexible lower chamber element, the flexible element being formed with a first pump chamber and a first actuator nipple attached thereto and a second pump chamber and a second actuator nipple attached thereto;
   an actuator link pivotally attached to the pump assembly for pivoting between a first actuator position and a second actuator position, the actuator link being fixedly attached to each of the first and the second actuator nipples and wherein movement of the actuator link toward the first actuator position decreases the volume the first pump chamber and increases the volume of the second pump chamber and further wherein movement of the actuator link toward the second actuator position increases the volume the first pump chamber and decreases the volume of the second pump chamber;

a cam element configured with a circumferential cam profile and supported to move the actuator link between the first actuator position and the second actuator position; and a cam rotary drive, controlled by the master controller, for rotating the cam element in accordance with a cam rotary drive pattern.

18. A method for cleaning a surface with a cleaning apparatus, comprising:

transporting a chassis over a work surface supporting the surface cleaning apparatus in a forward transport direction defined by a fore-aft axis, the chassis supporting cleaning elements disposed to clean across a cleaning width disposed generally orthogonal to the fore-aft axis, the cleaning width having a left end and an opposing right end, wherein the chassis further includes an autonomous transport drive subsystem, a sensor module for sensing conditions and a power module all supported thereon and controlled by a master control module and wherein transporting the chassis over the surface further comprises:

controlling the transport drive subsystems in accordance with predefined operating modes and in response to conditions sensed by the sensor module to transport the cleaning elements substantially over the entire surface;

ejecting a volume of cleaning fluid onto the work surface from a first nozzle attached to the chassis at the left end, the first nozzle in fluid communication with a fluid supply container disposed on the chassis and configured to distribute cleaning fluid onto the work surface; and ejecting a volume of cleaning fluid from a second nozzle attached to the chassis at the right end and co-located on the fore-aft axis with respect to the first nozzle, the second nozzle being configured to eject cleaning fluid therefrom, the cleaning fluid being ejected to distribute cleaning fluid onto the cleaning surface, wherein ejecting cleaning fluid from each of the first and second nozzles comprises ejecting bursts of cleaning fluid in accordance with a burst frequency.

19. A method according to claim 18 wherein ejecting cleaning fluid from each of the first and second nozzles comprises ejecting cleaning fluid across the cleaning width.

20. A method according to claim 18 further comprising adjusting the burst frequency in proportion to a forward velocity of the chassis to apply a substantially uniform volume of cleaning fluid onto the cleaning surface irrespective of the forward velocity of the chassis.

* * * * *